(12) United States Patent
Scheitlin et al.

(10) Patent No.: US 11,436,339 B1
(45) Date of Patent: Sep. 6, 2022

(54) SYSTEMS, METHODS, AND USER INTERFACES FOR INTELLIGENT AND EXPEDITED GENERATION OF CYBERSECURITY ARTIFACTS USING CYBERSECURITY CONTROL DATA OBJECTS

(71) Applicant: RISQ Management LLC, Franklin, TN (US)

(72) Inventors: Gerard Edward Scheitlin, Franklin, TN (US); Quintin Scott Scheitlin, Franklin, TN (US); Chandler Carter Scheitlin, Franklin, TN (US)

(73) Assignee: RISQ Management LLC, Franklin, TN (US)

( * ) Notice: Subject to any disclaimer, the term of this patent is extended or adjusted under 35 U.S.C. 154(b) by 0 days.

(21) Appl. No.: 17/750,378

(22) Filed: May 22, 2022

Related U.S. Application Data

(60) Provisional application No. 63/300,228, filed on Jan. 17, 2022, provisional application No. 63/300,240, filed on Jan. 17, 2022, provisional application No. 63/296,152, filed on Jan. 3, 2022, provisional application No. 63/213,199, filed on Jun. 21, 2021.

(51) Int. Cl.
    *G06F 21/57* (2013.01)
(52) U.S. Cl.
    CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 2015/0106873 | A1* | 4/2015 | Marsh | G06Q 10/0635 726/1 |
| 2015/0381649 | A1* | 12/2015 | Schultz | G06Q 10/0635 726/25 |
| 2020/0143060 | A1* | 5/2020 | Tin | G06F 21/577 |
| 2020/0250317 | A1* | 8/2020 | Gourisetti | G06F 21/577 |

* cited by examiner

*Primary Examiner* — Fatoumata Traore

(57) ABSTRACT

In some embodiments, a cybersecurity data handling and governance service displays a cybersecurity artifact generation object. In some embodiments, while displaying the cybersecurity artifact generation object, the cybersecurity data handling and governance service receives a first input selecting the cybersecurity artifact generation object. In some embodiments, in accordance with a determination that the first input is directed to generating a first cybersecurity artifact corresponding to a first authoritative information security standard and in accordance with a determination that the first user interface is dedicated to displaying information directed to a respective cybersecurity data catalogue, the cybersecurity data handling and governance service generates the first cybersecurity artifact based on a first set of cybersecurity control data objects included in the respective cybersecurity data catalogue in accordance with submittal-criteria defined by the first authoritative information security standard.

18 Claims, 45 Drawing Sheets

(Subscriber A)

(Subscriber A)

(Subscriber A)

(Subscriber A)

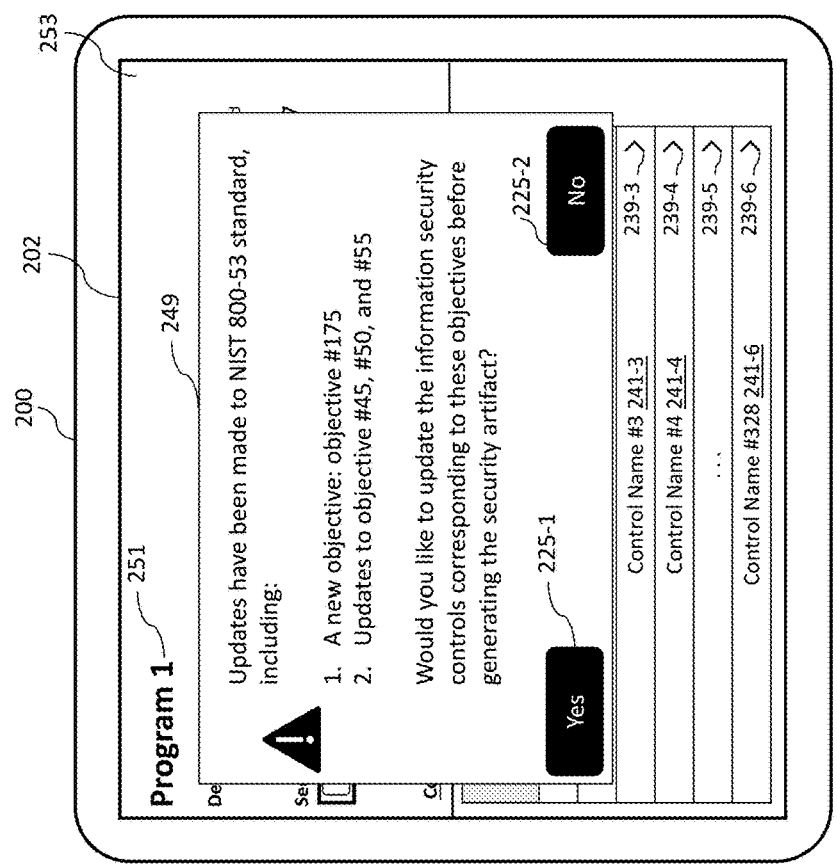
Fig. 2QQ (Subscriber A)
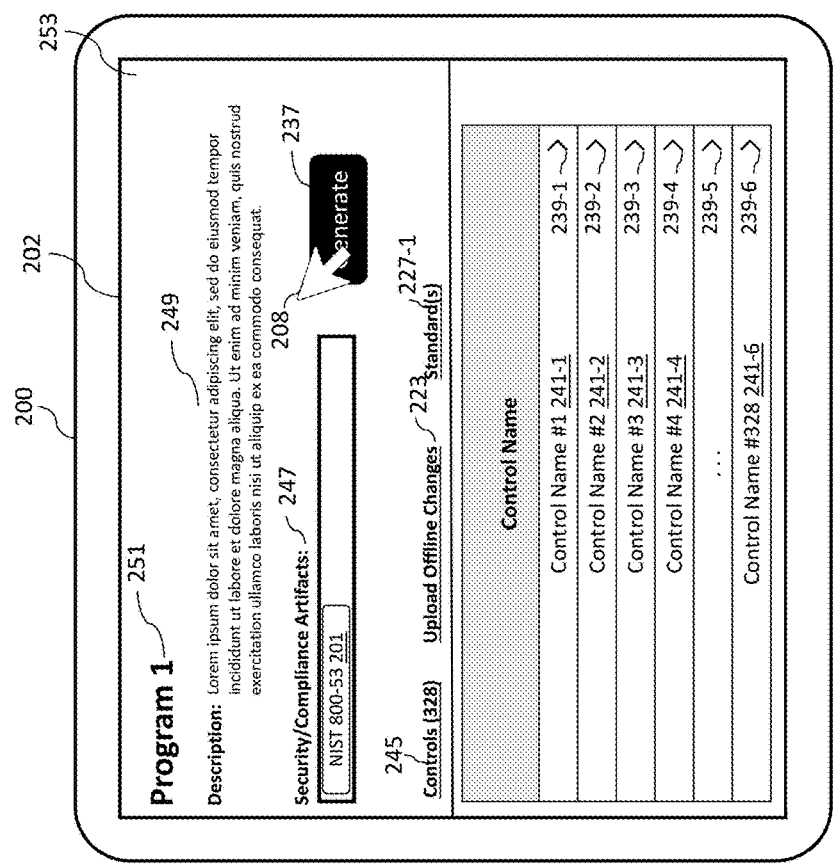
Fig. 2PP (Subscriber A)

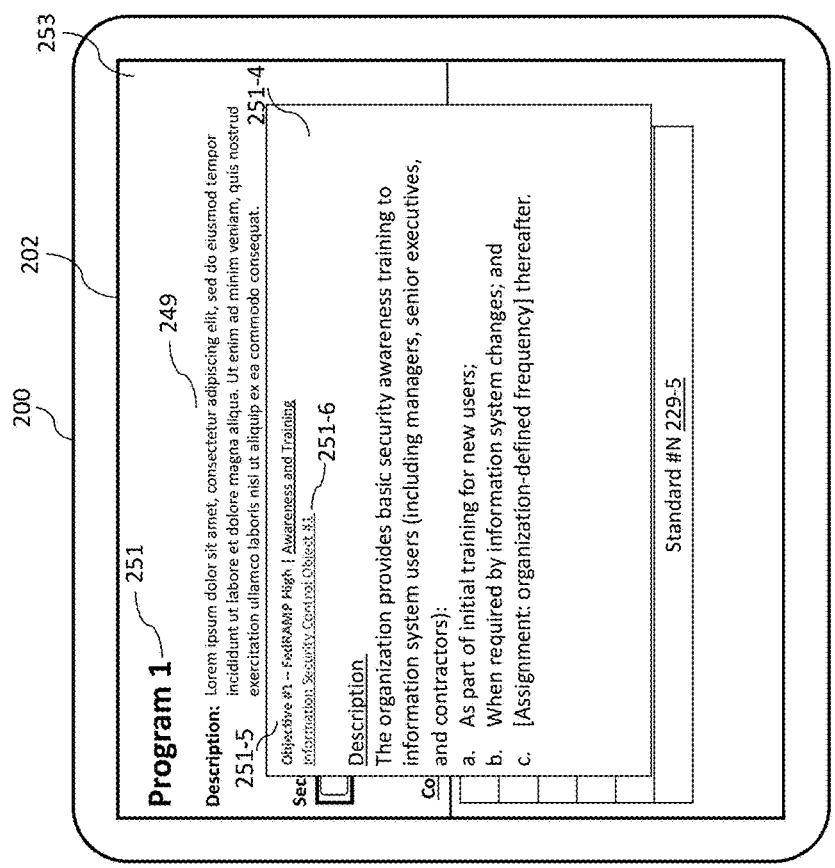

SYSTEMS, METHODS, AND USER INTERFACES FOR INTELLIGENT AND EXPEDITED GENERATION OF CYBERSECURITY ARTIFACTS USING CYBERSECURITY CONTROL DATA OBJECTS

CROSS-REFERENCE TO RELATED APPLICATIONS

This application claims the benefit of U.S. Provisional Application No. 63/300,240, filed 17 Jan. 2022, U.S. Provisional Application No. 63/300,228, filed 17 Jan. 2022, U.S. Provisional Application No. 63/296,152, filed 3 Jan. 2022, and U.S. Provisional Application No. 63/213,199, filed 21 Jun. 2021, which are incorporated in their entireties by this reference.

TECHNICAL FIELD

This invention relates generally to the cybersecurity field, and more specifically to new and useful systems, methods, and user interfaces for expediting generation of one or more digital cybersecurity artifacts using one or more digital cybersecurity control data objects.

BACKGROUND

Modern entities may typically task information security departments with gaining and/or maintaining organizational compliance with one or more information security standards. Typically, these information security departments maintain data records in non-integrated or disjointed storage architectures and often are outdated/obsolete and non-extensible when needed. Thus, there are needs in the cybersecurity data handling and data governance fields for improved systems and methods that enable information security departments to maintain data assets and/or data records more easily through an extensible information security data handling and data governance platform.

The embodiments of the present application described herein provide technical solutions that address, at least, the needs described above, as well as the deficiencies of the state of the art.

DESCRIPTION OF THE PREFERRED EMBODIMENTS

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described embodiments. The first input and the second input are both inputs, but they are not the same input.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, the following description of the preferred embodiments of the inventions are not intended to limit the inventions to these preferred embodiments, but rather to enable any person skilled in the art to make and use these inventions.

Figure 1:
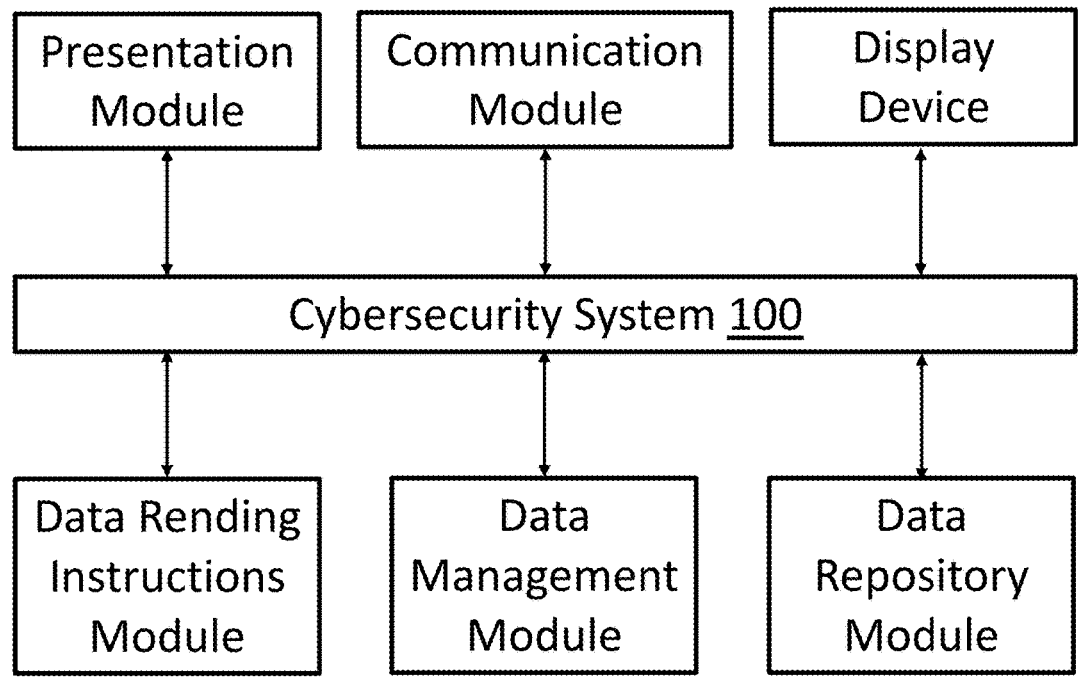
FIG. 1 illustrates a schematic representation of a system 100 in accordance with one or more embodiments of the present application.

FIG. 1 illustrates an example computer system (e.g., cybersecurity system) that may be configured to visually display, on a computer display device, one or more subscriber-specific information security data programs. In one or more embodiments, the computer system may be configured and programmed to store, query, and/or generate one or more visual representations of information security control data and/or one or more information security artifacts associated with one or more data structures. Embodiments of the computer system may include, but are not limited to, a standalone computer system that includes data storage and display components, a multiple computer server system with multiple computer components on server systems located within a cloud server, or the like.

In one or more embodiments, the computer system may include a presentation module, a data rendering instructions module, a communication module, a data management module, a display device, and a data repository module. The presentation module, data rendering instructions module, communication module, and data management module may each comprise executable instructions loaded into a set of one or more pages of main memory, such as RAM, in the computer system which when executed may cause the computer system to perform the functions or operations that are described herein (e.g., the method 300). For example, the data rendering instructions module may comprise executable instructions loaded into a set of pages in RAM that contain instructions which when executed cause data rendering functions described herein.

In one or more embodiments, the presentation module, data rendering instructions module, the communication module, and the data management module may represent one or more files or projects of source code that may be digitally stored in a mass storage device such as non-volatile RAM or disk storage, in the computer system or a separate repository system, which when compiled or interpreted may cause generation of executable instructions that, when executed, cause the computer system to perform the functions or operations described herein. In one or more embodiments, the presentation module may include instructions to generate a visual user interface (GUI) to be displayed on the display device. The GUI may comprise controls for receiving user input which may be used to update or generate a new display of data within the GUI as described in more detail below.

In one or more embodiments, the data rendering instructions module may include instructions to generate a visual display that may visually illustrate one or more information security programs, one or more information security control objects of the one or more information security programs, and/or one or more information security artifacts based on one or more data structures stored within a data repository module and/or user input that specifies the configuration of the visual display based on the user-selected information security program and the target information security artifact to generate. In one or more embodiments, the data management module may include instructions for performing functions that manage read operations and write operations associated with the data repository module and other functional elements of the system, including queries and result sets communicated between the functional elements of the system and the data repository module. In one or more embodiments, the display device may include, but is not limited to, a computer display screen, a computer projection screen, a mobile device screen, or any other digital display configured to present visual illustrations of data. The visual representation of the information security program, the information security control data objects and their relationships, and/or the information security artifact may then be displayed on the display device for a user (or subscriber) to view.

In an embodiment, user input may represent input from a user or other computer system, external to the computer system, to update or modify the current visual display on the display device. According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that may be persistently programmed to perform the techniques and/or may include one or more general purpose hardware processors programmed to perform the techniques pursuant to program instructions in firmware, memory, other storage, or a combination. The special-purpose computing devices may be desktop computer systems, portable computer systems, handheld devices, networking devices or any other device that incorporates hard-wired and/or program logic to implement the techniques. For example, the computer system may include a bus or other communication mechanism for communicating information, and a hardware processor coupled with the bus for processing information. Hardware processor may be, for example, a general purpose microprocessor.

The computer system may also include a main memory, such as a random access memory (RAM) or other dynamic storage device, coupled to the bus for storing information and instructions to be executed by a processor. The computer system may further include a read only memory (ROM) or other static storage device coupled to the bus for storing static information and instructions for the processor. Execution of the sequences of instructions contained in the main memory may cause the processor to perform the process steps described herein. In alternative embodiments, hard-wired circuitry may be used in place of or in combination with software instructions. The term "storage media" as used herein refers to any non-transitory media that stores data and/or instructions that cause a machine to operate in a specific fashion. Such storage media may comprise non-volatile media and/or volatile media. Storage media is distinct from but may be used in conjunction with transmission media. Transmission media participates in transferring information between storage media. For example, transmission media includes coaxial cables, copper wire and fiber optics, including the wires that comprise the bus. Transmission media can also take the form of acoustic or light waves, such as those generated during radio-wave and infra-red data communications.

Various forms of media may be involved in carrying one or more sequences of one or more instructions to the processor for execution. Network links typically provide data communication through one or more networks to other data devices. For example, a network link may provide a connection through a local network to a host computer or to data equipment operated by an Internet Service Provider (ISP). The ISP in turn may provide data communication services through the worldwide packet data communication network, commonly referred to as the "Internet". The computer system may send messages and receive data, including program code, through the network(s), network link and communication interface. In the Internet example, a server might transmit a requested code for an application program through Internet, ISP, local network and communication interface. The received code may be executed by the processor as it is received, and/or stored in a storage device, or other non-volatile storage for later execution.

Figure 2A:
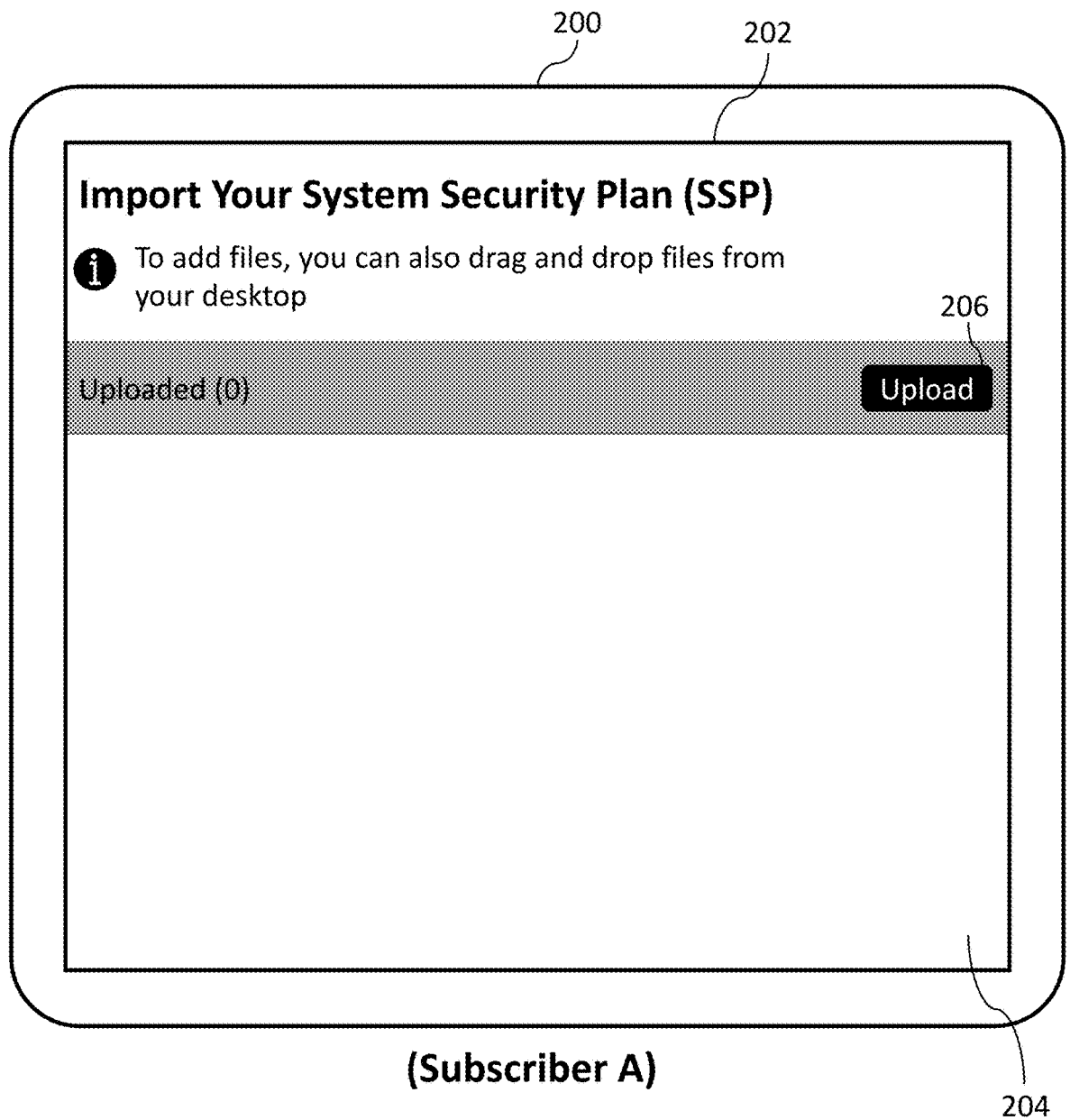
FIGS. 2A-2WW illustrate examples of how an information security service automatically creates one or more information security programs and/or automatically generates one or more information security artifacts in accordance with some embodiments of the disclosure.
Figure 2B:
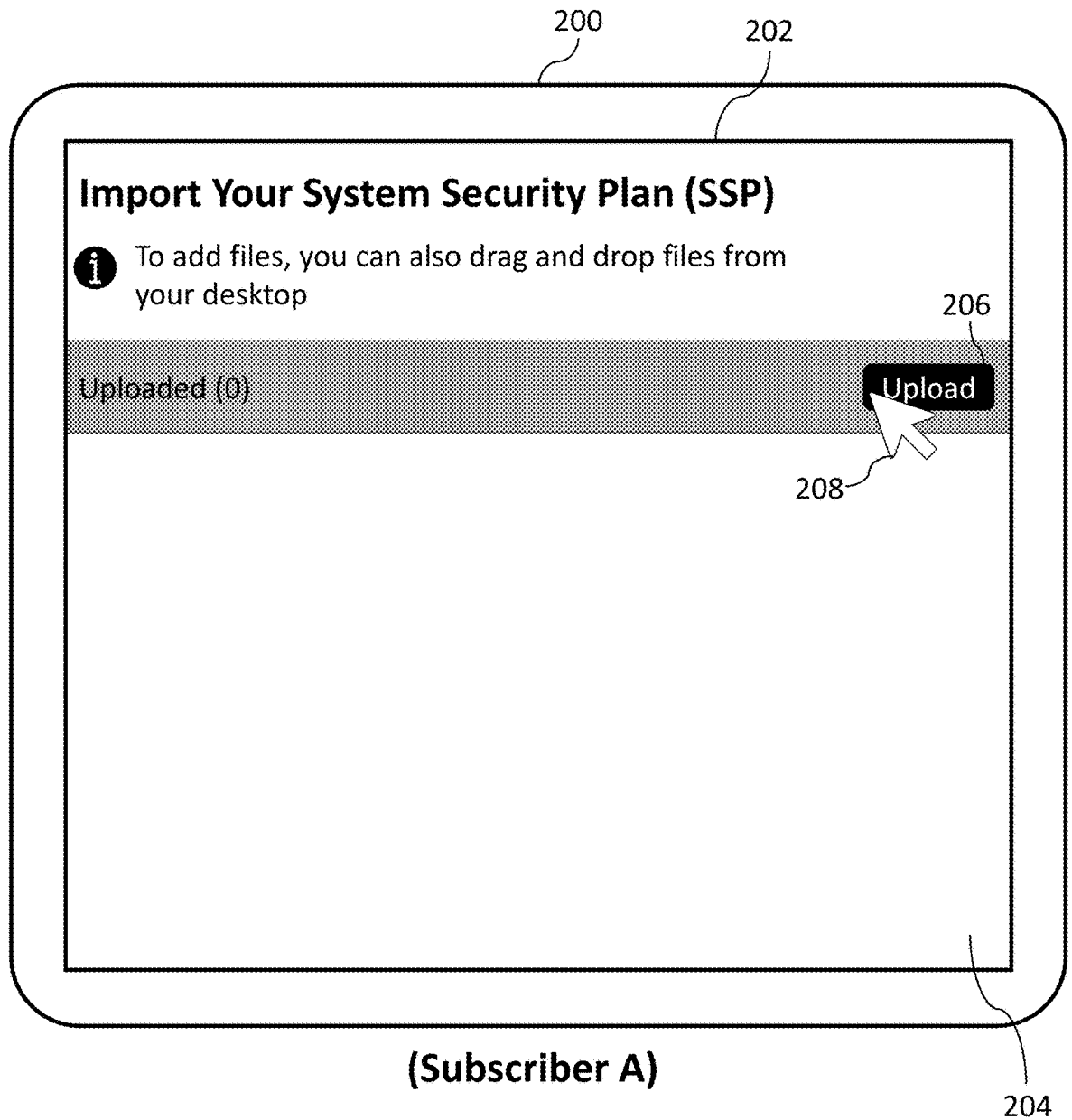
Figure 2C:
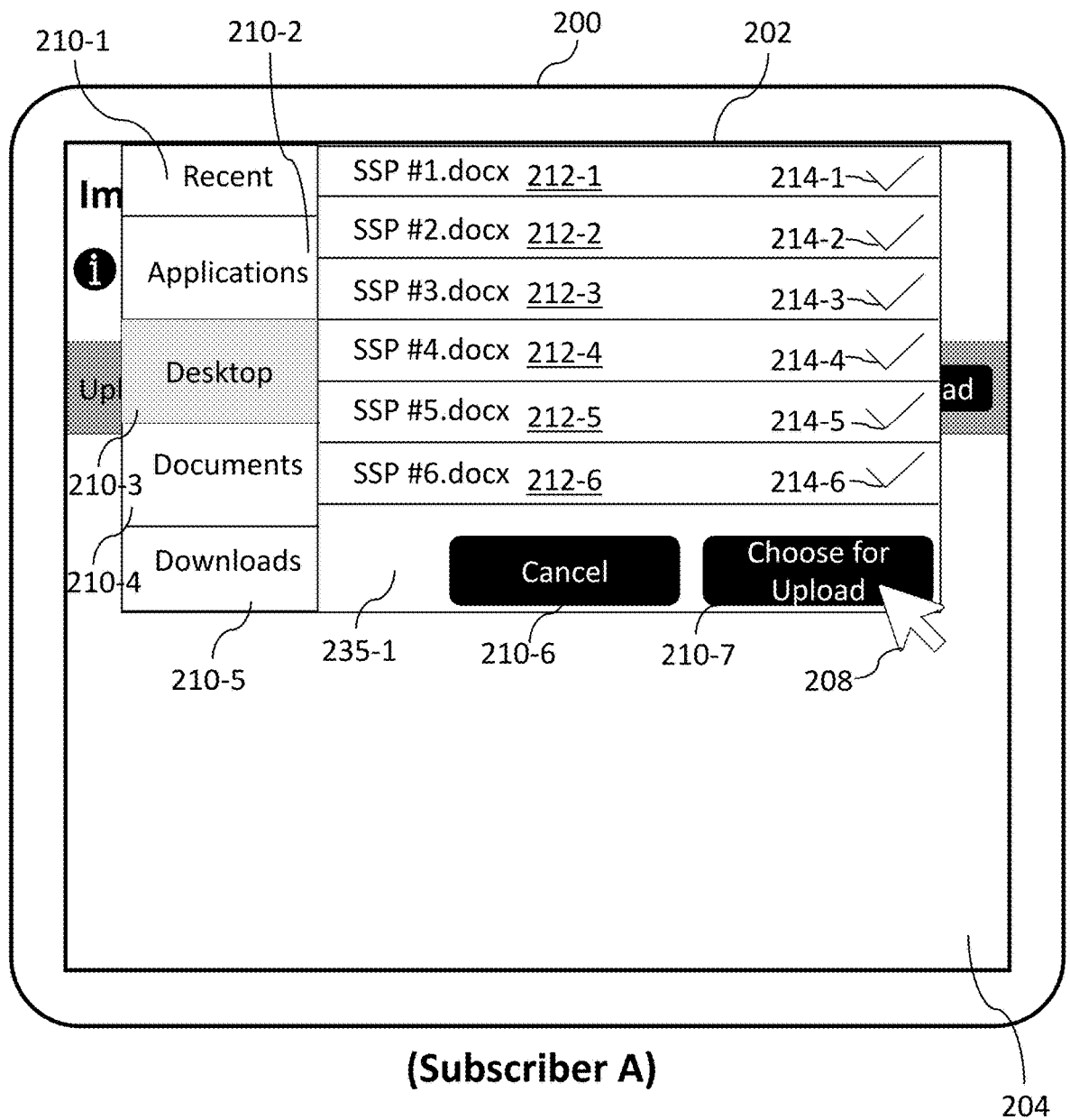
Figure 2D:
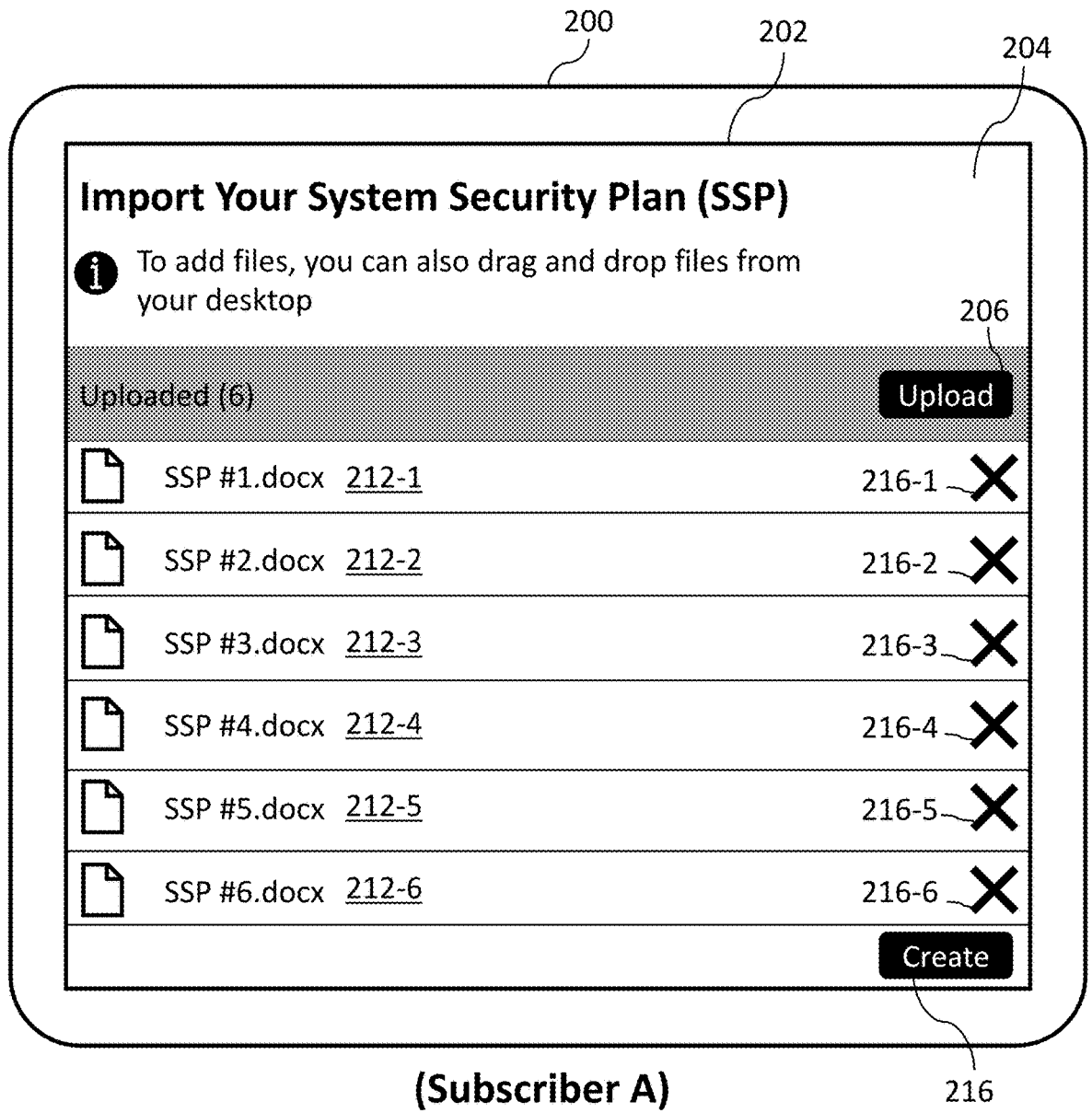
Figure 2E:
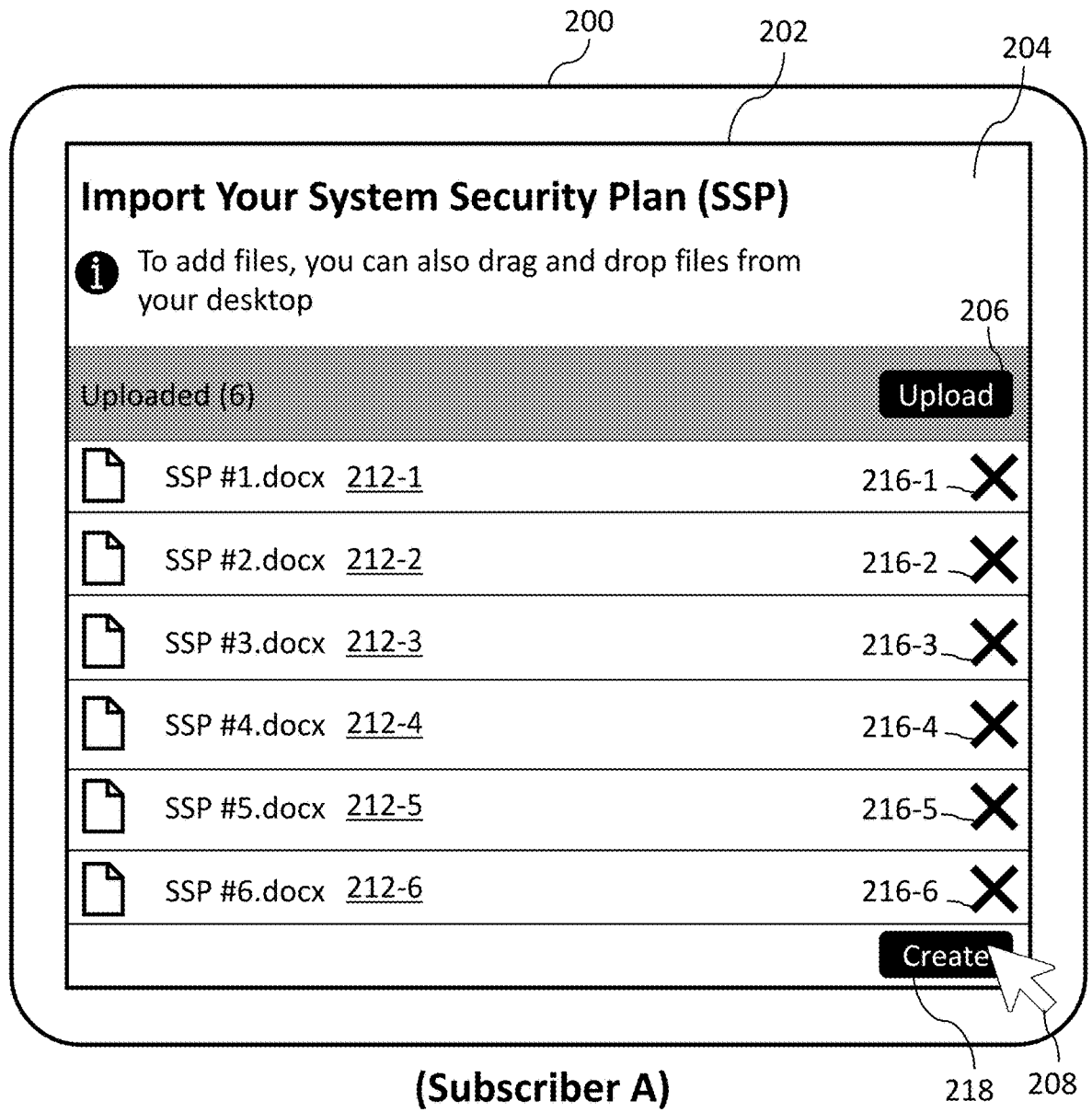
Figure 2F:
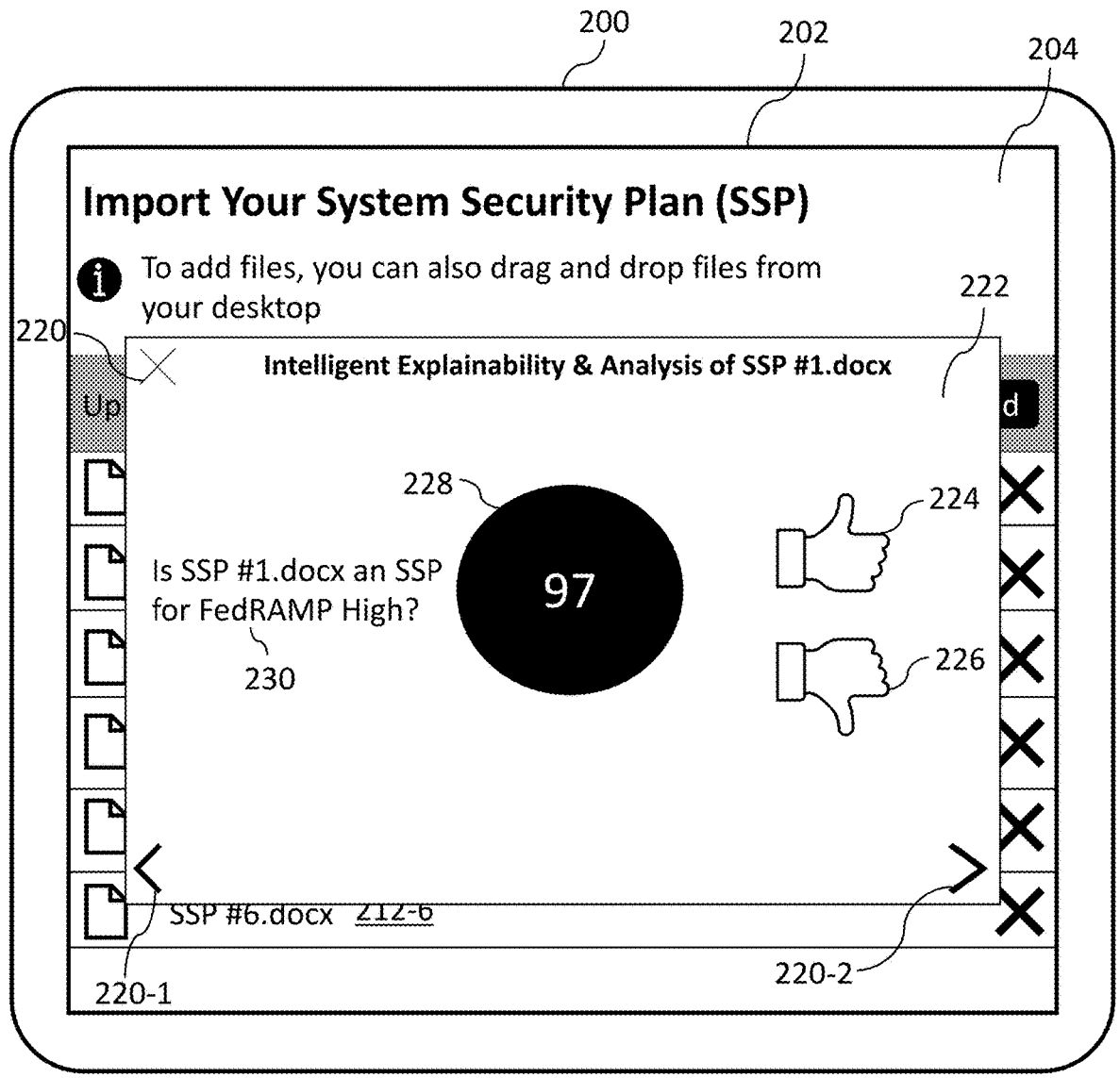
Figure 2G:
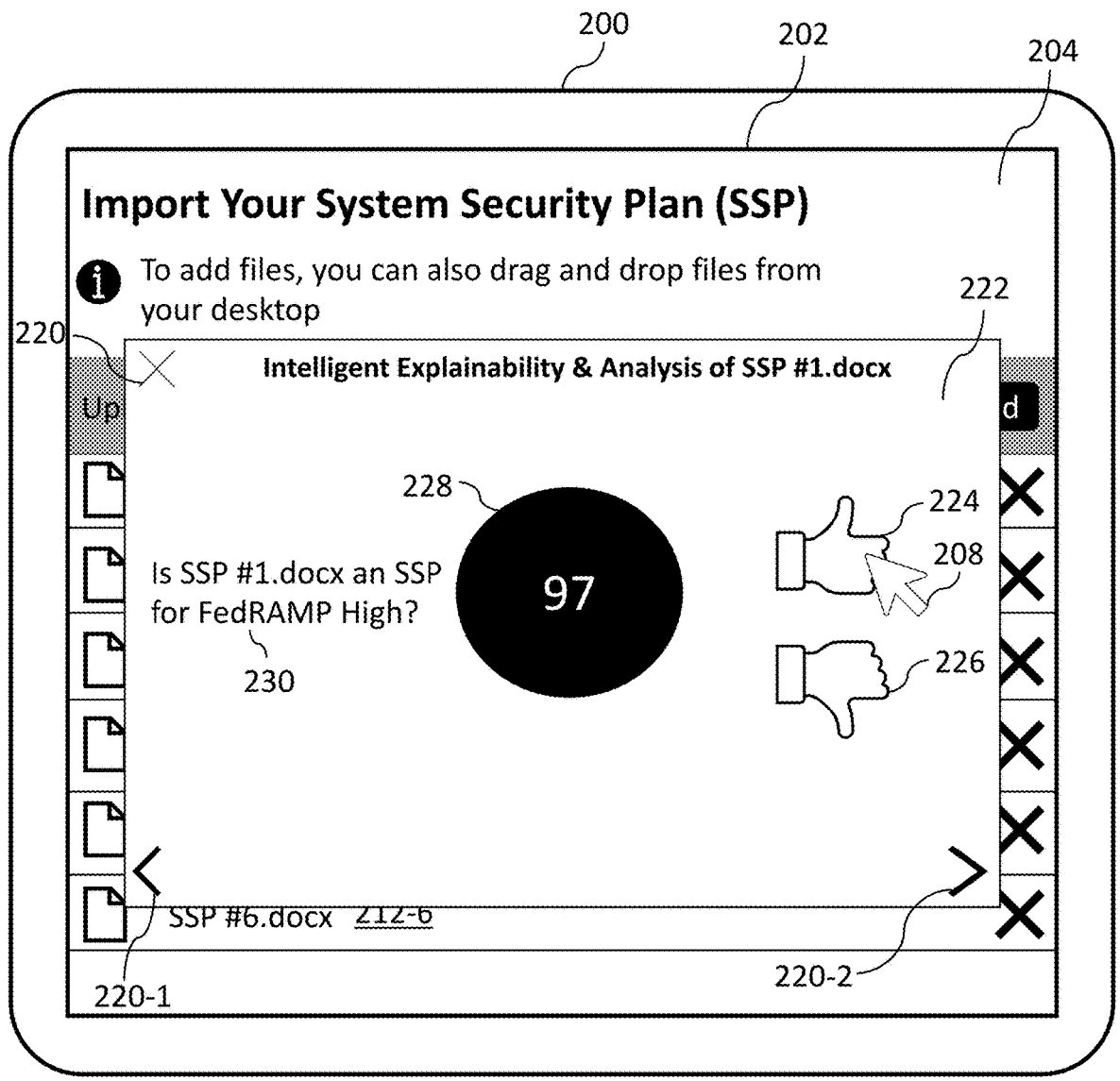
Figure 2H:
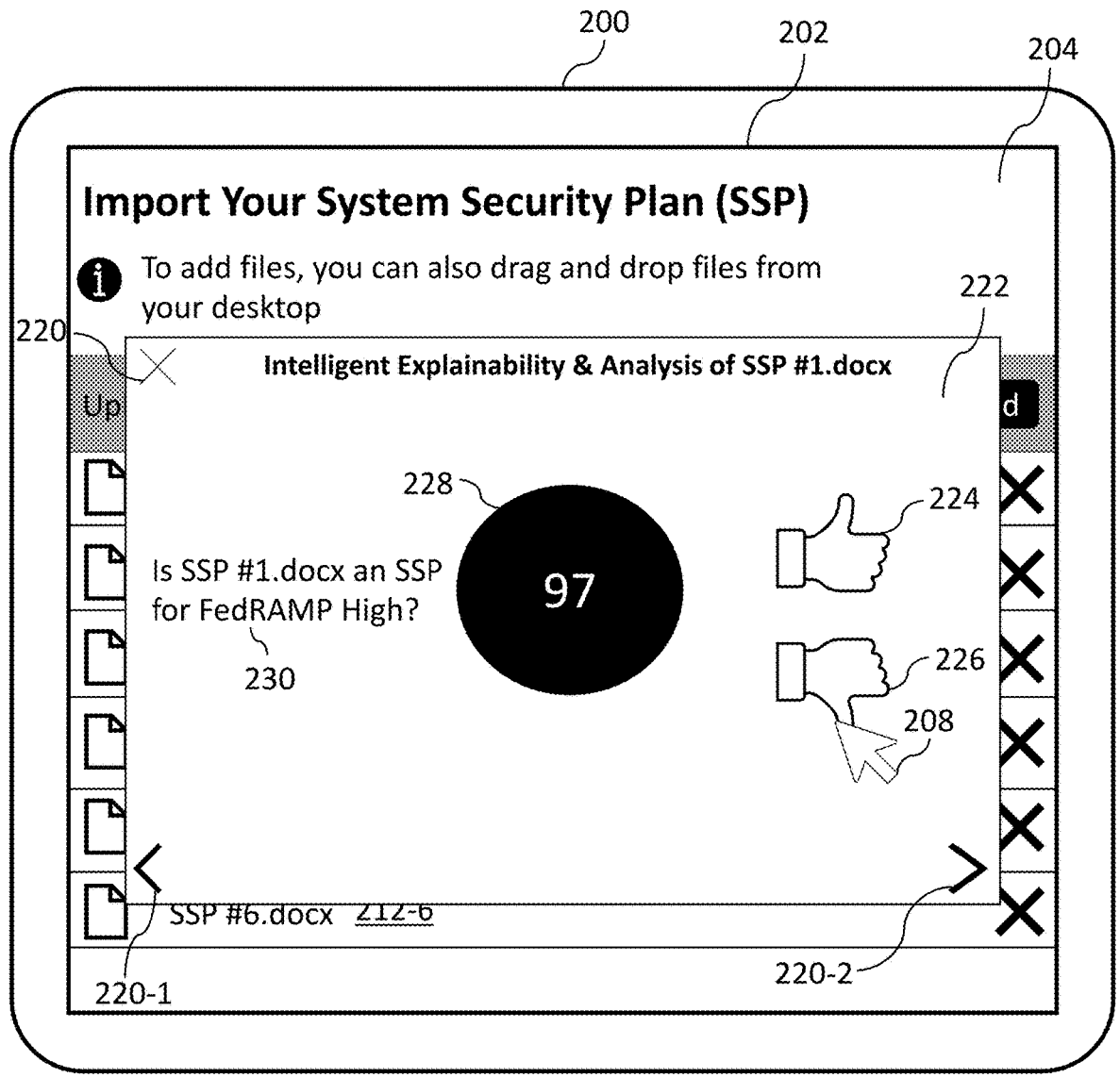
Figure 21:
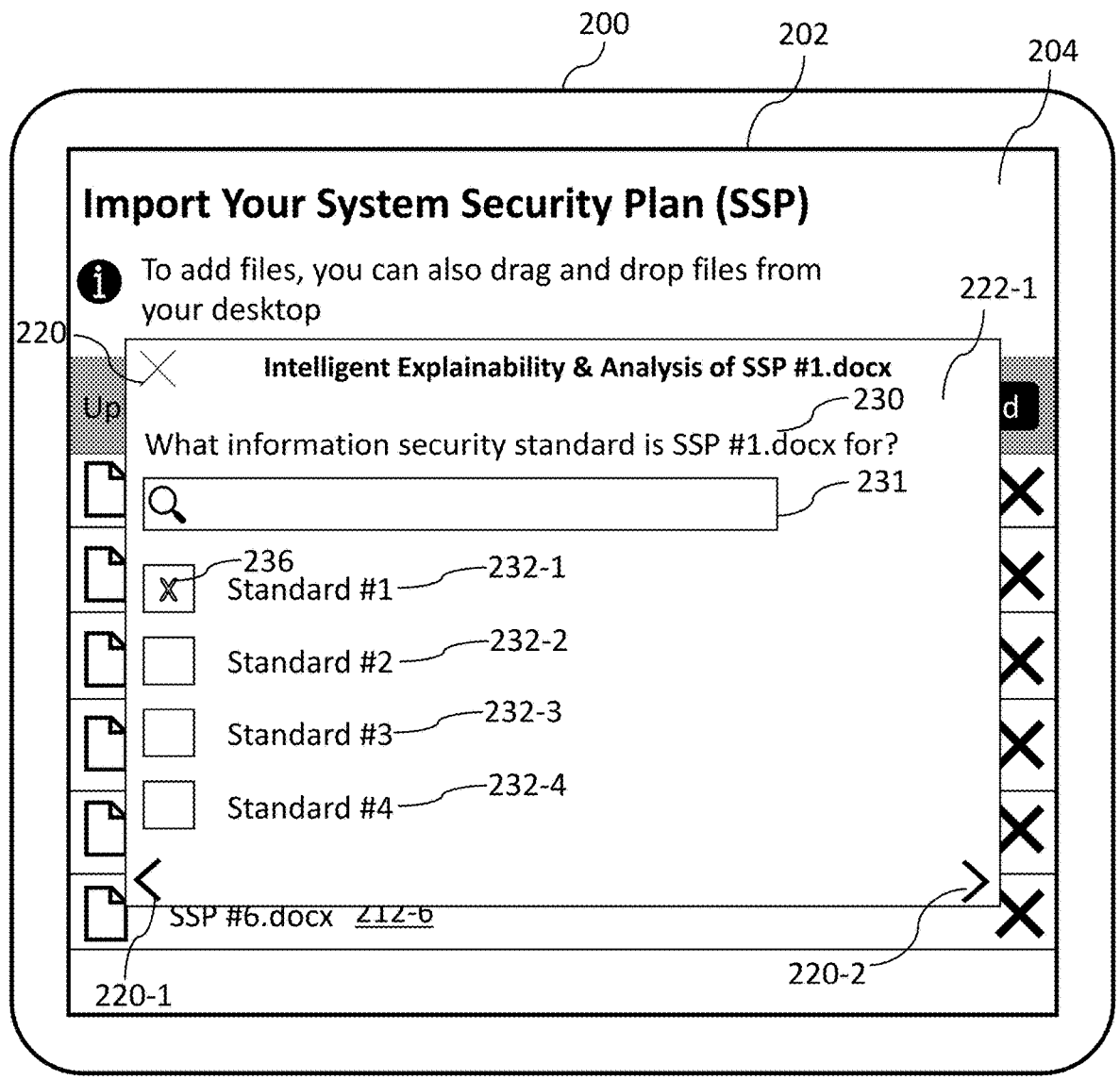
Figure 2J:
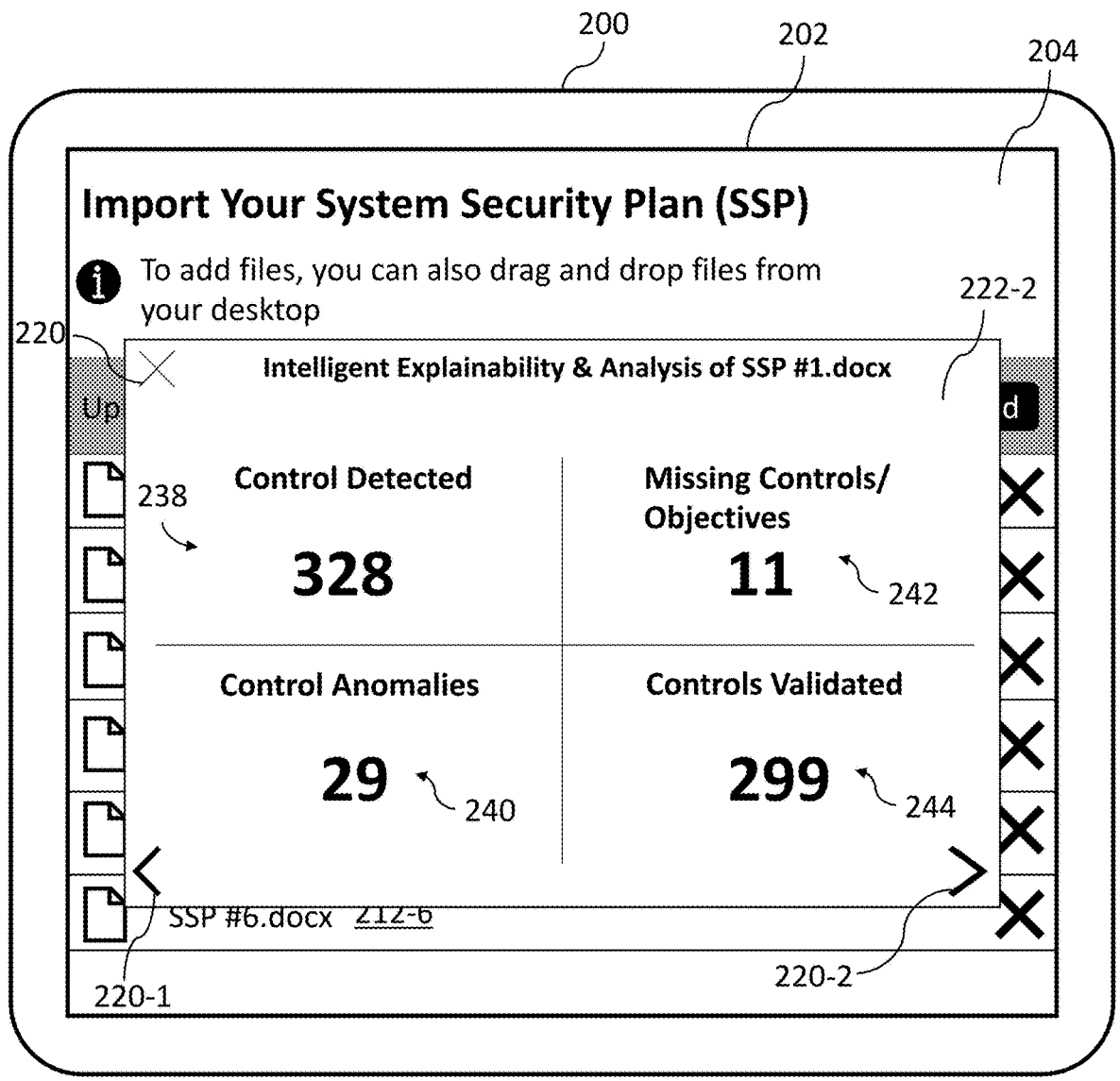
Figure 2K:
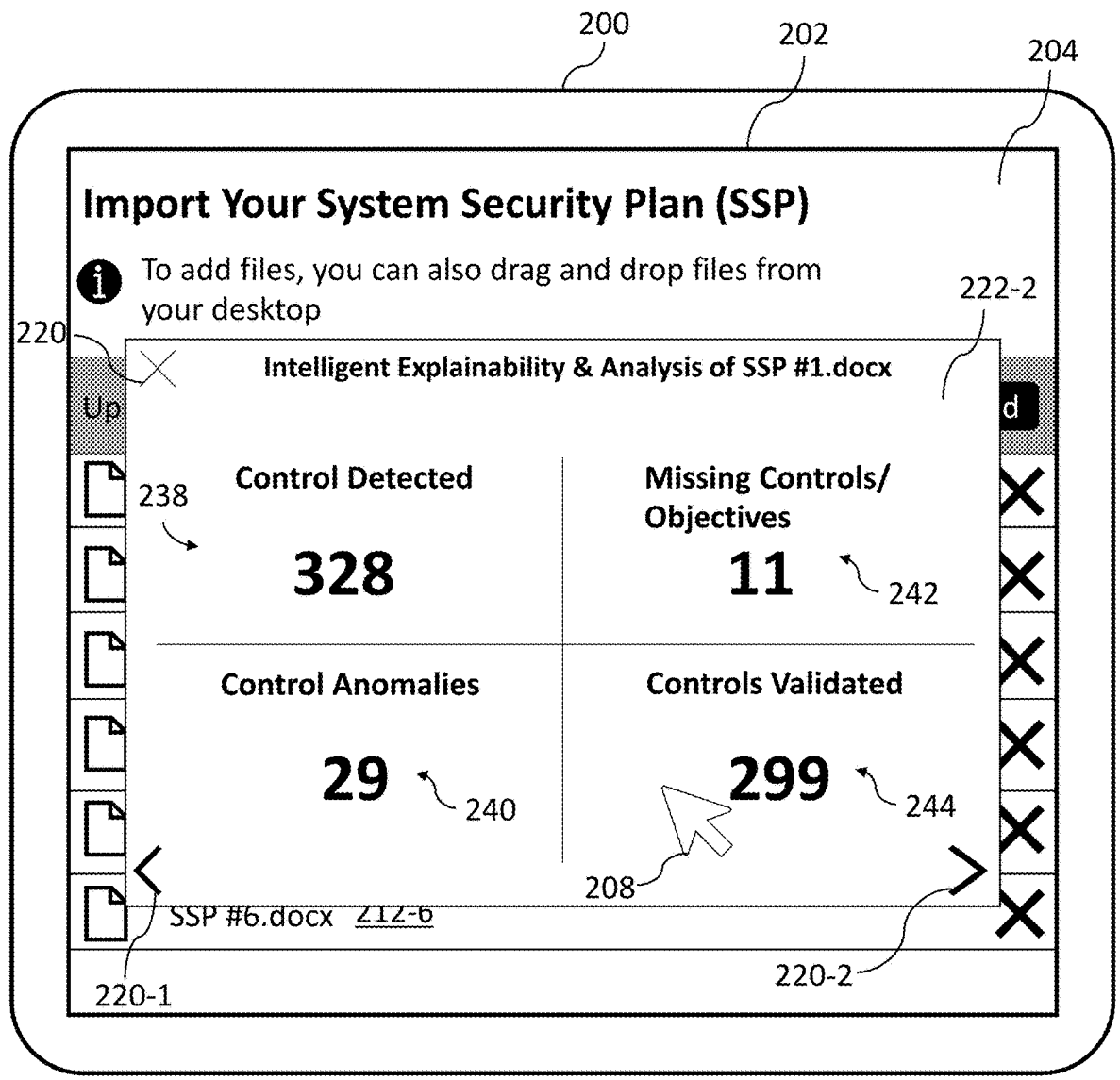
Figure 2L:
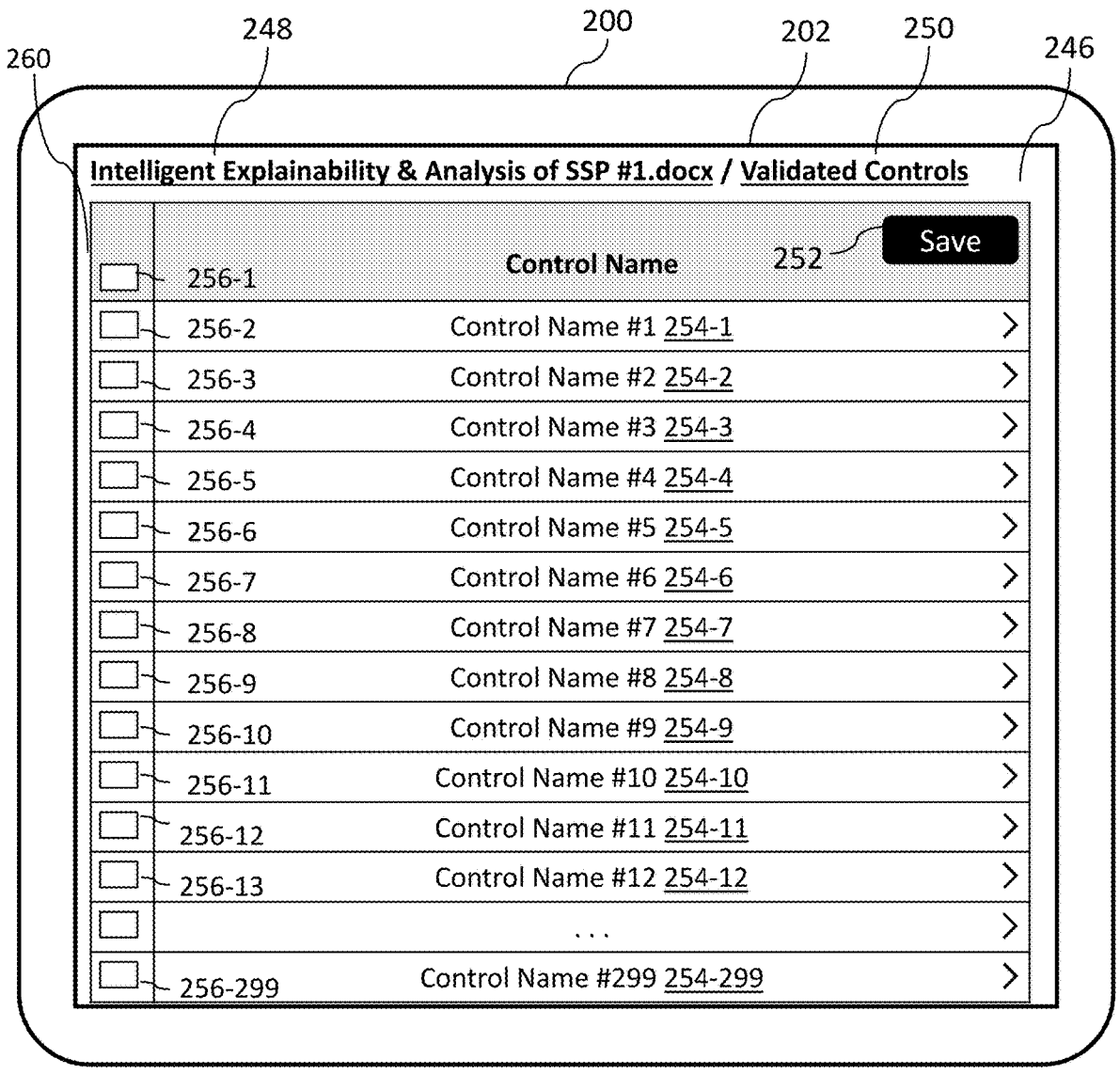
Figure 2M:
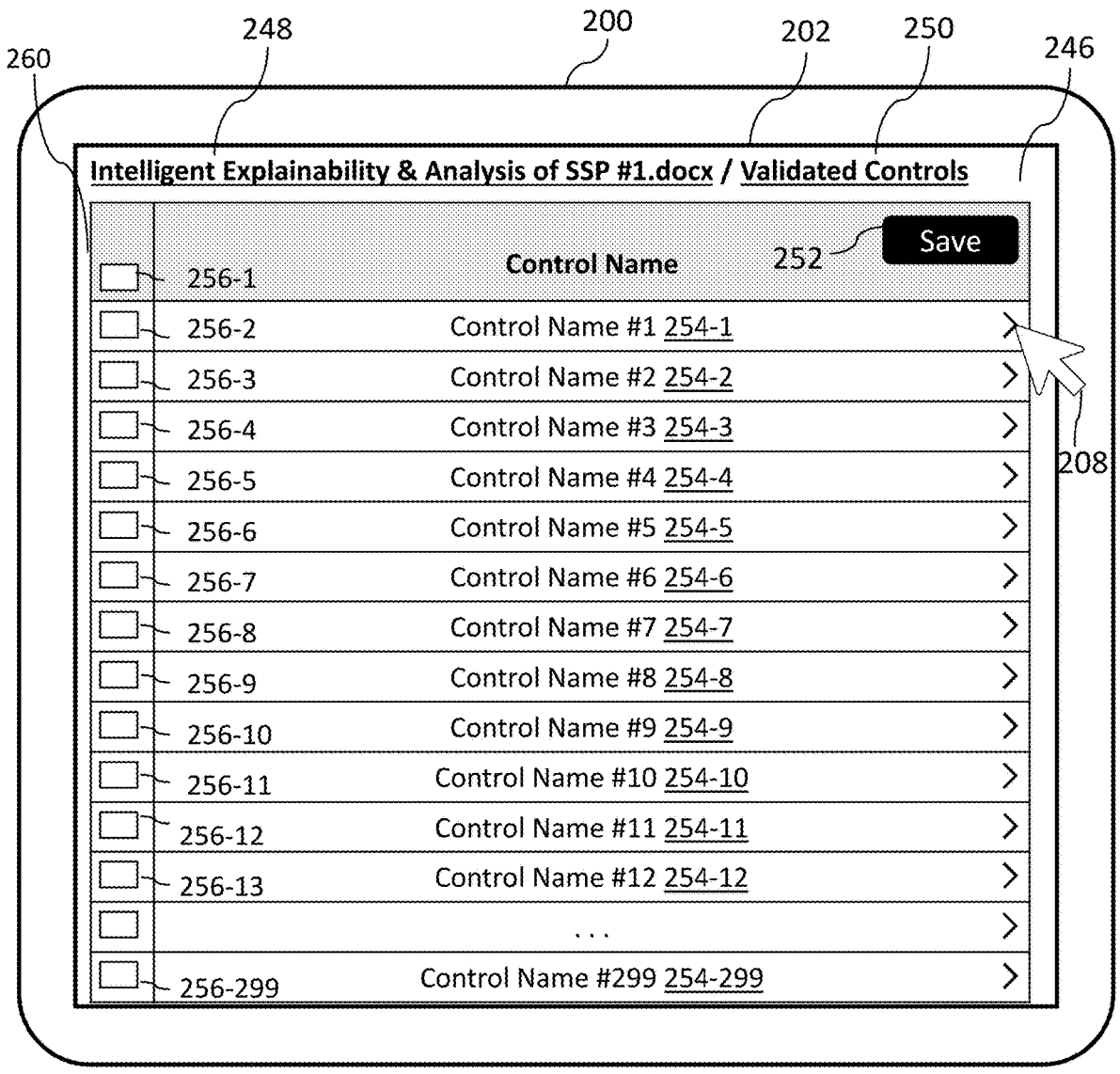
Figure 2N:
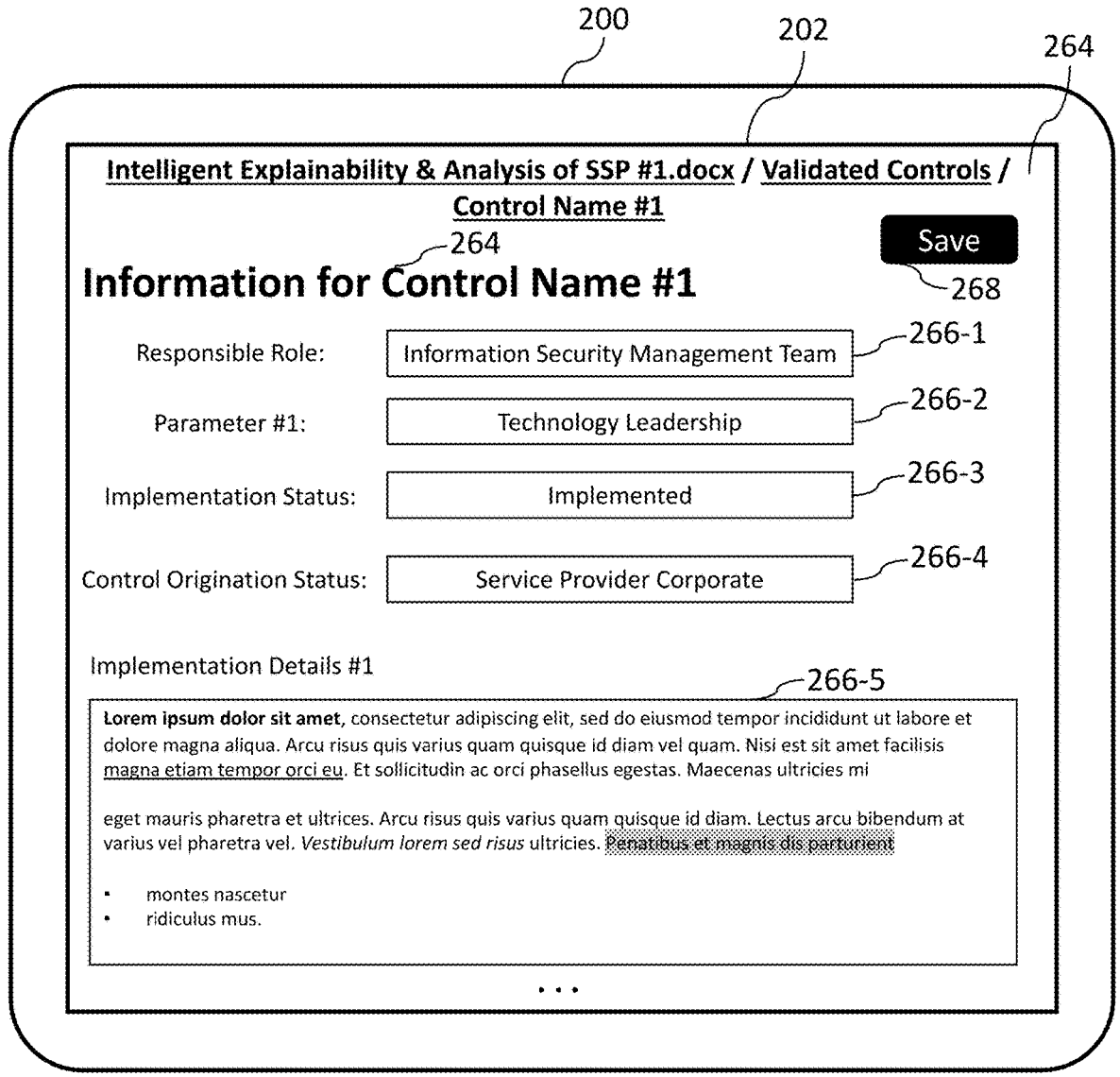
Figure 2O:
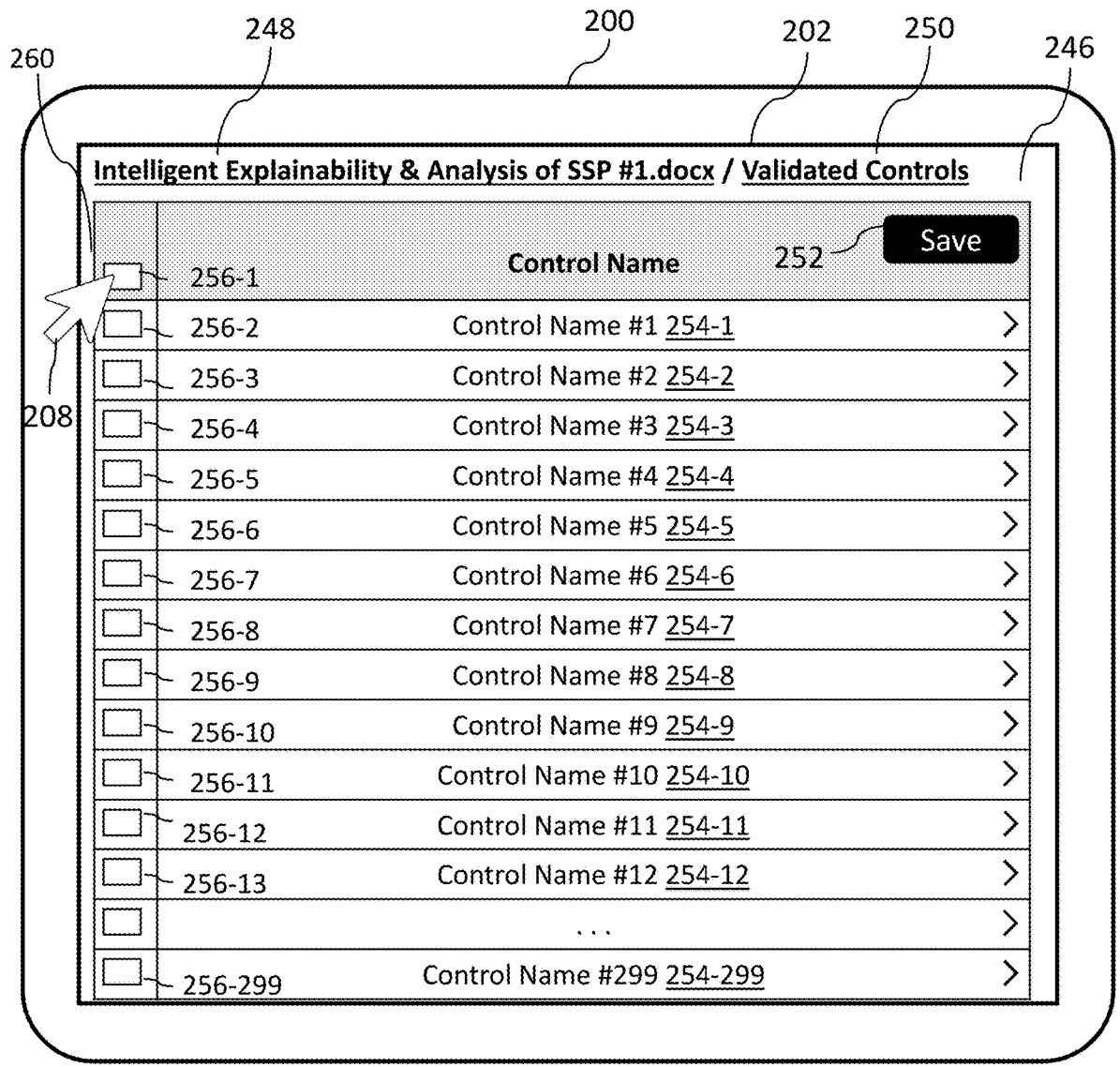
Figure 2P:
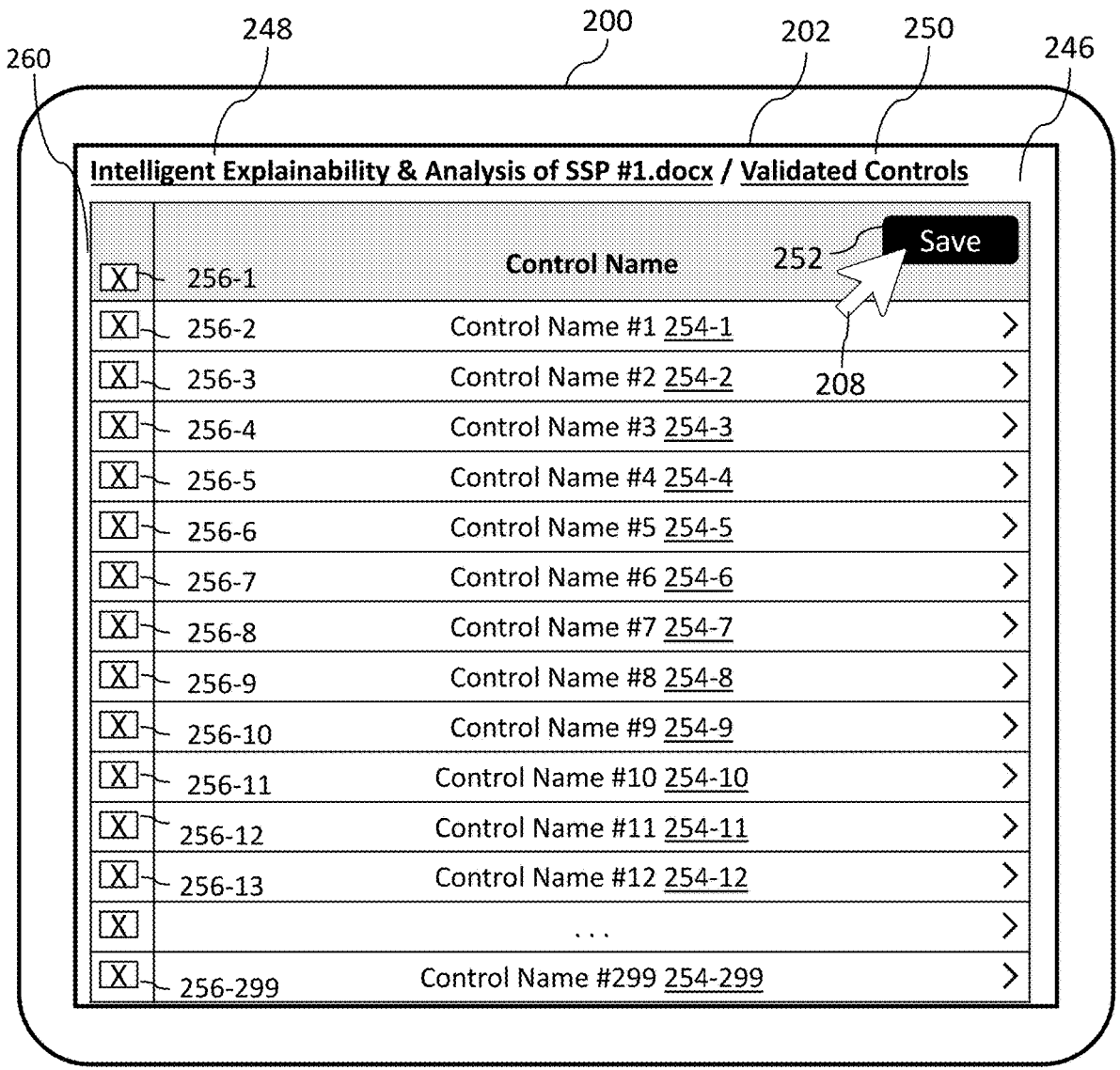
Figure 2Q:
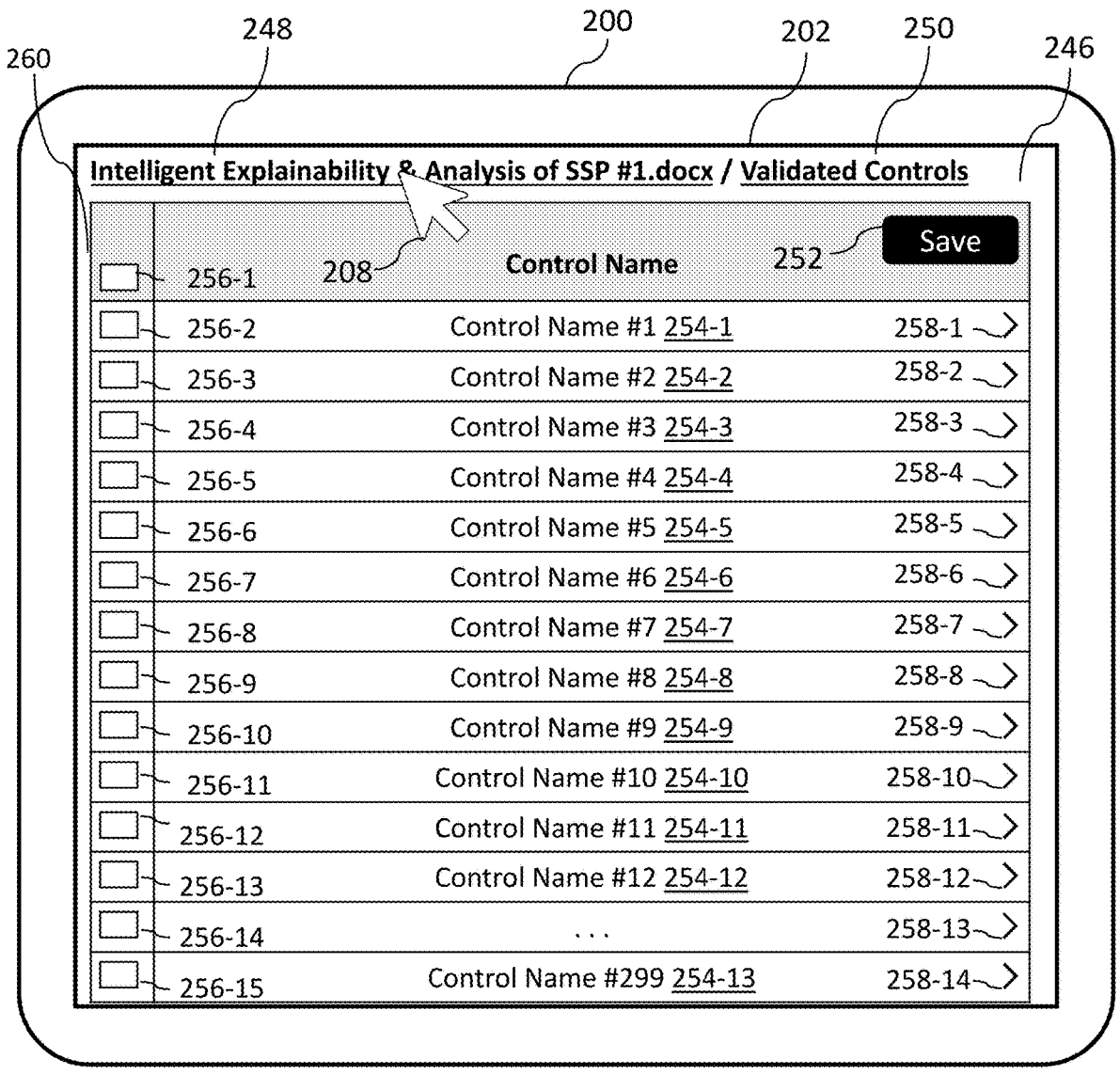
Figure 2R:
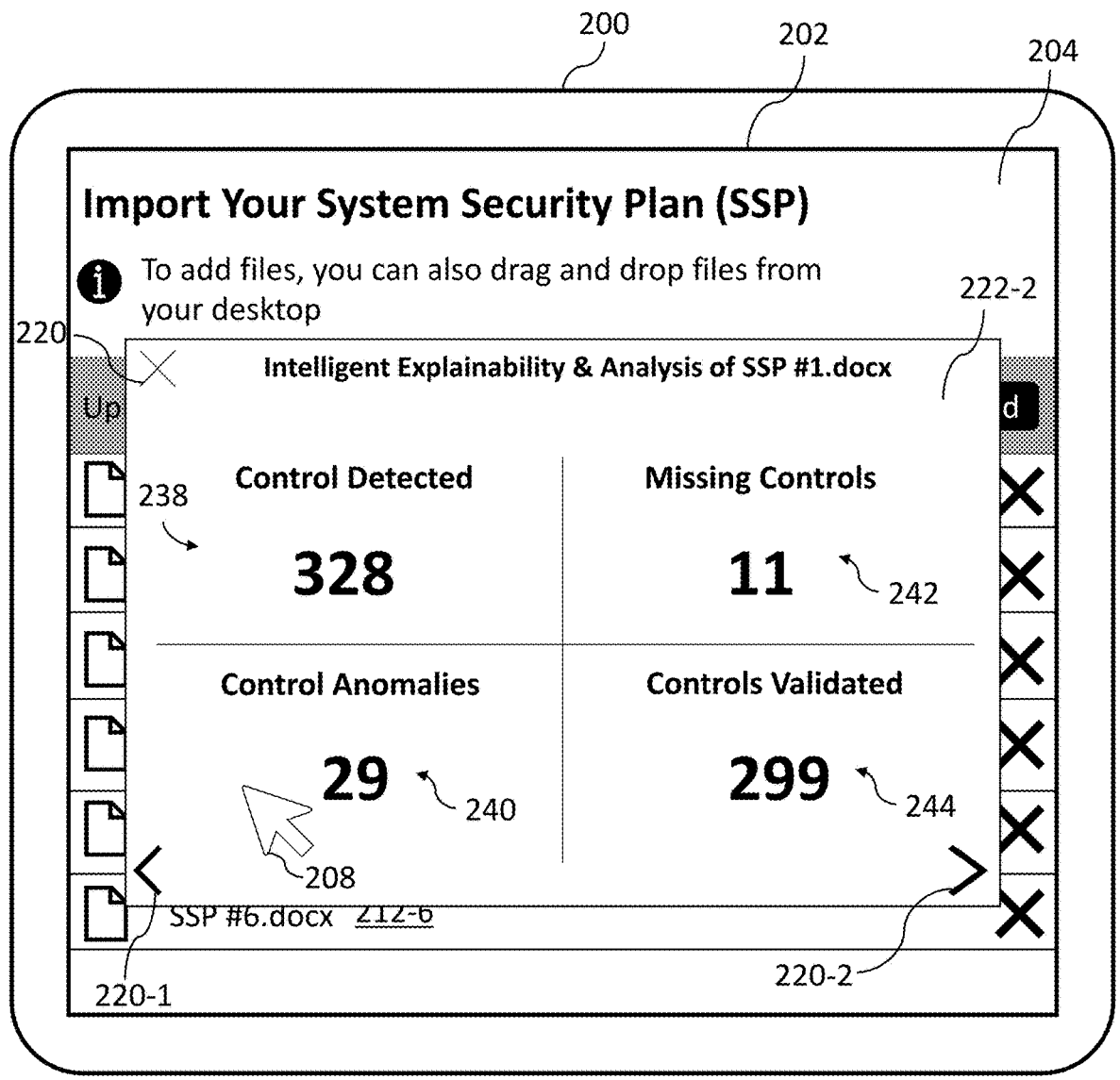
Figure 2S:
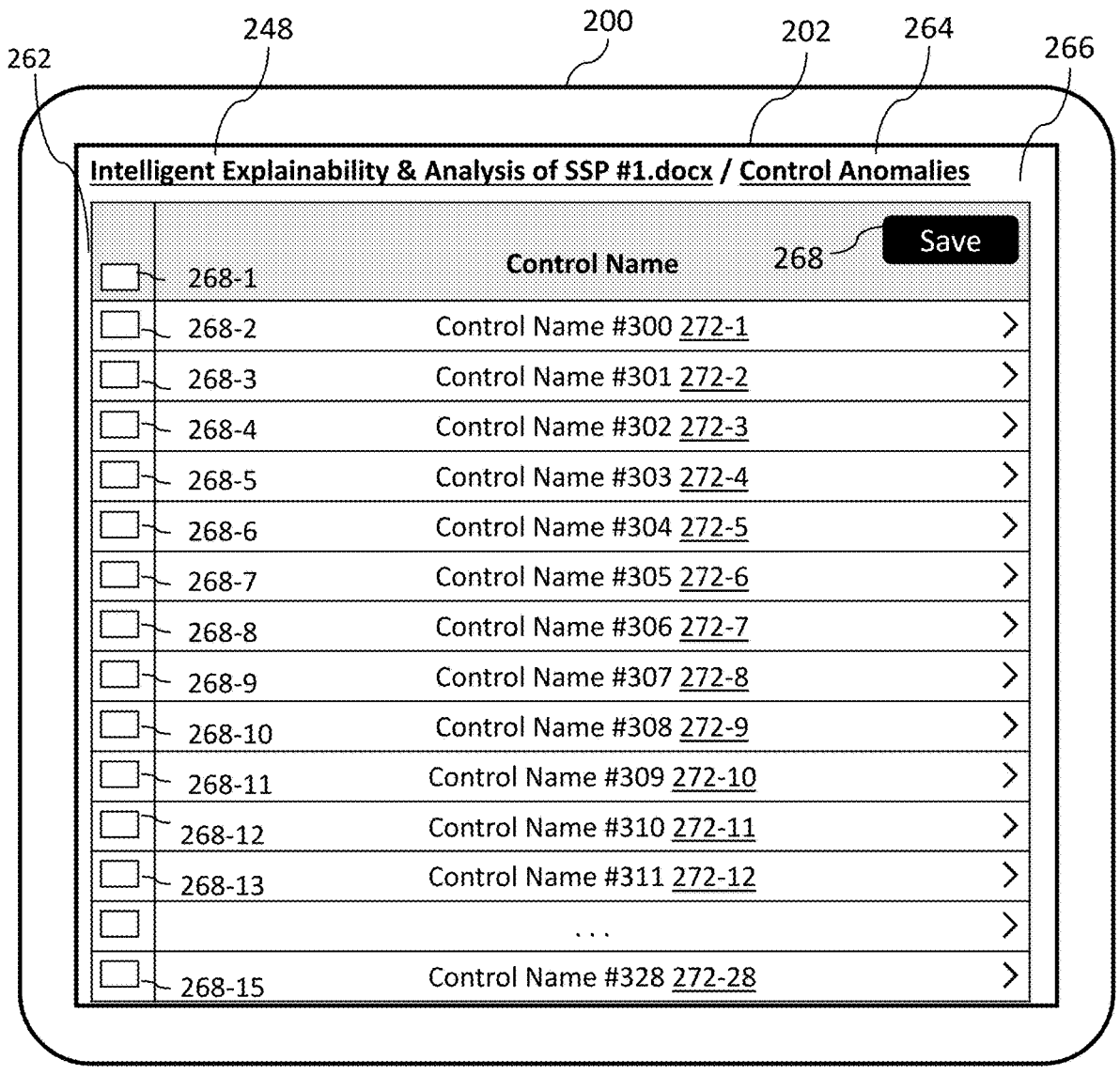
Figure 2T:
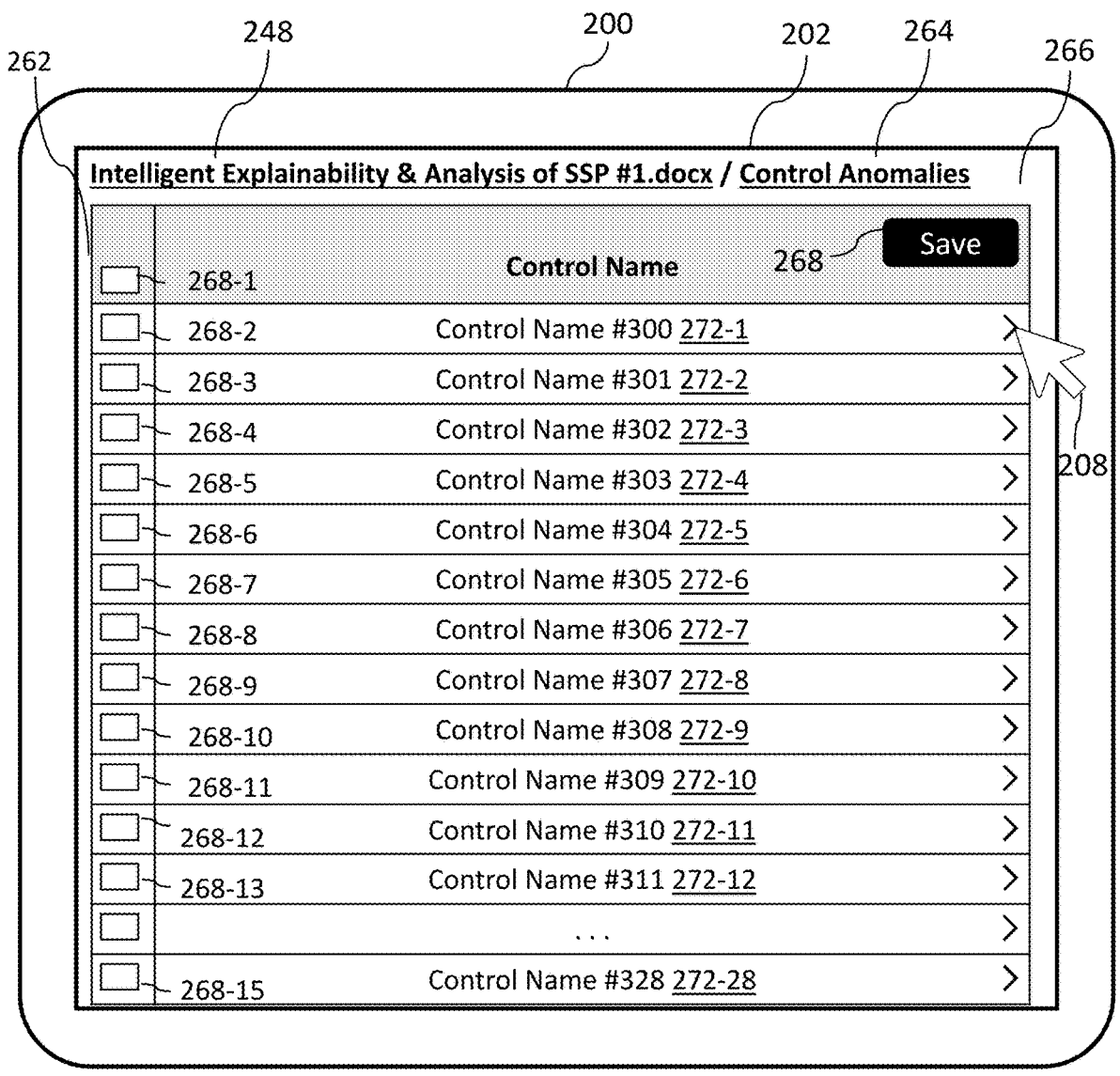
Figure 2U:
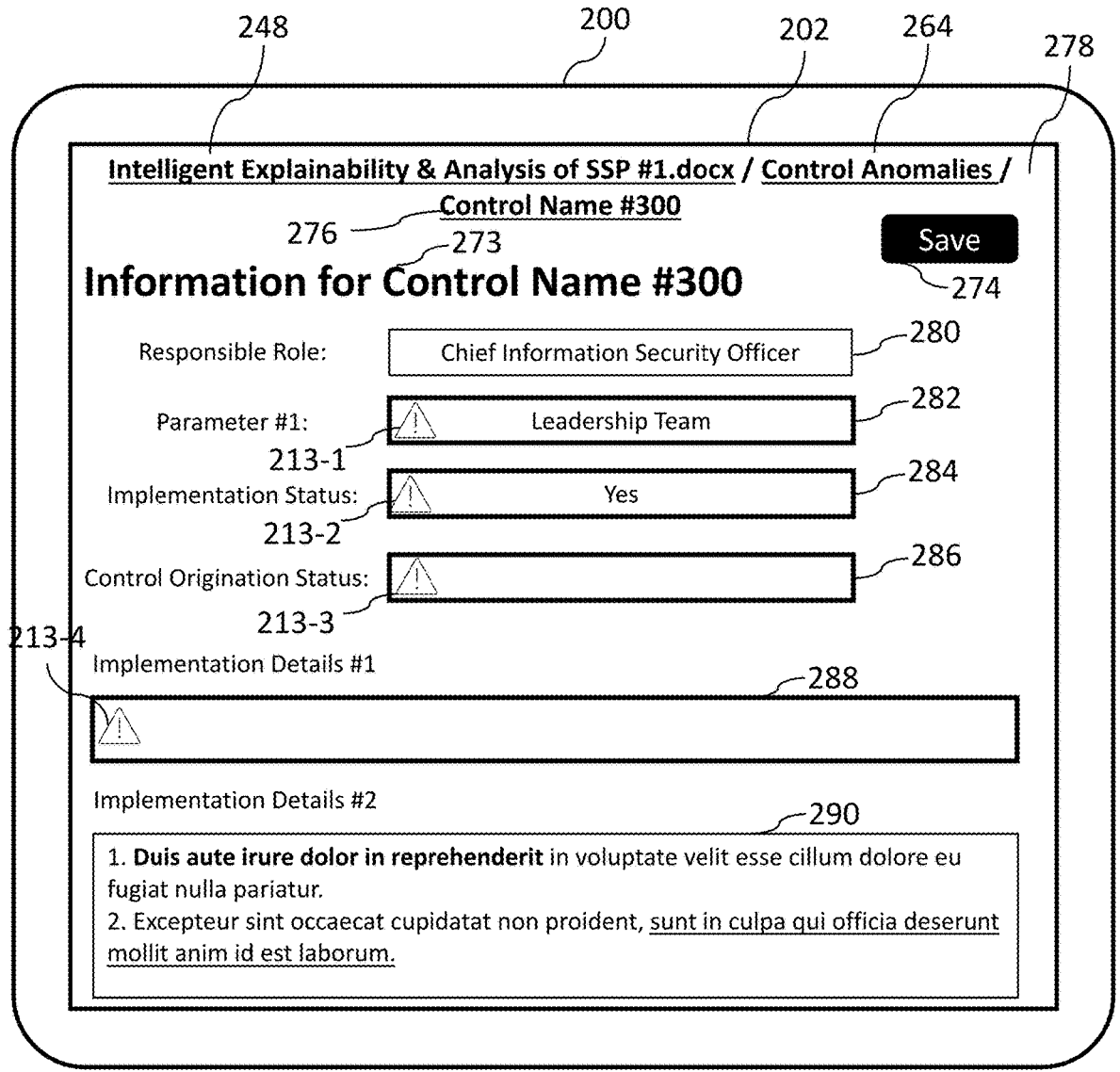
Figure 2V:
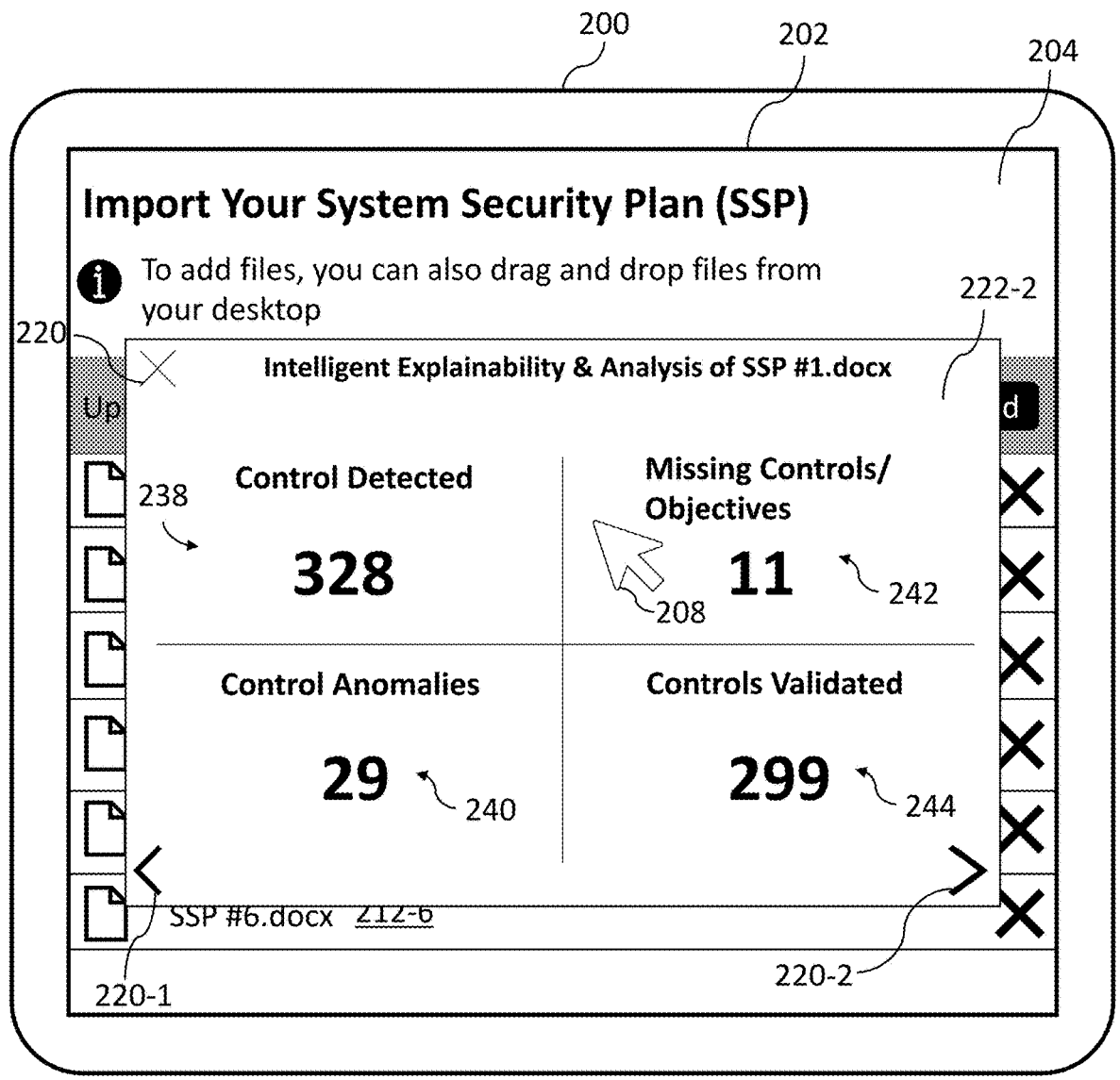
Figure 2W:
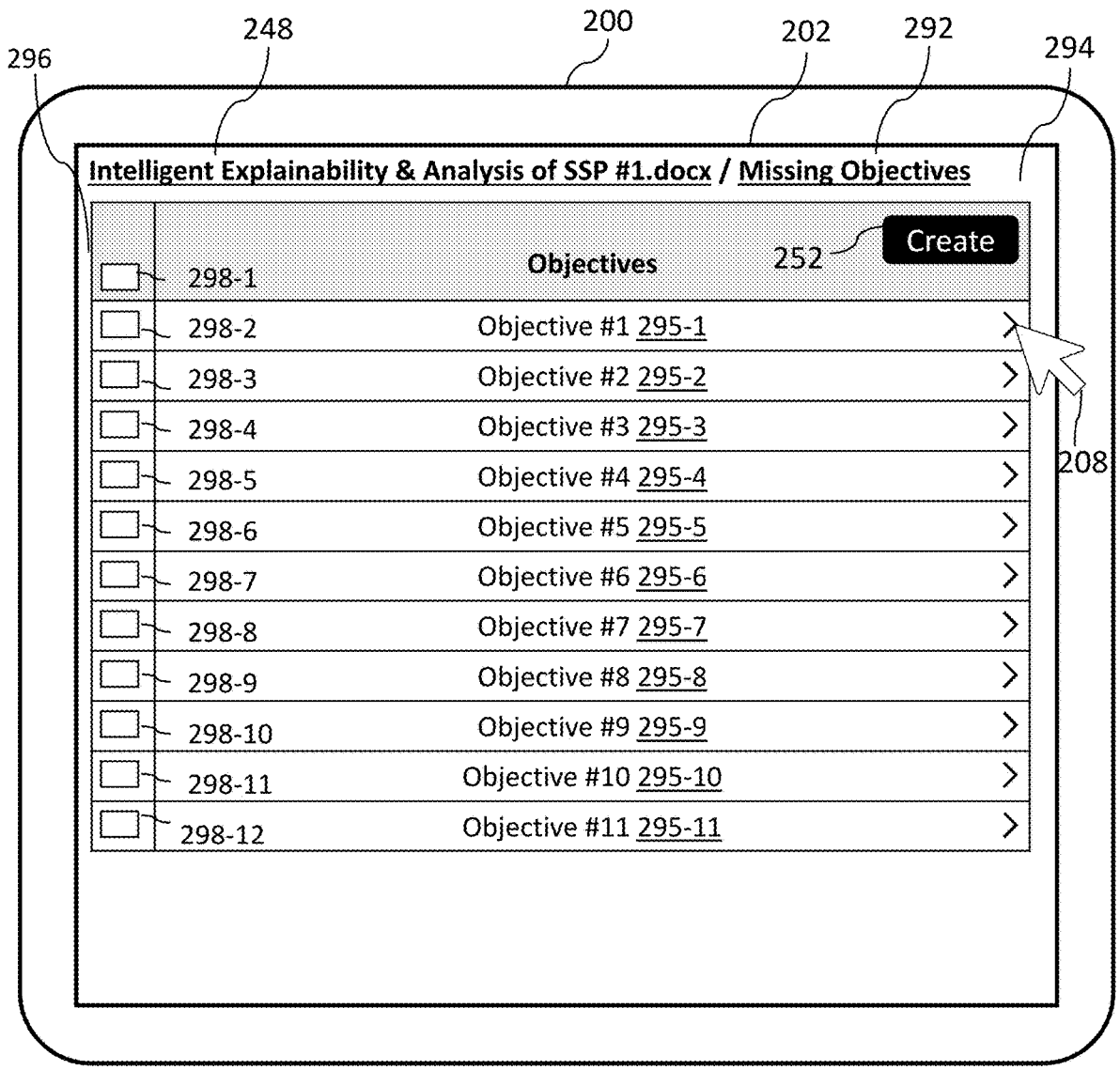

FIGS. 2A-2WW illustrate examples of how an electronic device (or an information security service) creates one or more information security programs and/or generates one or more information security artifacts in accordance with some embodiments of the disclosure. The embodiments in these figures are used to illustrate the processes described below, including the processes described with reference to method 300. Although FIGS. 2A-2WW illustrate various examples of ways an information security service (or an electronic device) is able to perform the processes described below with reference to the method 300, it should be understood that these examples are not meant to be limiting, and the information security service (or the electronic device) is able to perform one or more processes described below with reference to the method 300 in ways not expressly described with reference to FIGS. 2A-2WW.

FIG. 2A illustrates an electronic device 200 that includes a display generation component 202. In some embodiments, the display generation component 202 optionally displays one or more user interfaces that include various content and/or user interface elements provided by an information security service. For example, in FIG. 2A, the electronic device 200 is displaying a user interface 204 via the display generation component 202. The display generation component 202 optionally displays the user interface 204 after the electronic device 200 received one or more inputs for accessing an information security service (e.g., after a user of the electronic device 200 logged into a subscriber account of the information security service and navigated to the user interface 204). For example, in FIGS. 2A-2WW, the electronic device 200 is currently displaying user interfaces corresponding to Subscriber A because Subscriber A is currently logged into the information security service at the electronic device 200. It should be understood that, in some embodiments, if a different subscriber of the information security service (e.g., Subscriber B) was currently logged into the information security service instead of Subscriber A, the electronic device 200 would optionally display user interfaces associated with that subscriber (e.g., Subscriber B) instead of displaying user interfaces associated with Subscriber A as illustrated in FIGS. 2A-2WW. It shall be noted that the expression "information security service" may also be referred to herein as "cybersecurity data handling and governance service" or "cybersecurity service." Thus, the terms "information security" and "cybersecurity" may be used interchangeably herein.

In some embodiments, the electronic device 200 (or the information security service or the cybersecurity data handling and governance service) receives a sequence of one or more inputs for transmitting (e.g., uploading) one or more information security artifacts to the information security service. The one or more information security artifacts (e.g., two or more information security artifacts, three or more information security artifacts, four or more information security artifacts, or any number of information security artifacts) that may be uploaded to the information security service may optionally be information security artifacts that Subscriber A may have used to certify a system, service, product, and/or device (e.g., provided by Subscriber A) to one or more information security standards, such as GDPR, HIPAA, ISO 27001, NIST 800-53, NIST 800-171, PCI-DSS, SOC1, SOC 2, SOX, FedRAMP Low, FedRAMP Moderate, FedRAMP High, etc. It shall be noted that if two or more information security artifacts are uploaded to the information security service, the two or more information security artifacts may be distinct and not easily correlatable to one another (e.g., a FedRAMP information security artifact and an ISO 27001 information security artifact).

Information security standards, as generally referred to herein, are published by regulatory bodies and include one or more sections, which in turn include one or more objectives that may need to be satisfied in order to meet the requirements of a respective information security standard—as described in more detail with reference to FIGS. 2RR-2UU. In some examples, the one or more information security artifacts transmitted to and received by the information security service correspond to different regulatory bodies. For example, a first information security artifact (e.g., an ISO 27001 information security artifact) and a second information security artifact (e.g., a FedRAMP High information security artifact) that is received by the information security service may be related to different regulatory bodies (e.g., the regulatory body of the FedRAMP high information security standard may be different than the regulatory body of the ISO 27001 information security standard).

For example, the NIST 800-53 standard is published by the National Institute of Standards and Technology (NIST) and includes 18 sections corresponding to 921 objectives that may need to be implemented (or planned to be implemented) by an appropriate system, service, product, and/or device to meet the requirements of the NIST 800-53 standard. A subset of the sections and objectives for the NIST 800-53 will now be briefly described below, but for brevity all of the sections and objectives of the NIST 800-53 standard will not be described nor will all of the sections and objectives of the other information security standards mentioned above be described as one of ordinary skill in the art would be familiar with the sections, standards and/or objectives required by each respective information security standard.

A subset of the sections in the NIST 800-53 are as follows: a first section in the NIST 800-53 information security standard is directed to Access Control (AC), a second section in the NIST 800-53 information security standard is directed to Awareness and Training (AT), a third section in the NIST 800-53 information security standard is directed to Audit and Accountability (AU), a fourth section in the NIST 800-53 information security standard is directed to Configuration Management (CM), and a fifth section in the NIST 800-53 information security standard is directed to Identification and Authentication (IA). The first section of the NIST 800-53 standard (Access Control) corresponds to 126 distinct objectives that may need to be met by an appropriate system, service, product, device, etc. to satisfy the requirements set forth by the first section of the NIST 800-53 information security standard. Similarly, the second section of the NIST 800-53 information security standard (Awareness and Training), the third section of the NIST 800-53 information security standard (Audit and Accountability), the fourth section of the NIST 800-53 information security standard (Configuration Management), and the fifth section (Identification and Authentication) of the NIST 800-53 information security standard (Identification and Authentication) includes 11 (e.g., distinct) objectives, 63 (e.g., distinct) objectives, 55 (e.g., distinct) objectives, and 57 (e.g., distinct) objectives that may need to be satisfied by an appropriate system, service, product, device, etc. to meet the requirements of the second, third, and fourth sections of the NIST 800-53, respectively. For example, a first objective of the 126 objectives in the first section (Access Control) of the NIST 800-53 information security standard is optionally related to single-sign on implementation requirements, a second objective of the 126 objectives in the first section (Access Control) of the NIST 800-53 information security standard is optionally related to concurrent session control implementation requirements, a third objective of the 126 objectives in the first section (Access Control) of the NIST 800-53 information security standard is optionally related to session lock implementation requirements, a fourth objective of the 126 objectives in the first section (Access Control) of the NIST 800-53 information security standard is optionally related to pattern-hiding display implementation requirements. Example requirements for a respective objective will be described in more detail later, but one of ordinary skill in the art would understand that each objective in the NIST 800-53 information security standard may need to be implemented (or planned to be implemented) via one or more information security controls in the manner described by that objective for an appropriate system, service, product, device, etc. to satisfy the NIST 800-53 information security standard. Stated another way, an information security standard may include one or more distinct sets of cybersecurity objectives (e.g., a first set of cybersecurity objectives, a second set of cybersecurity objectives, or any number of cybersecurity objectives).

In some examples, if Subscriber A wishes to demonstrate that System A, Service A, Product A, and/or Device A satisfies the requirements of an information security standard, Subscriber A may submit to the regulatory body of that information security standard (or to an entity (e.g., auditor, assessment organization, etc.) acting on behalf of the regulatory body) one or more information security artifacts (e.g., one or more cybersecurity artifacts) indicating/describing how System A, Service A, Product A, and/or Device A implements one or more information security controls (e.g., one or more cybersecurity controls) in a manner that satisfies the one or more sections and the one or more objectives set forth in the information security standard. The one or more information security artifacts that may be submitted to a target regulatory body may need to be periodically resubmitted (e.g., on a monthly basis, a quarterly basis, a yearly basis, etc.) to maintain compliance with the information security standard for which the one or more information security artifacts were submitted. In some embodiments, these one or more information security artifacts that are submitted to the regulatory body (or to the entity acting on behalf of the regulatory body) must be in a format/structure that is accepted/approved by (e.g., structurally compliant with) that particular regulatory body. For example, if Subscriber A wishes to demonstrate that System A, Service A, Product A, and/or Device A satisfies the FedRAMP High information security standard, Subscriber A may be required to submit to the regulatory body of the FedRAMP High information security standard (or to the entity acting on behalf of the regulatory body), an information security artifact that is structured in a format approved by the regulatory body of the FedRAMP High information security, and that includes a description of the information security controls in use (or that are planned to be in use) by System A, Service A, Product A, and/or Device A, including how those information security controls are implemented in a manner that satisfies the sections and objectives of the FedRAMP High information security standard.

In some examples, if Subscriber A submits to the regulatory body of a respective information security standard an information security artifact (e.g., a cybersecurity artifact) that is not structured in a format approved by the regulatory body of that respective information security standard (e.g., out of scope, not structurally compliant), the regulatory body (or the entity acting on behalf of that regulatory body) will not accept the information security artifact and/or evaluate whether System A, Service A, Product A, and/or Device A satisfies the respective information security standard. For ease of description, in the remaining parts of the disclosure, whether an information security artifact (e.g., cybersecurity artifact, cybersecurity asset, or the like) satisfies the format required by a regulatory body (or by an entity acting on behalf of that regulatory body) of a respective information security standard may generally be referred to herein as evaluation-criteria or submittal-criteria defined by the respective information security standard (e.g., if the structure/format of the information security artifact is in an approved format by a regulatory body (or by an entity acting on behalf of the regulatory body) such that the information security controls of a system, service, product, and/or device described in the information security artifact may be evaluated to or against an information security standard, then the information security artifact satisfies evaluation-criteria defined by that information security standard). Conversely, if the structure/format of the information security artifact is not in an approved format (or structure) by a regulatory body (or by an entity acting on behalf of the regulatory body) such that the information security controls of a system, service, product, and/or device described in the information security artifact cannot be evaluated to or against the information security standard, then the information security artifact does not satisfy evaluation-criteria defined by that information security standard. Examples of when an information security artifact is determined to satisfy evaluation-criteria and not satisfy evaluation-criteria of an information security standard will be described in further detail with reference to FIGS. 2A-2WW.

As shown in FIG. 2A, the user interface 204 of the information security service includes a selectable option 206. In some embodiments, the selectable option 206, when selected, optionally causes a file browsing user interface to be displayed, which is optionally a user interface of the operating system running on the electronic device 200 or a user interface of the information security service. In FIG. 2B, the electronic device 200 (or the information security service or the cybersecurity data handling and governance service) detected an input selecting the selectable option 206 (indicated by mouse 208 selecting the selectable option 206). In FIG. 2C, in response to the electronic device 200 (or the information security service) detecting the input selecting the selectable option 206, the electronic device 200 (or the information security service) optionally displays a file browsing user interface 235-1 that includes a first selectable option 210-1 that, when selected, optionally causes the electronic device 200 (or the information security service) to display one or more representations of one or more documents/files that have recently been accessed/opened at the electronic device 200, a second selectable option 210-2 that, when selected, optionally causes the electronic device 200 to display one or more representations of one or more applications currently installed on the electronic device 200, a third selectable option 210-3 that, when selected, optionally causes the electronic device 200 to display one or more representations of one or more documents/files that are currently located at the "desktop" or "home" location/folder directory on the electronic device 200, a fourth selectable option 210-4 that, when selected, optionally causes the electronic device 200 to display one or more representations of one or more documents/files that are currently located at the "documents" location/folder directory on the electronic device 200, and a fifth selectable option 210-5 that, when selected, optionally causes the electronic device 200 to display one or more representations of one or more documents/files that are currently located at the "downloads" location/folder directory on the electronic device 200. It should be understood that, in some embodiments, the browsing user interface 235-1 may include fewer or additional selectable options than the selectable options 210-1 thru 210-5 illustrated in FIG. 2C for accessing additional or different locations/folder directories stored on the electronic device 200.

As shown in FIG. 2C, the selectable option 210-3 is currently selected (e.g., has focus), and as a result, the file browsing user interface 235-1 is currently displaying one or more representations of files/documents that are located in the directory named "desktop" on the electronic device 200, including a first representation of a first information security artifact 212-1 named "SSP #1.docx," a second representation of a second information security artifact 212-2 named "SSP #2.docx," a third representation of a third information security artifact 212-3 named "SSP #3.docx," a fourth representation of a fourth information security artifact 212-4 named "SSP #4.docx," a fifth representation of a fifth information security artifact 212-5 named "SSP #5.docx," and a sixth representation of a sixth information security artifact 212-6 named "SSP #6.docx." In some embodiments, the first, second, third, fourth, fifth, and/or sixth information security artifacts may satisfy (or may be in the process of attempting to satisfy) evaluation-criteria defined by a first, second, third, fourth, fifth, and/or sixth information security standard, respectively. In some embodiments, different information security standards have different evaluation-criteria, thus an information security artifact that satisfies evaluation-criteria of a first information security standard optionally does not necessarily satisfy evaluation-criteria of a second information security standard. It should be understood that while the first, second, third, fourth, fifth, and sixth information security artifacts are in the ".docx" file format, the information security artifacts could optionally be in other file formats while still satisfying respective evaluation-criteria of an information security standard (e.g., the content and the arrangement (or structure) of such content in the information security artifact is what determines if evaluation-criteria of an information security is satisfied and not the file format of an information security artifact).

Additionally, as shown in FIG. 2C, the representations 212-1 thru 212-6 have been selected for upload to the information security service (indicated by indications 214-1 thru 214-6). In FIG. 2C, while the representations 212-1 thru 212-6 have been selected, the electronic device 200 (or the information security service) detects another input selecting selectable option 210-7 (indicated by mouse 208 selecting the selectable option 210-7). In response to the electronic device 200 (or the information security service) detecting the selection of selectable option 210-7, the electronic device 200 optionally transmits the information security artifacts corresponding to the representations 212-1 thru 212-6 (SSP #1.docx-SSP #6.docx) to the information security service, as shown in FIG. 2D. If, after detecting the selection of the representations 212-1 thru 212-6, the electronic device 200 detected an input selecting the selectable option 210-6 instead of the selectable option 210-7, the electronic device 200 optionally forgoes transmitting the information security artifacts corresponding to the representations 212-1 thru 212-6 (SSP #1.docx-SSP #6.docx) to the information security service.

In FIG. 2D, the information security service, via one or more computers, has received the information security artifacts that were transmitted in FIG. 2C, and thus, the user interface 204 now includes the representations 212-1 thru 212-6 corresponding to the six (6) transmitted security artifacts by the electronic device 200 (SSP #1.docx-SSP #6.docx) that are optionally satisfying evaluation-criteria defined by a first, second, third, fourth, fifth, and sixth information security standard, respectively. The user interface 204 also optionally includes selectable options 216-1 thru 216-6 to remove the first, second, third, fourth, fifth, and/or sixth information security artifacts from the information security service. It should be understood that while FIGS. 2A-2D illustrate a scenario in which the electronic device 200 transmitted 6 information security artifacts (SSP #1.docx thru SSP #6.docx) to the information security service, the electronic device 200 could have submitted fewer or more information security artifacts (e.g., in accordance with how many representations of information security artifacts were selected when the electronic device 200 detected input directed to selectable option 210-7 in FIG. 2C). In some embodiments, the information security service (e.g., automatically) receives one or more information security artifacts from one or more computer systems or devices other than device 200, such as from a server, system, and/or a second electronic device that is in communication with the information security service.

In some embodiments, the electronic device 200 creates, in the information security service, one or more information security programs that correspond to the one or more information security artifacts that were transmitted to the information security service via one or more computes. Example operations and functions that can be performed with a respective information security program in the information security service will be described in detail later. In FIG. 2E, the electronic device 200 (or the information security service) has detected an input corresponding to a request to create, in the information security service, an information security program corresponding to each or a subset (e.g., two or more) of the information security artifacts transmitted by the electronic device 200 (indicated by mouse 208 selecting selectable option 218). In FIG. 2F, in response to the electronic device 200 detecting the input in FIG. 2E, the electronic device 200 (or the information security service) optionally initiates a process to create (or creates), in a web-accessible interface of the information security service, an information security program corresponding to each or a plurality of the information security artifacts transmitted by the electronic device 200. It should be understood that the steps described below related to the process of creating one or more information security programs corresponding to the one or more information security artifacts transmitted to the information security may be combined and/or omitted. In some embodiments, the order of the steps described below may be changed.

In some embodiments, the process of creating or constructing an information security program corresponding to a transmitted information security artifact includes determining (e.g., predicting) the information security standard(s) to which the information security artifact corresponds. For example, as shown in FIG. 2F, in response to the electronic device 200 (or the information security service) initiating a process to create an information security program (may also be referred to herein as a cybersecurity data catalogue) in the information security service corresponding to the first information security artifact (SSP #1.docx), the electronic device 200 (or the information security service) optionally analyzes/evaluates (e.g., determines) that the first information security artifact (SSP #1.docx) may be of evaluation-criteria defined by the FedRAMP High information security standard.

In some embodiments, the electronic device 200 (or the information security service via one or more computers) determined that the first information security artifact (SSP #1.docx) satisfied (or at least partially satisfied) the evaluation-criteria defined by the FedRAMP High information security standard via one or more machine learning models or an ensemble of machine learning models that are trained to output the information security standard that corresponds to a respective information security artifact (e.g., if the one or more machine learning models or the ensemble of machine learning models outputs that the information security artifact corresponds to the first information security standard, the one or more machine learning models or the ensemble of machine learning models determined that the information security artifact may be of evaluation-criteria defined by the first information security standard. Similarly, if a network of the one or more machine learning models outputs that the information security artifact corresponds to the second information security standard, the network of the one or more machine learning models determined that the information security artifact may satisfy evaluation-criteria defined by the second information security standard). In some examples, one or more machine learning models, the ensemble of machine learning models, or the network of the one or more machine learning models may include one or more neural networks, such as one or more recurrent neural networks (RNN), convolutional neural networks (CNN), artificial neural networks (ANN), or any suitable type of machine learning models, etc.

Additionally, as shown in FIG. 2F, in some embodiments, the electronic device 200 (or the information security service) optionally displays a user interface 222 after (e.g., in response to) determining that the first information security artifact (e.g., probably or most likely) satisfies evaluation-criteria defined by the FedRAMP High information security standard. User interface 222 optionally includes an indication indicating the confidence (e.g., score) at which the network of machine learning models predicted that a respective information security artifact corresponds to a particular information security standard. For example, as shown in FIG. 2F, the user interface 222 includes a security standard-informed label (e.g., a label) 230 or indication indicating that the network of one or more machine learning models, the one or more machine learning models, or the ensemble of machine learning models predicted that the first information security artifact (SSP #1.docx) may best satisfy the evaluation-criteria of the FedRAMP High information security standard, and a second indication 228 indicating that the network of one or more machine learning models, the one or more machine learning models, or the ensemble of machine learning models predicted that the first information security artifact may satisfy the evaluation-criteria of the FedRAMP High information security standard with a confidence score of 97. It should be understood that other information security artifacts that are determined to correspond to the FedRAMP High information security standard may have a higher or lower confidence score as compared to the confidence score indicated in FIG. 2F.

Additionally, as shown in FIG. 2F, the user interface 222 optionally includes selectable options 220 thru 220-2. Selectable option 220, when selected, optionally ceases the process to create, in the information security service, an information security program corresponding to the first information security artifact (and/or ceases the process to create, in the information security service, an information security program corresponding to each of the information security artifacts (SSP #1.docx thru SSP #6.docx) that were transmitted to the information security service, as described in FIGS. 2D and 2E). Selectable option 220-1, when selected, optionally causes the electronic device 200 to execute processes and/or display user interfaces associated with creating an information security program (e.g., cyber-security data catalogue) based on the second information security artifact (SSP #2.docx). Selectable option 220-2, when selected, optionally causes the electronic device 200 to execute processes and/or display user interfaces associated with creating an information security program based on the third information security artifact transmitted via device 200 (SSP #3.docx). The process for creating the information security programs corresponding to the second, third, fourth, fifth, and/or sixth information security artifacts (SSP #1.docx thru SSP #6.docx) is optionally analogous to the ways in which the electronic device 200 (or the information security service) creates an information security program corresponding to the first information security artifact (SSP #1.docx).

In some embodiments, the user interface 222 optionally includes selectable options for confirming or rejecting the prediction made by the network of the one or more machine learning models, the one or more machine learning models, or the ensemble of machine learning models. For example, as shown in FIG. 2G, the user interface 222 includes a selectable option 224 that, when selected, confirms that the first information security artifact (SSP #1.docx) is an information security artifact of the FedRAMP High information security standard. In some embodiments, in response to the electronic device 200 (or the information security service) receiving an input confirming that first information security artifact (SSP #1.docx) satisfies evaluation-criteria of the FedRAMP High information security standard, the electronic device 200 (or the information security service) causes the information security program corresponding to the first security artifact (SSP #1.docx) to include (or initialize or instantiate) a selectable/interactable hierarchical (e.g., tree-like) structure of the FedRAMP High information security standard (and optionally the objectives and/or sections of the FedRAMP High information security standard) as will be described in more detail in FIGS. 2RR-2UU. In other words, the information security service may fast-generate and/or system-generate a target information security program (e.g., FedRAMP High Information Security Standard) that may relate to the information security standard in response to receiving an information security program construction signal based on the information security service receiving an input (from a target user) confirming that first information security artifact (SSP #1.docx) satisfies evaluation-criteria of the FedRAMP High information security standard. Stated differently, in some embodiments, the information security service may system-generate an information security program for a target information security artifact in fifteen (15) or less user inputs, fourteen (14) or less user inputs, thirteen (13) or less user inputs, twelve (12) or less user inputs, eleven (11) or less user inputs, ten (1o) or less user inputs, nine (9) or less user inputs, eight (8) or less user inputs, seven (7) or less user inputs, six (6) or less user inputs, five (5) or less user inputs, four (4) or less user inputs, three (3) or less user inputs, two (2) or less user inputs, or one (1) or less user inputs after a target subscriber logs into the information security service.

It shall be noted that, in one or more embodiments, in response to the electronic device 200 (or the information security service) receiving an input confirming that the first information security artifact (SSP #1.docx) satisfies evaluation-criteria of the FedRAMP High information security standard, the electronic device 200 (or the information security service) may function to selectively source a subscriber-agnostic information security program of a plurality of distinct subscriber-agnostic information security programs based on the input confirming the type of information security artifact (e.g., confirming label 230). A subscriber-agnostic information security program, as generally referred to herein, may be a service-defined information security program template specifically configured for a distinct information security standard that may include at least one information security object digitally mapped to each information security objective defined by the information security standard.

In a first implementation, a subscriber-agnostic information security program may be defined for each recognized information security standard of the information security service. In such implementation, via a reference table or any suitable data structure, each distinct information security standard recognized by the information security service may be mapped or electronically linked to a distinct subscriber-agnostic information security program to which the subscriber-agnostic information security service corresponds. For instance, in a non-limiting example a first information security standard may be mapped to a first subscriber-agnostic information security program, and a second information security standard may be mapped to a second subscriber-agnostic information security program.

Accordingly, in one or more embodiments of the first implementation, based on the input confirming the type of the first information security artifact (e.g., label 230), the information security service may function to automatically source (or trigger or cause a system-generated spin-up or intelligent creation) of a (e.g., pre-fabricated) subscriber-agnostic information security program based on performing a search of the reference mapping data structure or the like using the label 230 or the like. In such embodiments, the sourced (or identified or detected) subscriber-agnostic information security program may be initialized or instantiated in the information security service for a target subscriber (e.g., subscriber A). Additionally, in some embodiments, in response to the instantiation, the information security service may function to install selective subsets of information security control data included in the uploaded information security artifact into selective portions of the subscriber-agnostic information security program, and thus, a subscriber-specific information security program.

Alternatively, if the electronic device 200 (or the information security service) did not detect the input for confirming that the first information security artifact (SSP #1.docx) satisfies the evaluation-criteria of the FedRAMP High information security standard, the electronic device 200 (or the information security service) optionally forgoes causing the information security program corresponding to the first security artifact (SSP #1.docx) (e.g., the information security program that is in the process of being created in the information security service in FIG. 2G) to include (or initialize or instantiate) the selectable/interactable hierarchical (e.g., tree-like) structure of the FedRAMP High information security standard.

It should be understood that if the electronic device 200 (or the information security service) would have instead determined that the first information security artifact (SSP #1.docx) corresponds to a different information security standard other than the FedRAMP High information security standard, a selectable/interactable hierarchical (e.g., tree-like) structure of the different information security standard would have been added (or initialized or instantiated) to the information security program corresponding to the first information security artifact (SSP #1.docx) in response to the electronic device detecting a selection of the selectable option 224.

In some embodiments, in response to the electronic device 200 (or the information security service) detecting the input selecting the selectable option 224, an information security program corresponding to the first information security artifact (SSP #1.docx of Subscriber A) is automatically created in the information security service and optionally viewable in a web-accessible interface in electronic communication with the information security service, as illustrated and described in FIGS. 2BB and 2CC (e.g., the user interface 259 in FIG. 2BB includes a representation 225-1 of the information security program #1 because the information security program #1, which corresponds to the first information security artifact (SSP #1.docx)). In some embodiments, when the information security program corresponding to the first information security artifact (SSP #1.docx) is created in FIG. 2G, the information security program corresponding to the first information security artifact (SSP #1.docx) does not include any information security control object data (e.g., until one or more information security control objects are added to the information security program corresponding to the first information security artifact (SSP #1.docx) in similar ways as described below). Alternatively, in some embodiments, the information security program corresponding to the first information security artifact (SSP #1.docx) is not created in the information security service until the electronic device 200 (or the information security service) detects one or more inputs for adding the one or more information security control objects to the information security program corresponding to the first information security artifact (SSP #1.docx).

Additionally, as shown in FIG. 2G, the user interface 222 optionally includes a selectable option 226 that, when selected, rejects that the first information security artifact (SSP #1.docx) is an information security artifact of the FedRAMP High information security standard. It shall be noted that if the electronic device 200 (or the information security service) would have instead determined that the first information security artifact (SSP #1.docx) corresponds to a different information security standard other than the FedRAMP High information security standard, then, in FIG. 2G, selectable option 226 would be selectable to reject that the first information security artifact (SSP #1.docx) corresponds to that different information security standard.

In FIG. 2H, the electronic device 200 (or the information security service) has detected an input that corresponds to a selection of the selectable option 226 (indicated by mouse 208 selecting the selectable option 226). In some embodiments, in response to the electronic device 200 (or the information security service) detecting the input described in FIG. 2H, the electronic device 200 (or the information security service) optionally displays the user interface 222-1, as will be now described with reference to FIG. 2I. In some embodiments, the user interface 222-1 includes a label 230 prompting the user of the electronic device 200 to select the correct information security standard that corresponds to the first information security artifact (SSP #1.docx), a search field 231, and/or search results 232-1 thru 232-4 that are displayed based on the input provided to the search field 231. For example, the search results 232-1 thru 232-4 are optionally being displayed by the electronic device 200 (or the information security service) because the electronic device 200 (or the information security service) received the input "Sta" at the search field 231 (e.g., the substring "Sta" is included in the search results 232-1 thru 232-4). It should be understood that the electronic device 200 optionally displays different search results than search results 232-1 thru 232-4 if the electronic device 200 (or the information security service) received a different input at the search field 231.

Figure 2X:
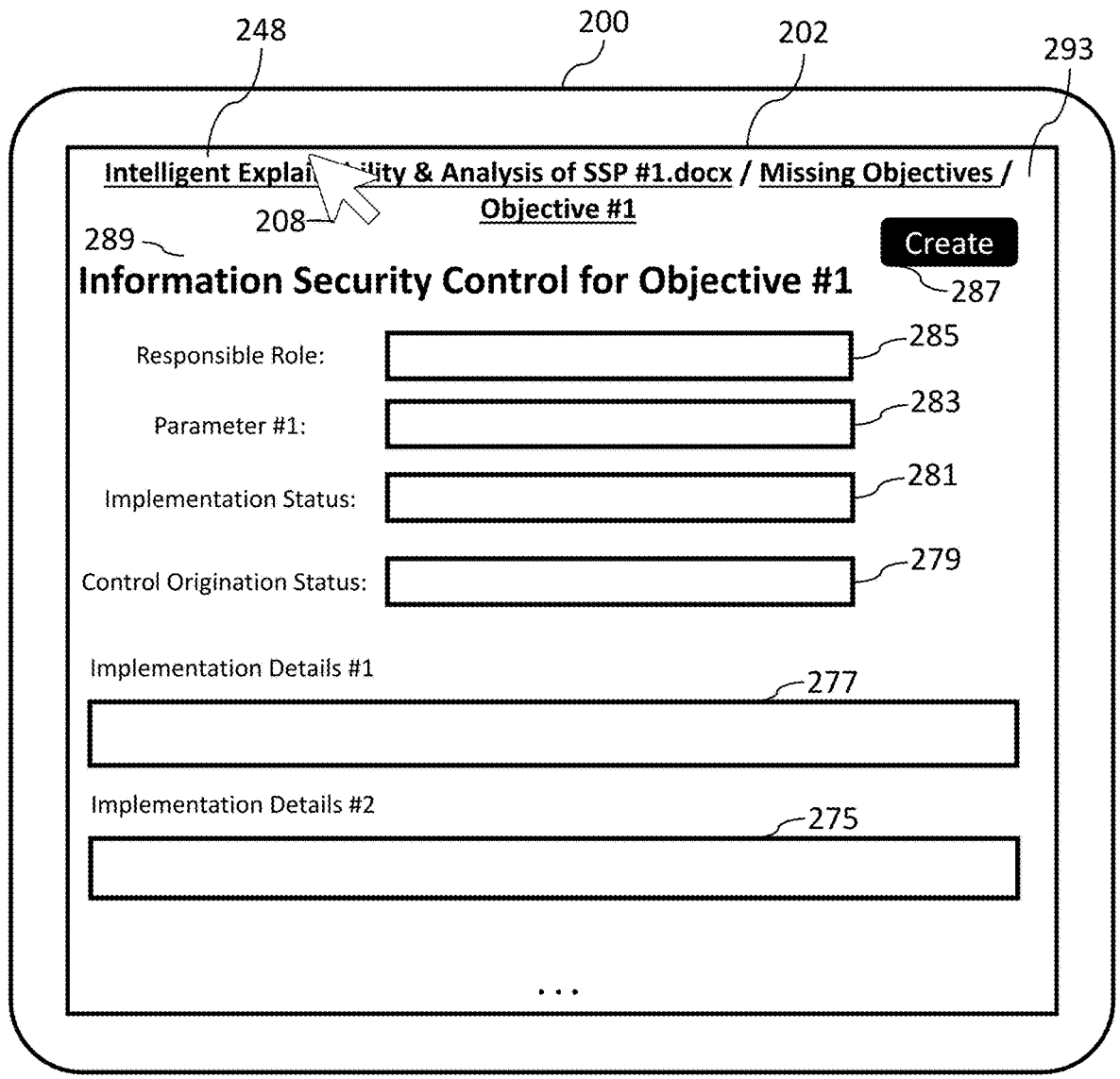
Figure 2Y:
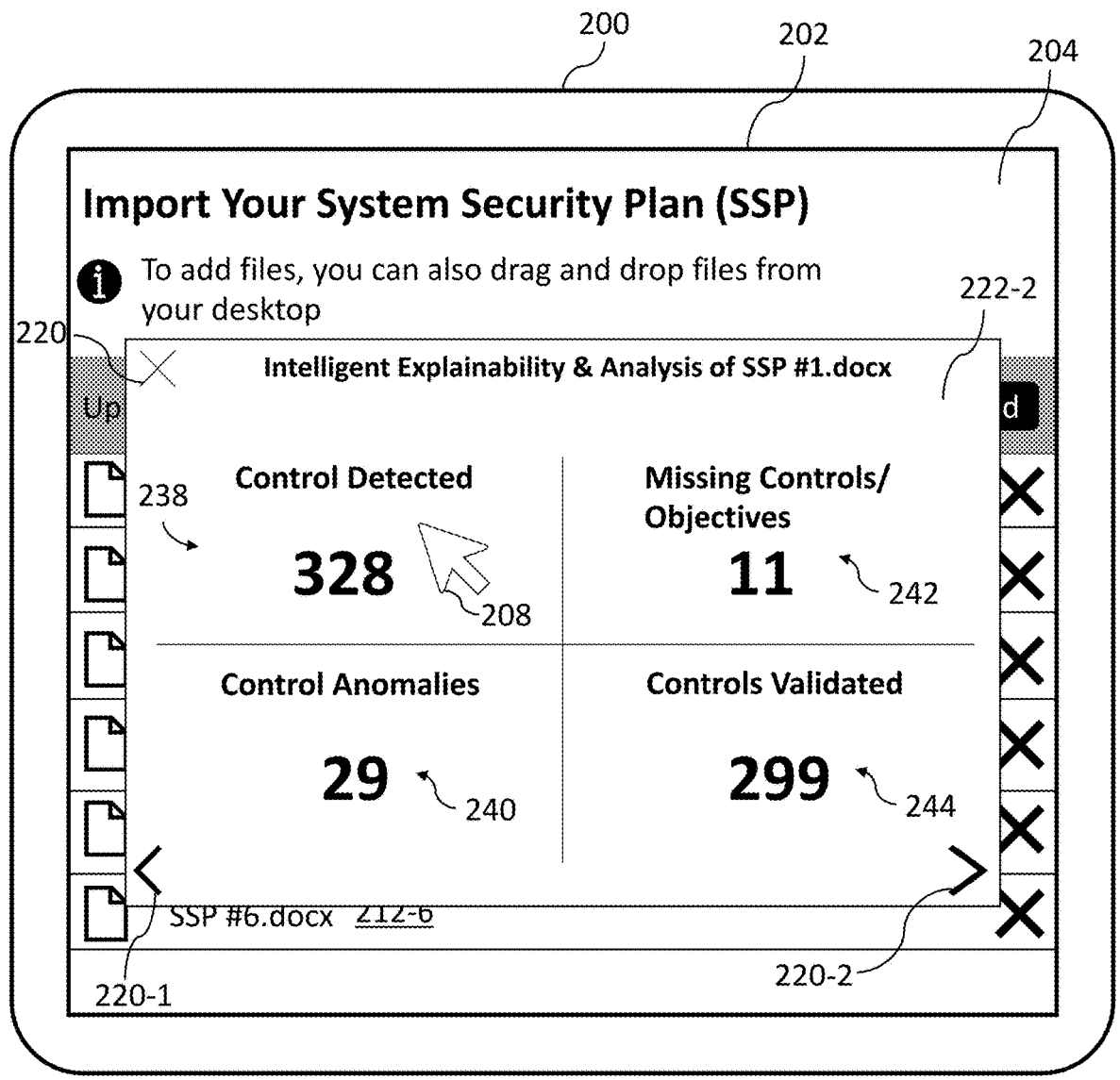
Figure 2Z:
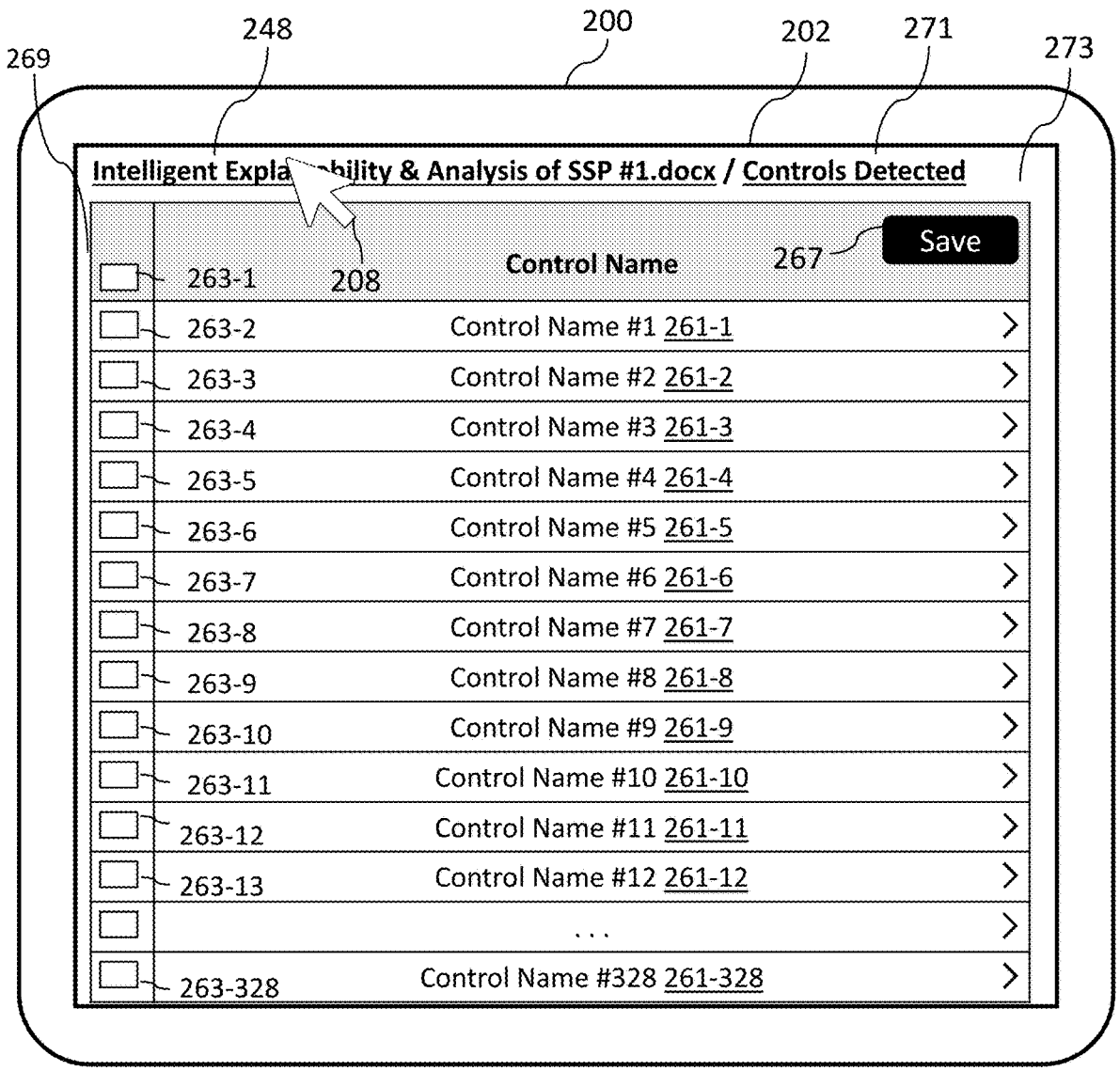
Figure 2A:
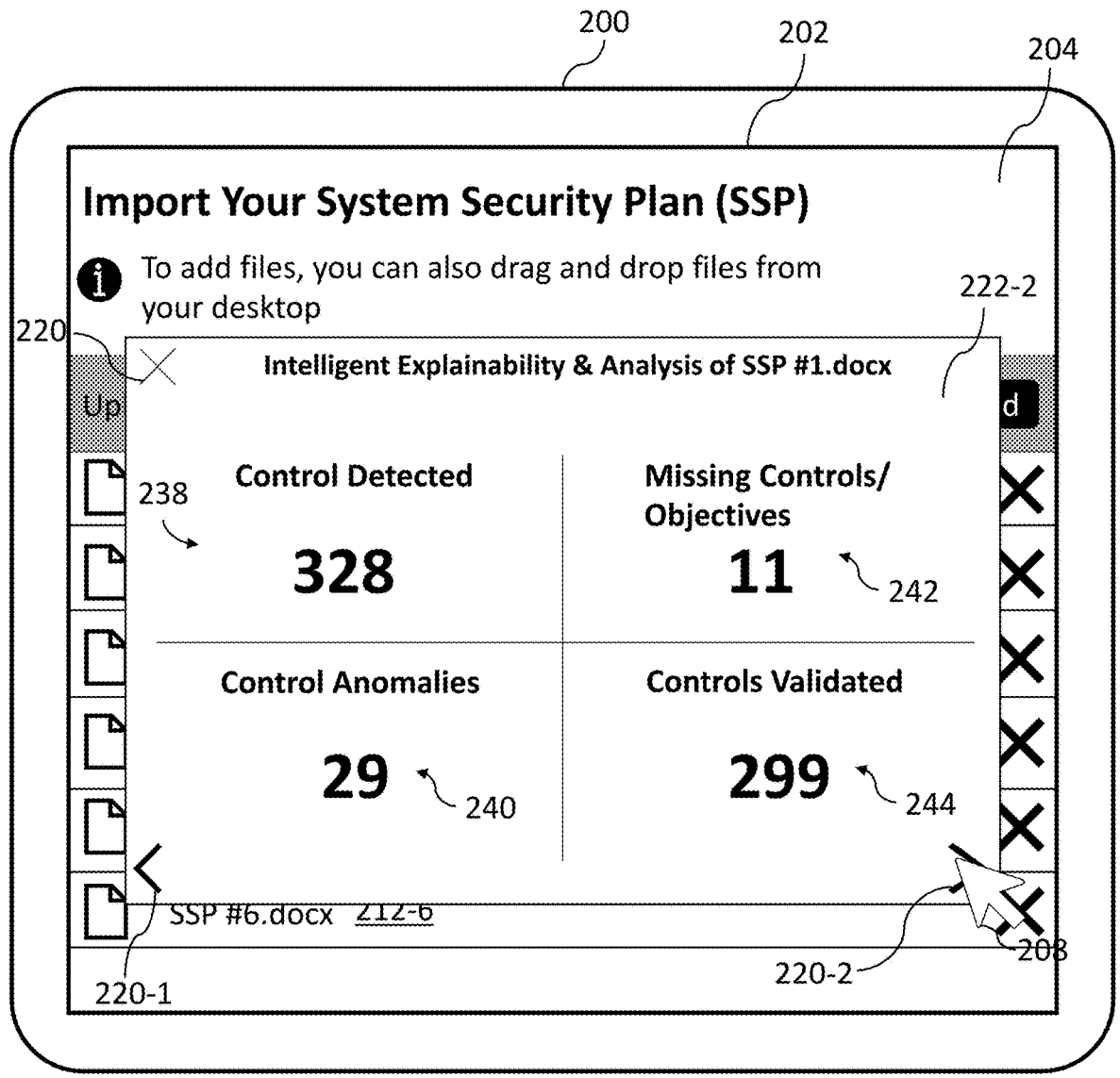
Figure 2B:
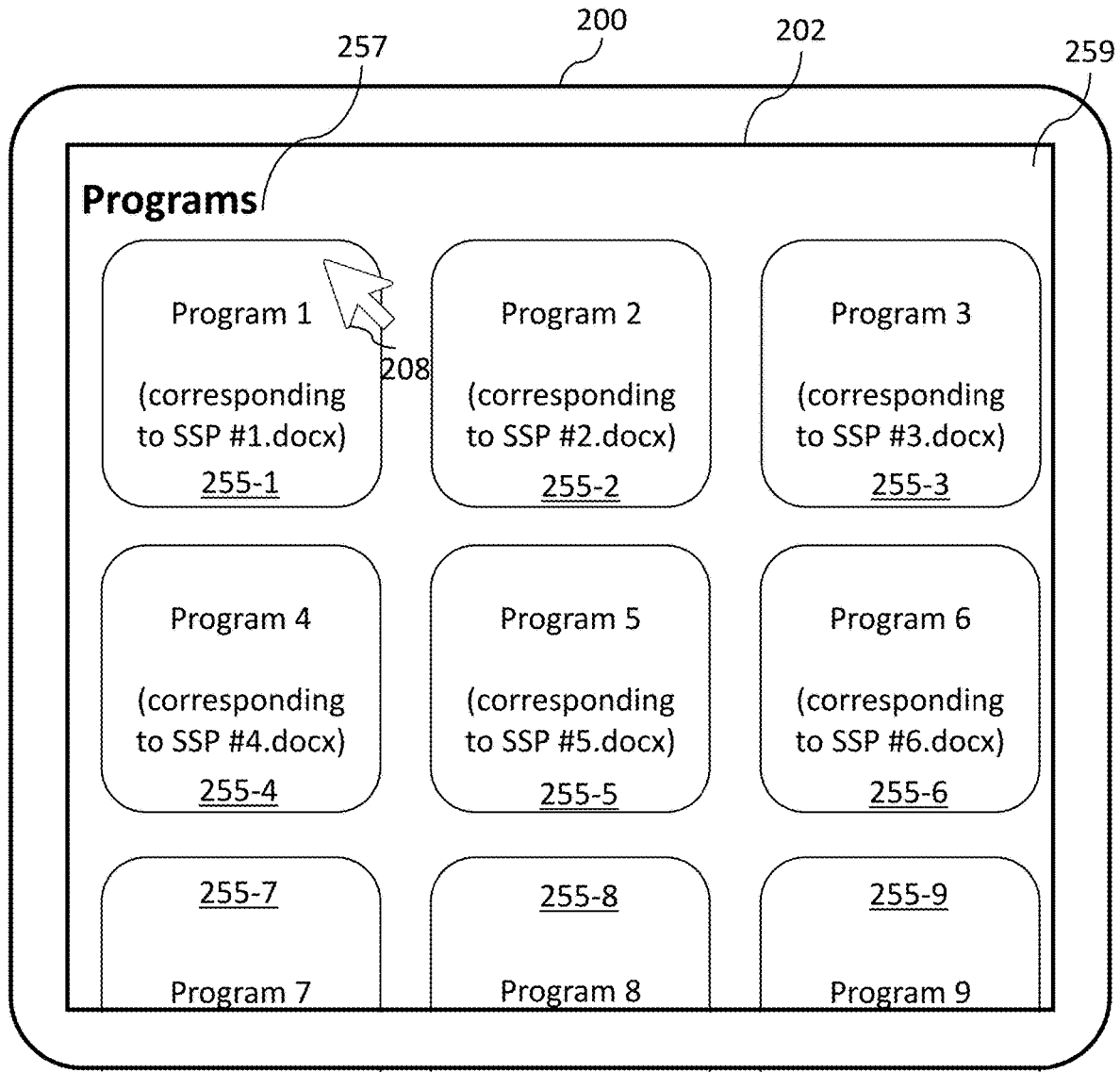
Figure 2C:
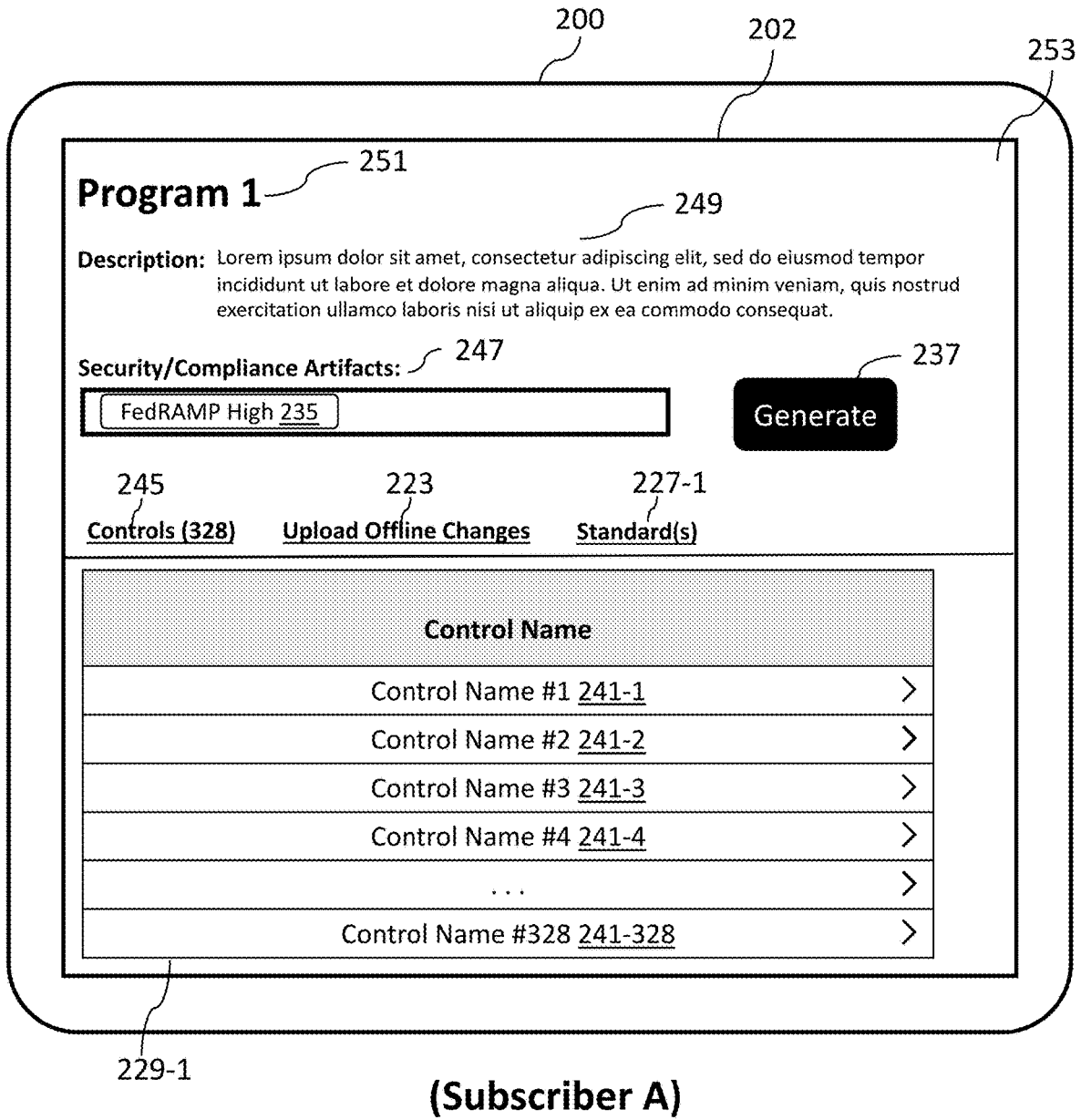
Figure 2D:
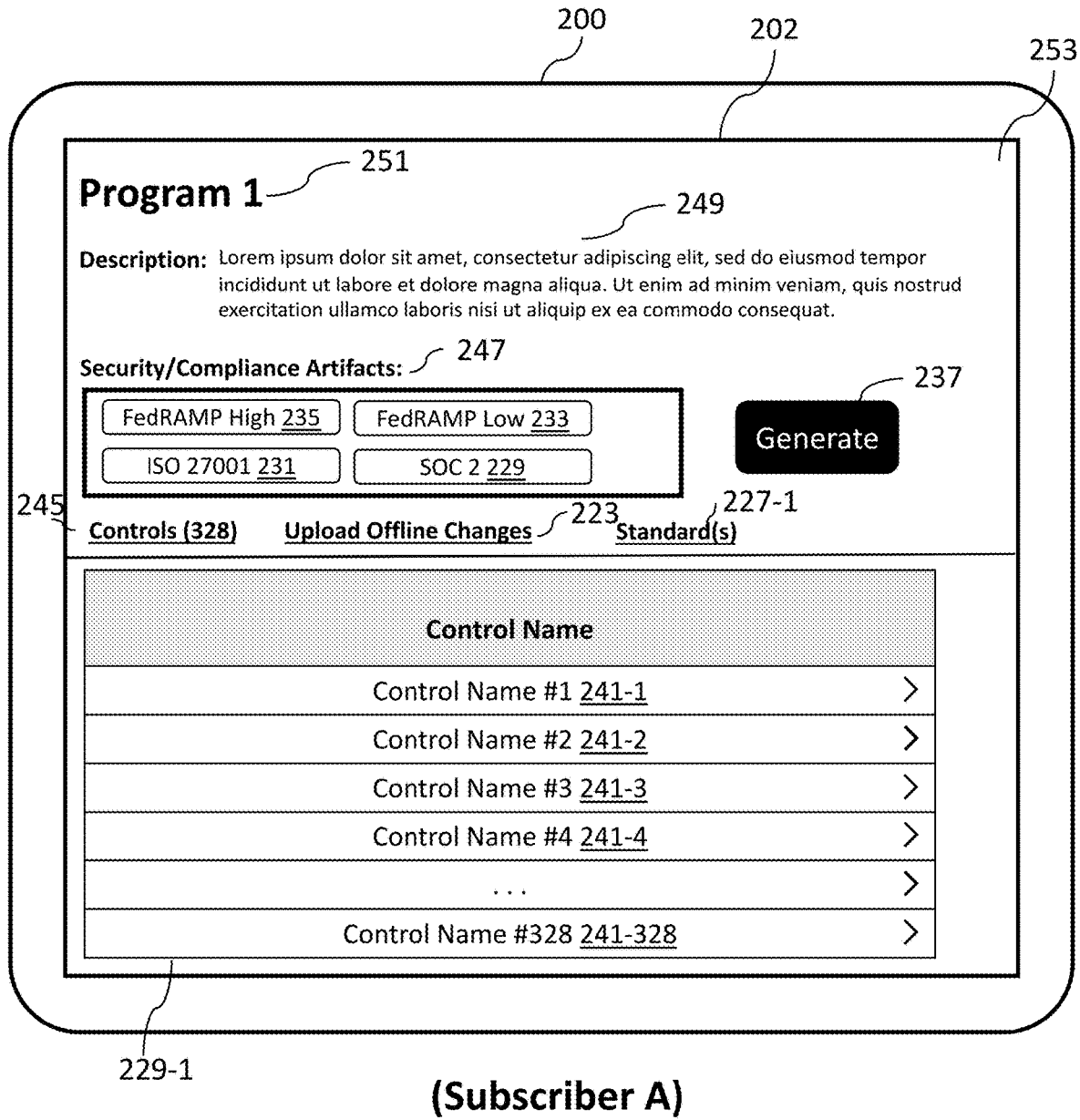
Figure 2E:
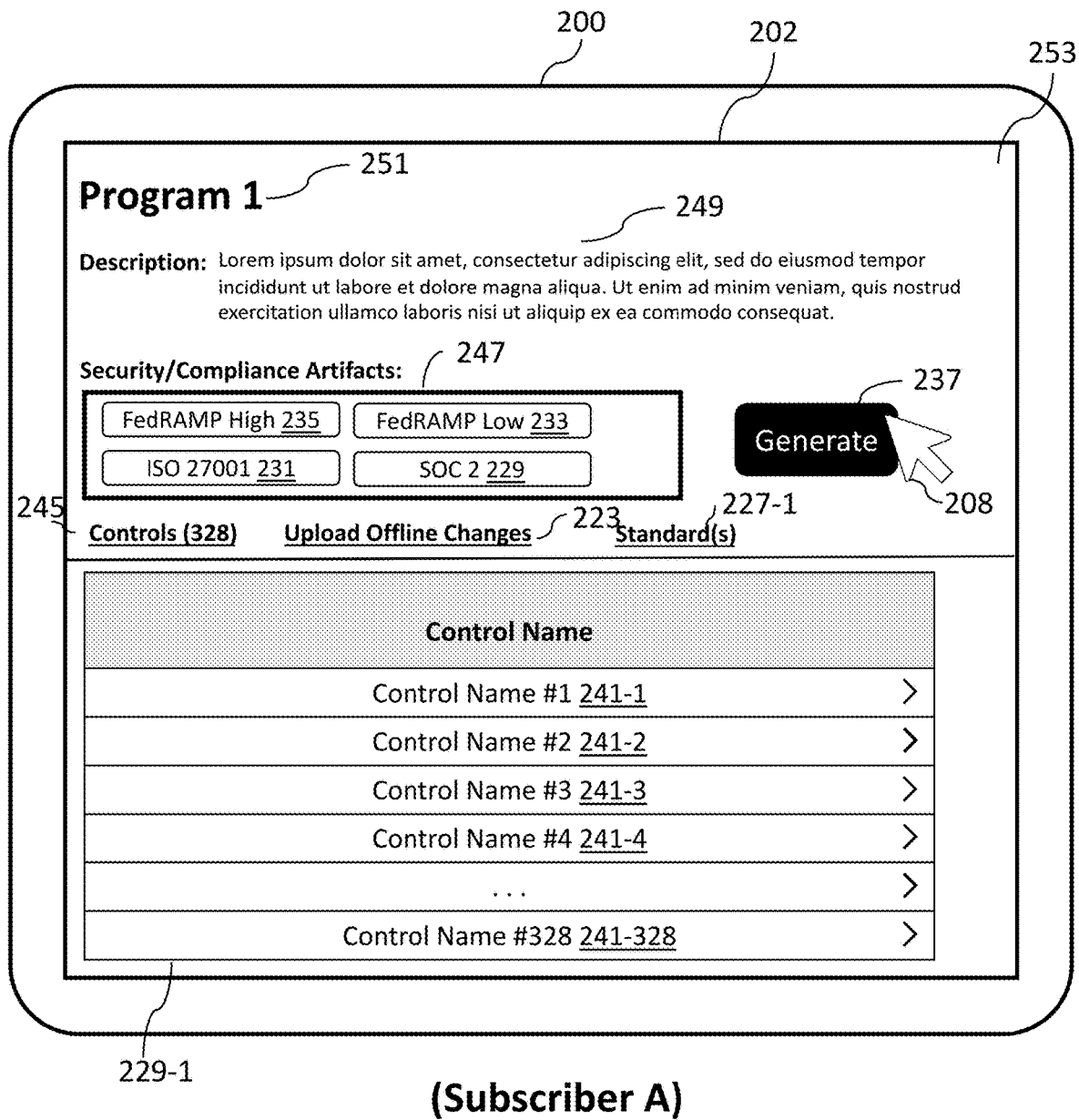
Figure 2F:
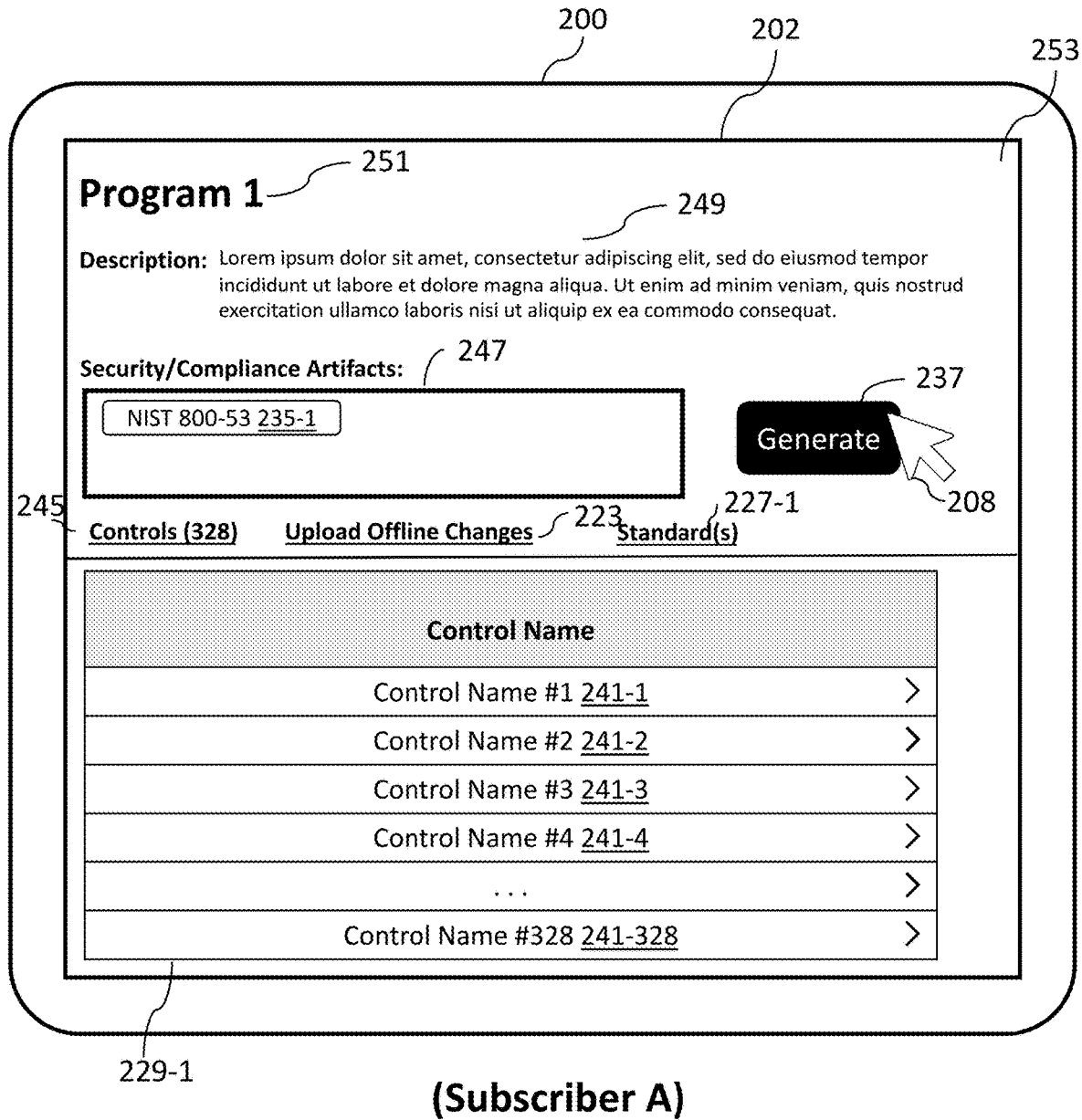
Figure 2G:
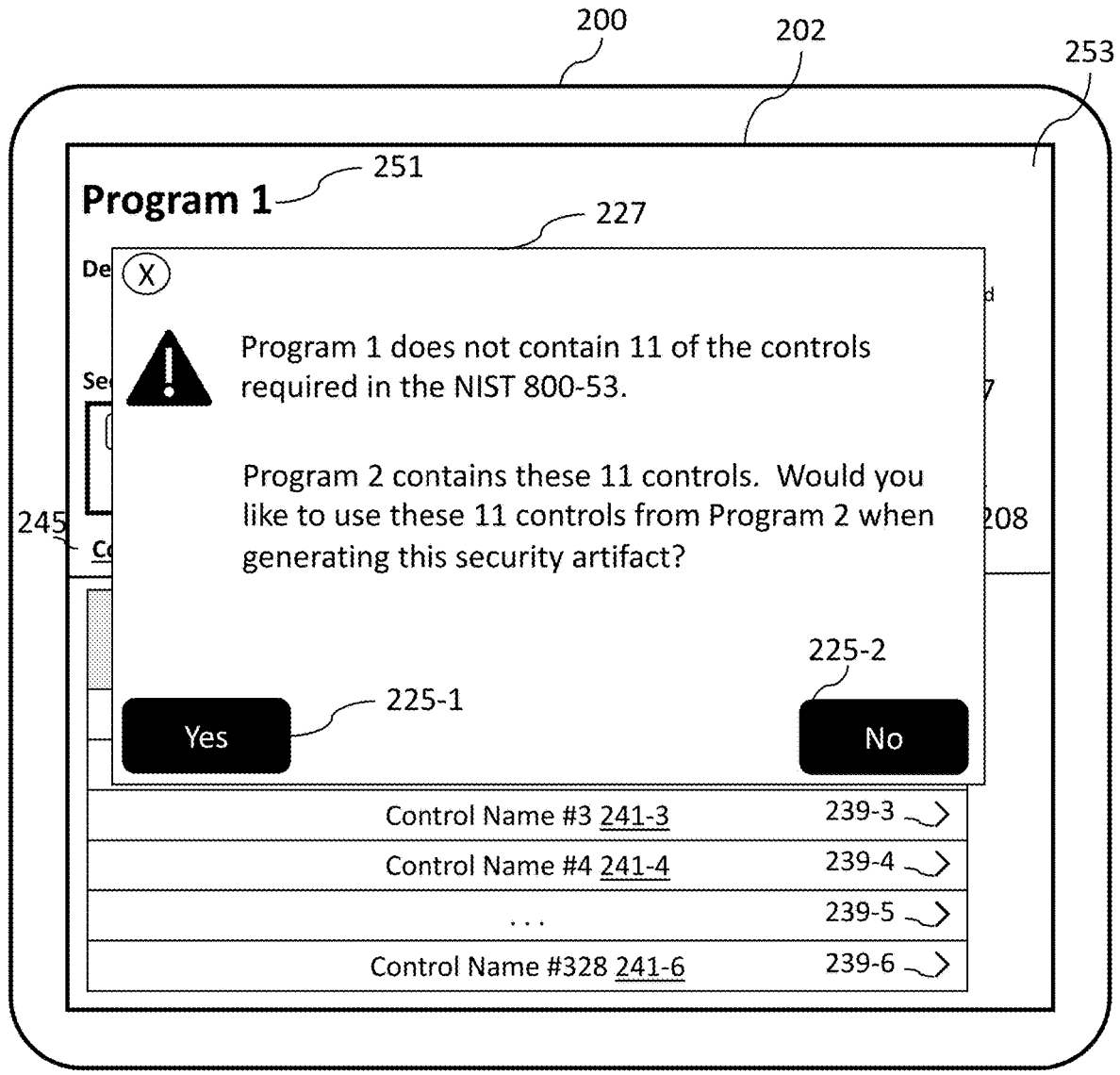
Figure 2H:
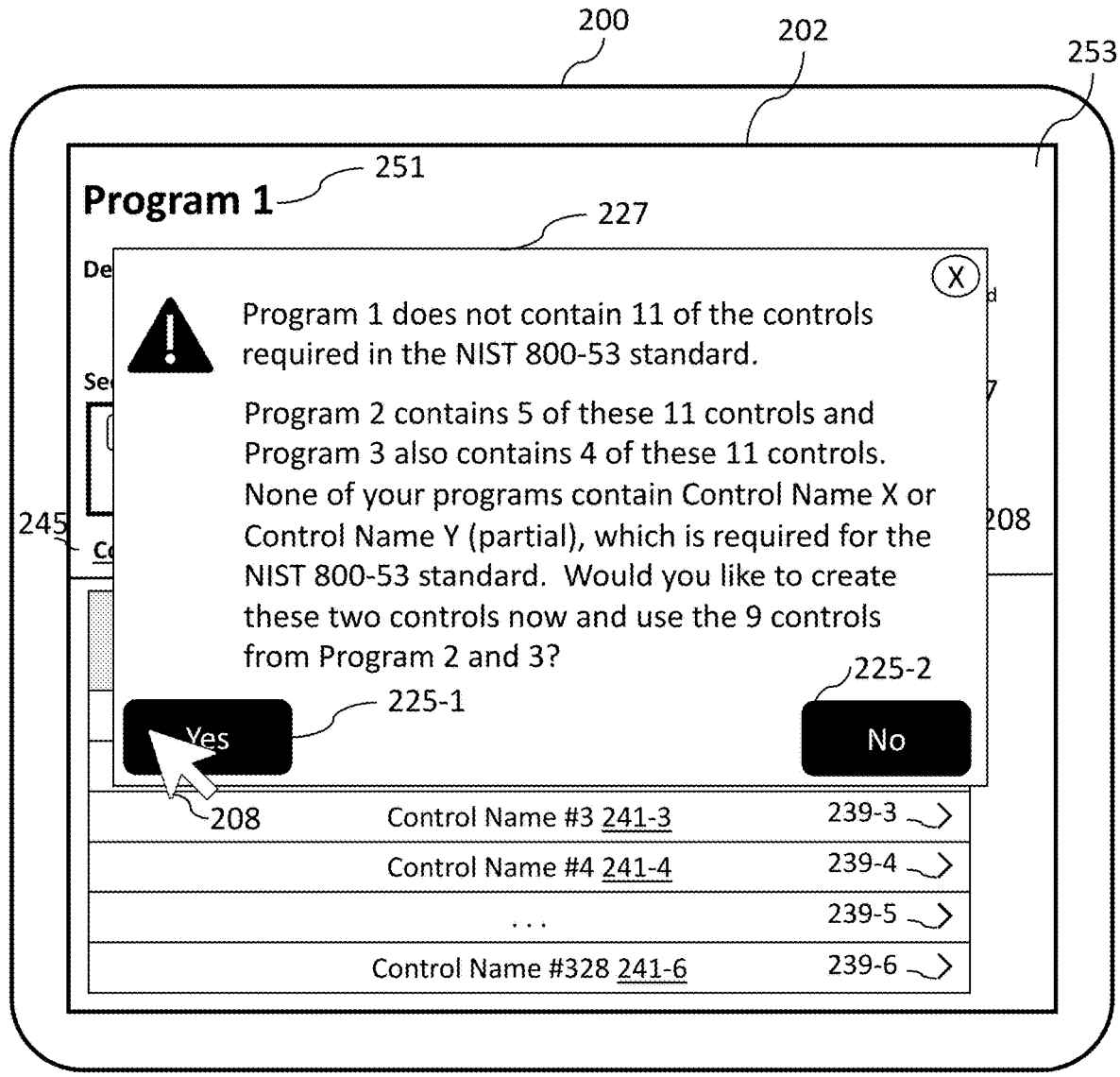
Figure 2I:
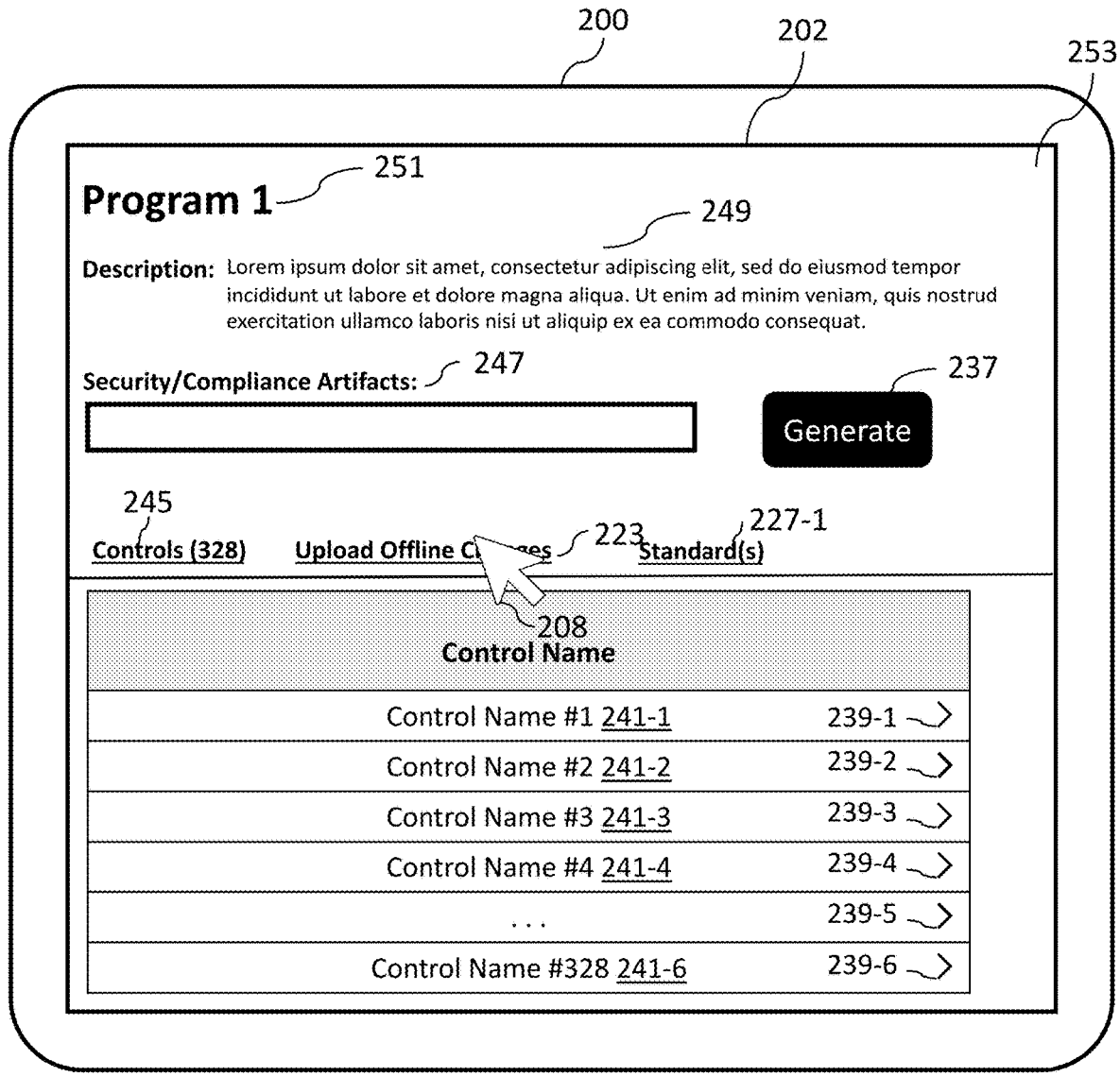
Figure 2J:
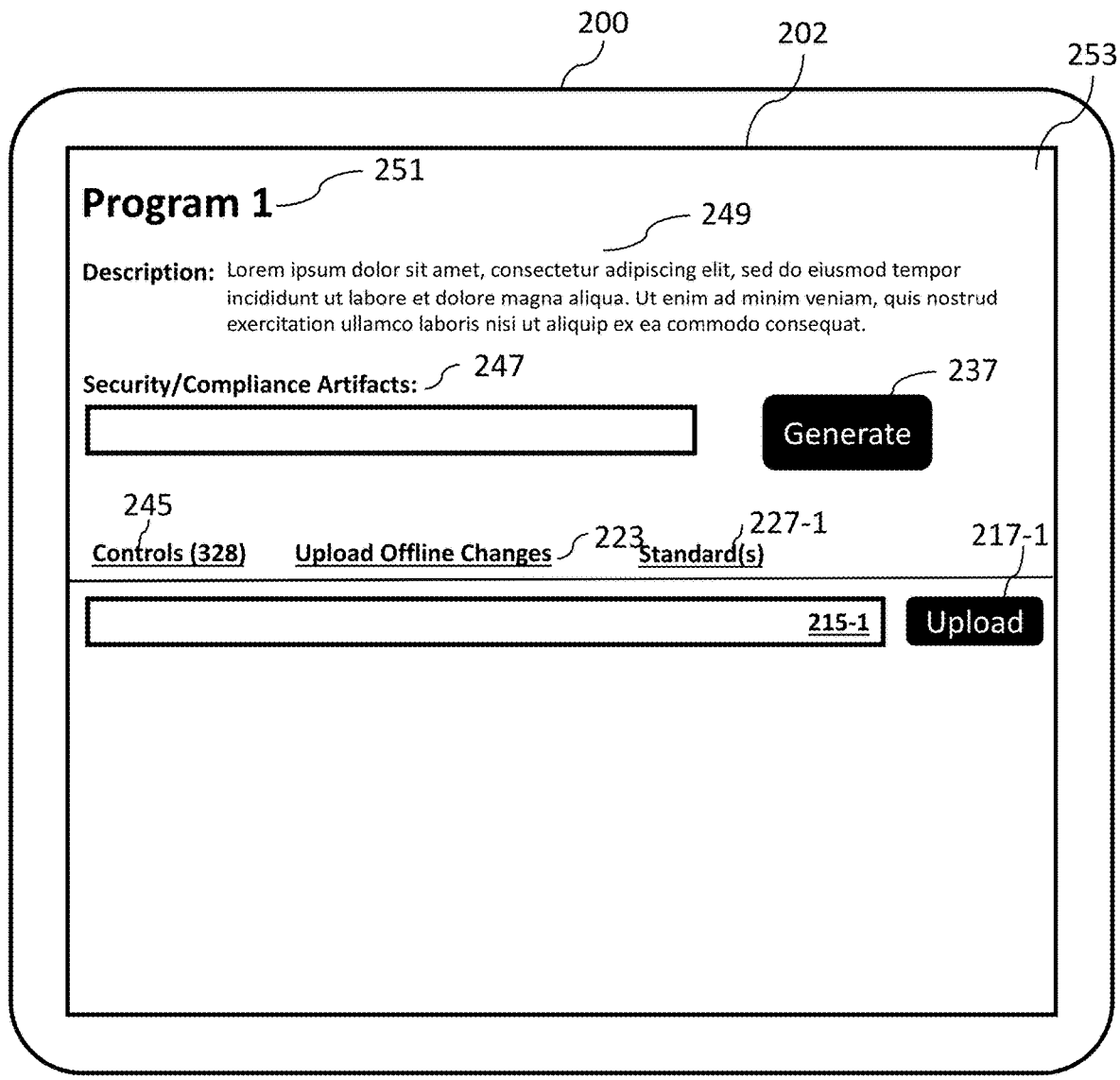
Figure 2K:
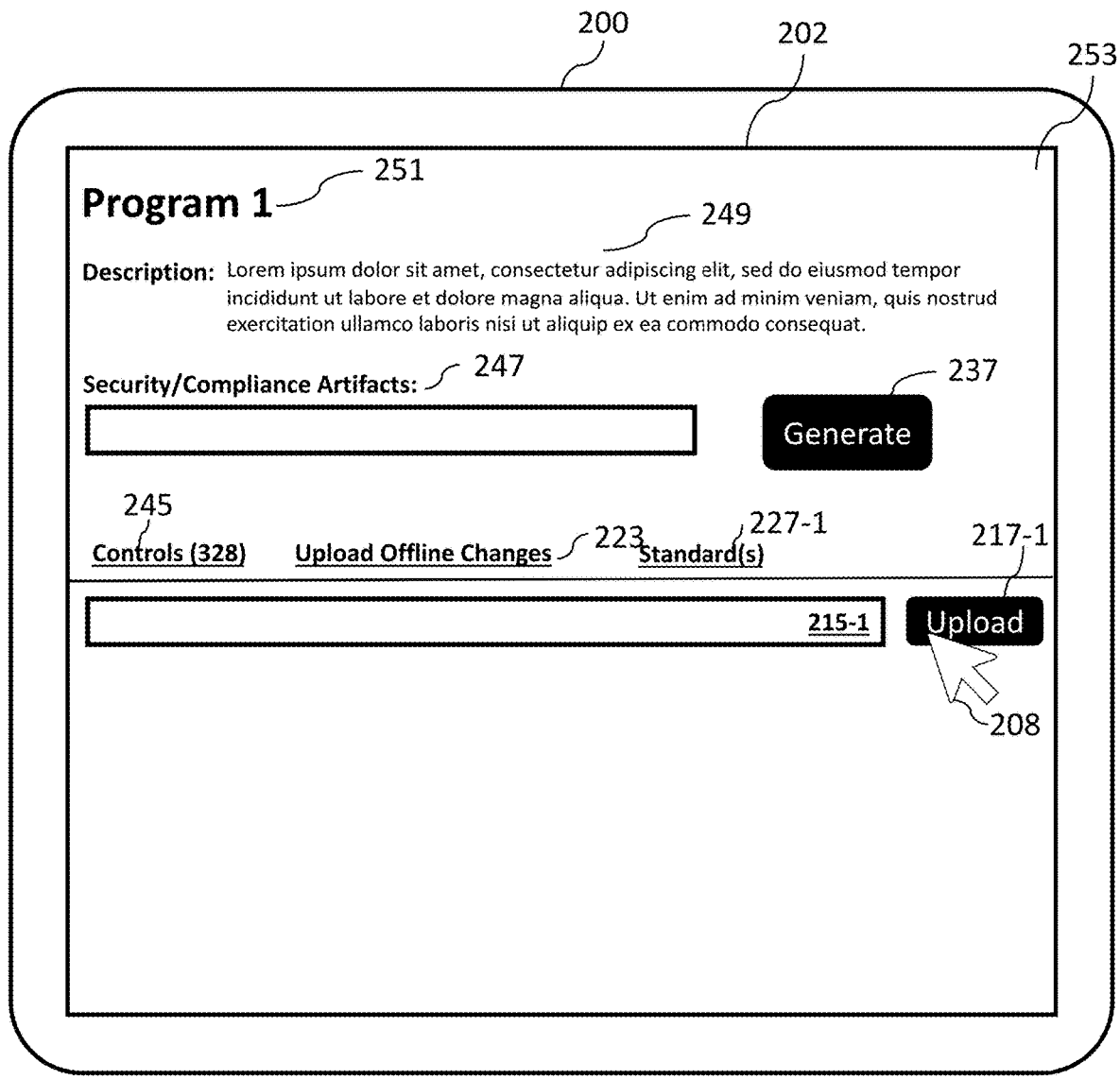
Figure 2L:
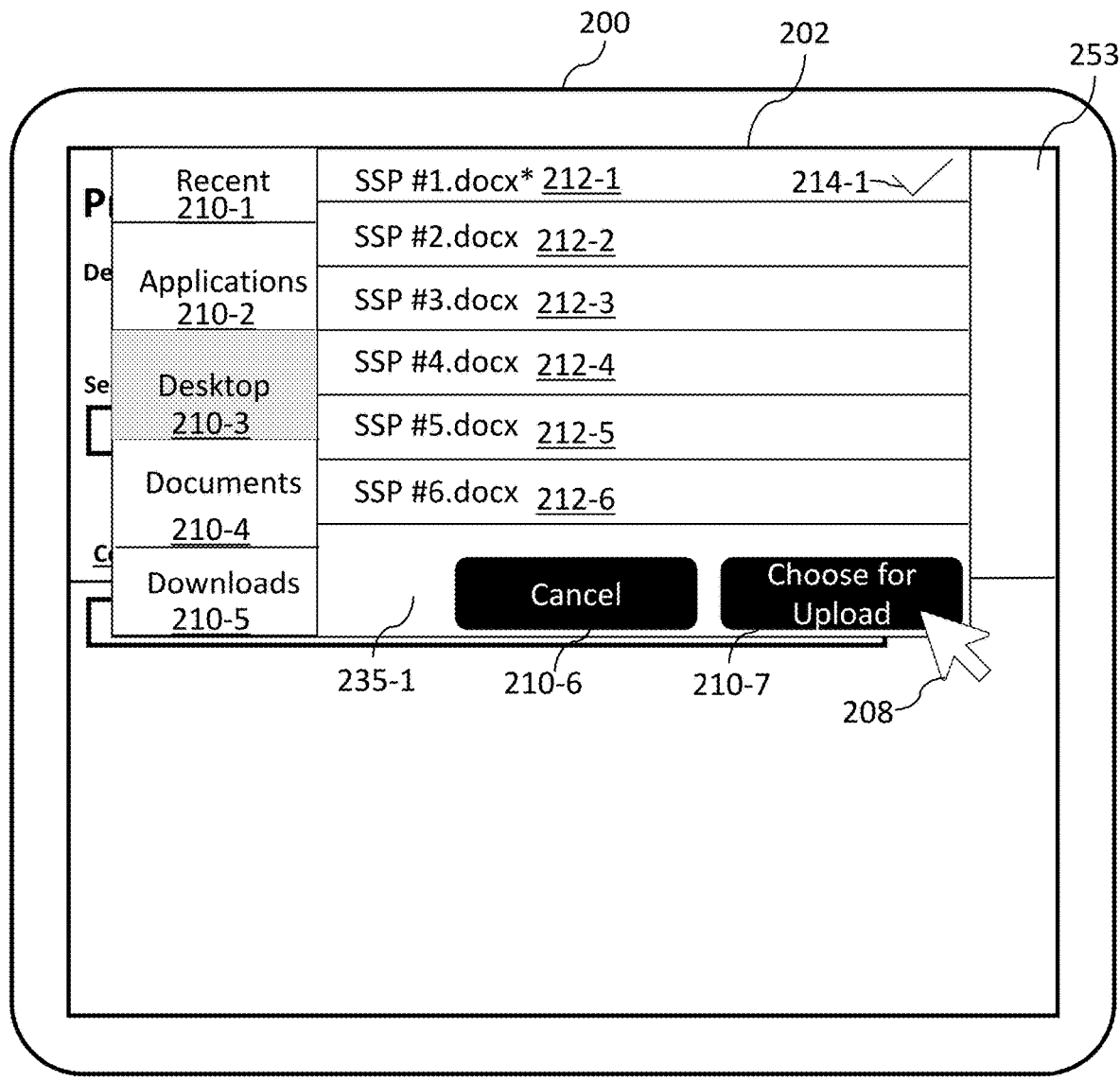
Figure 2M:
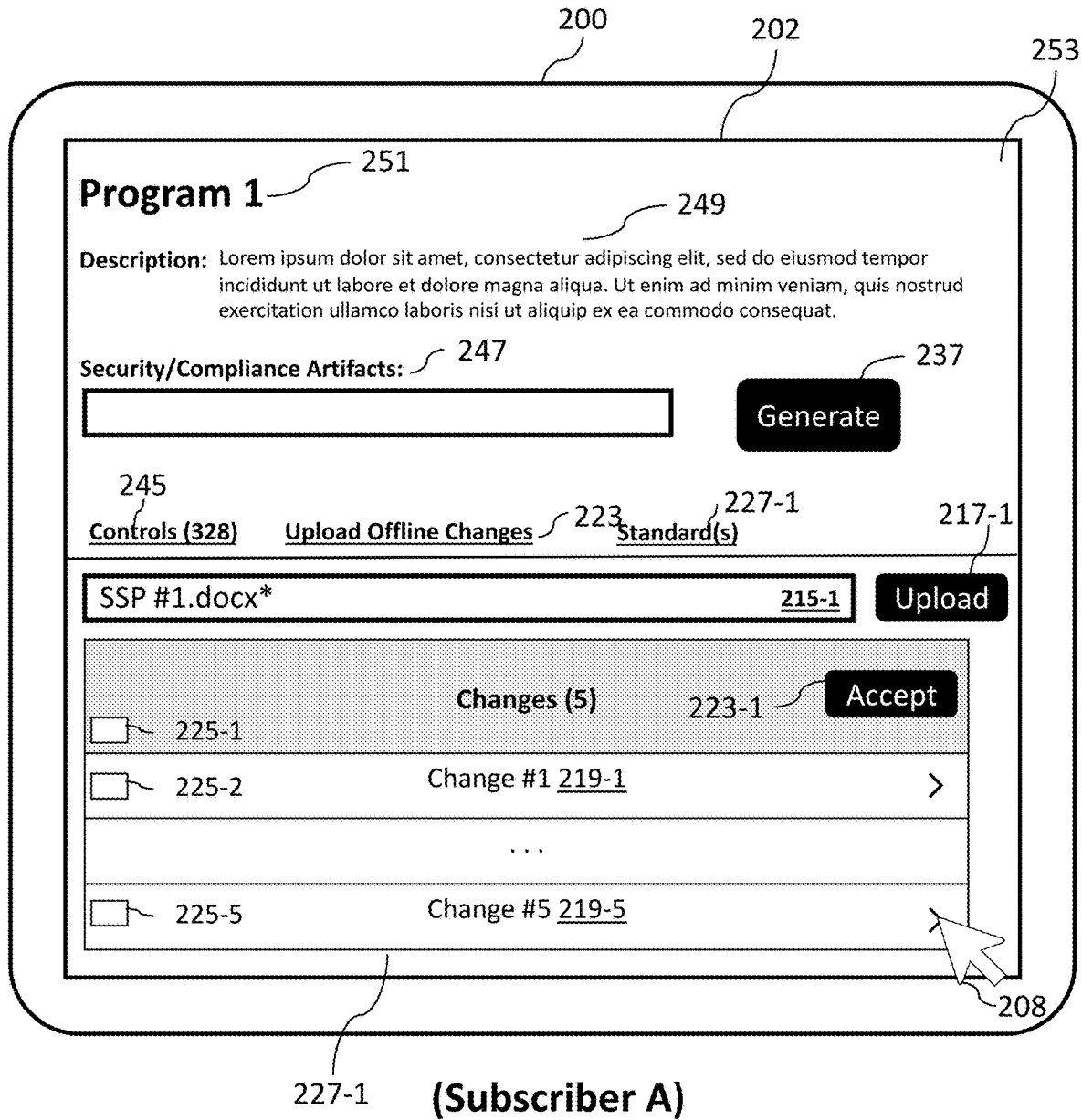
Figure 2O:
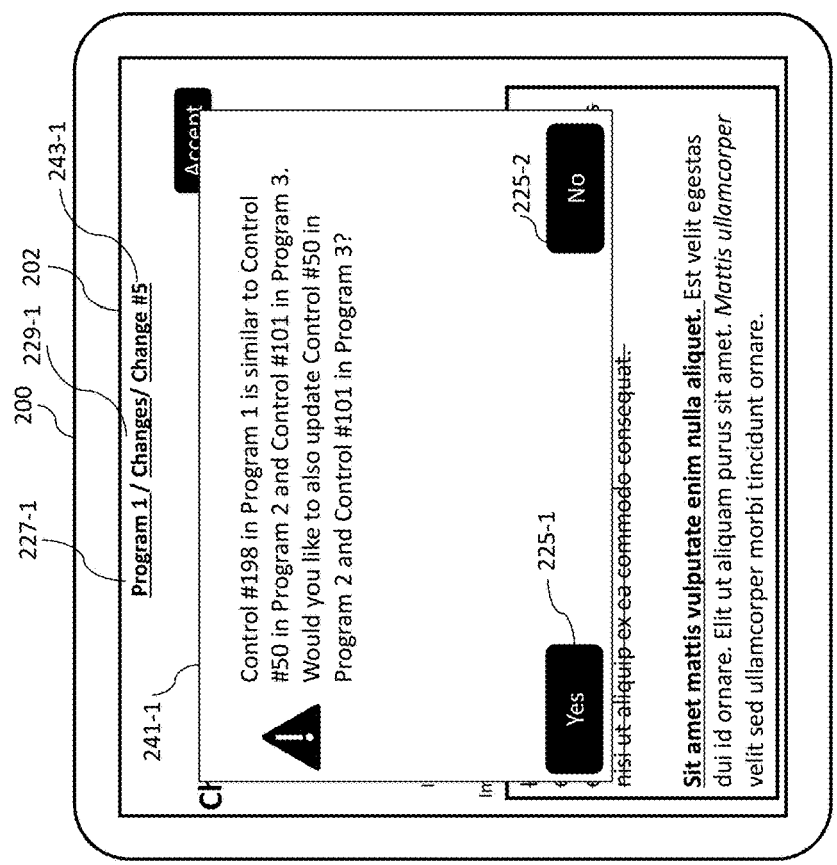
Figure 2N:
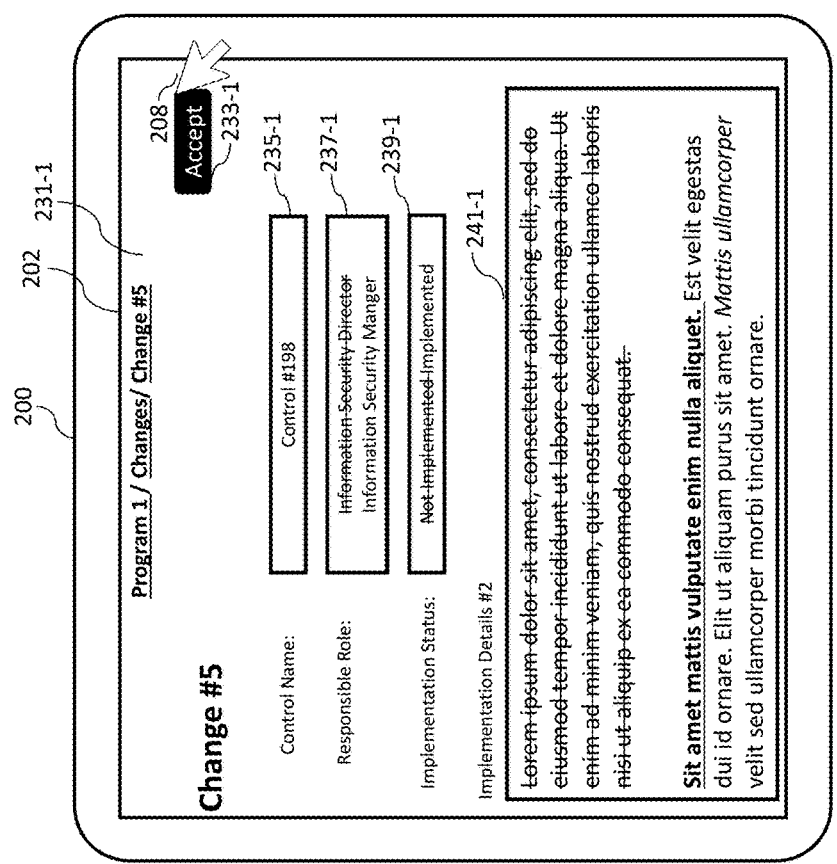
Figure 2S:
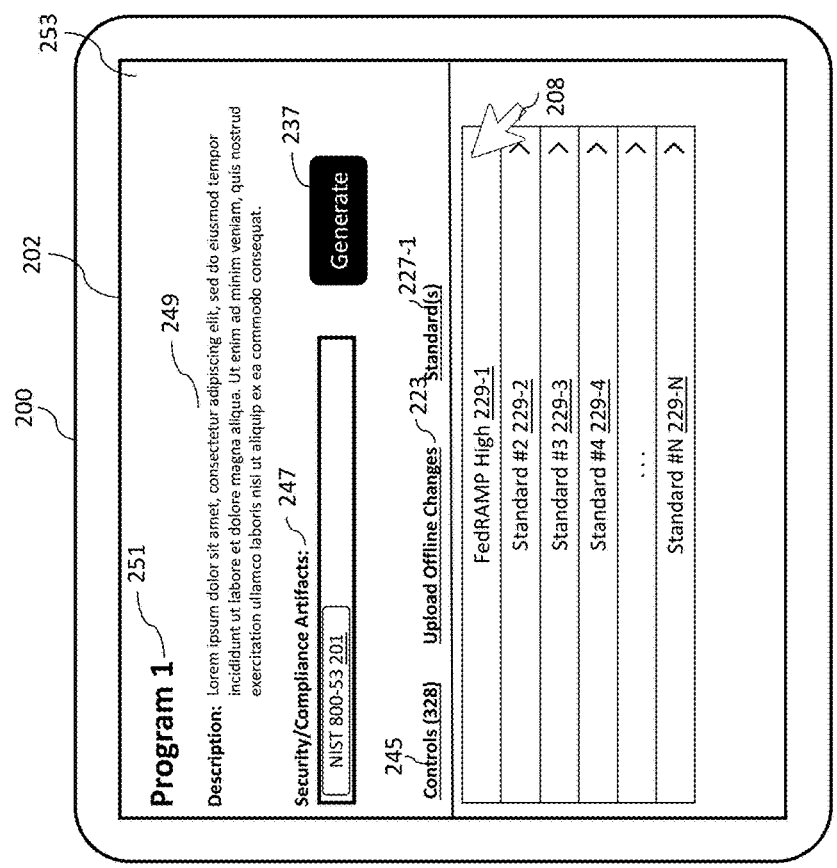
Figure 2R:
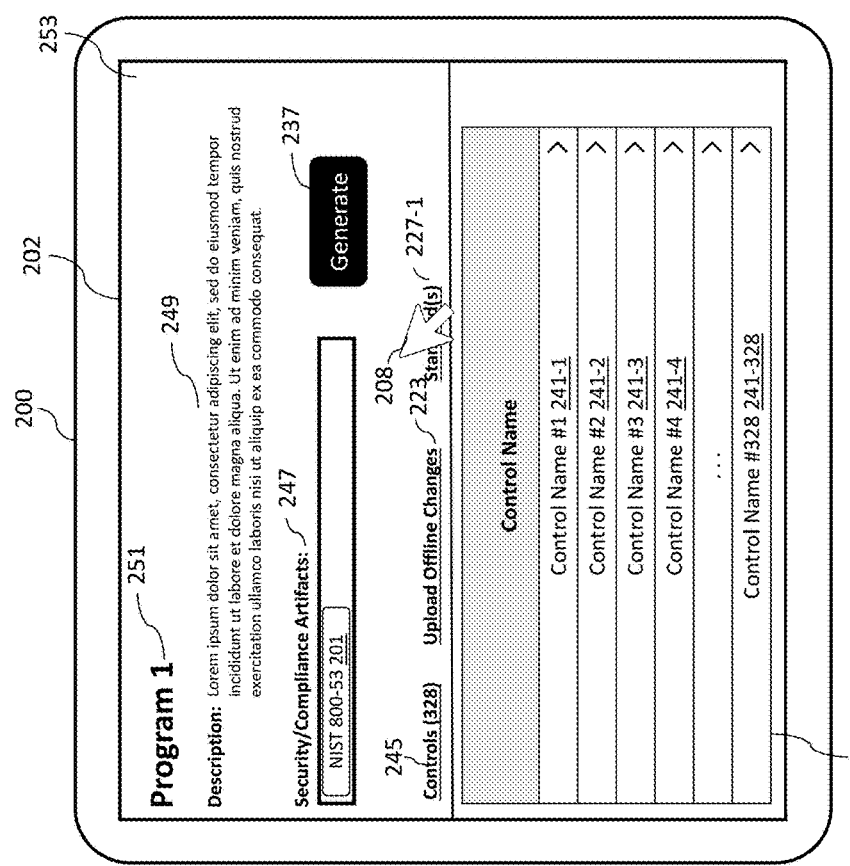
Figure 2W:
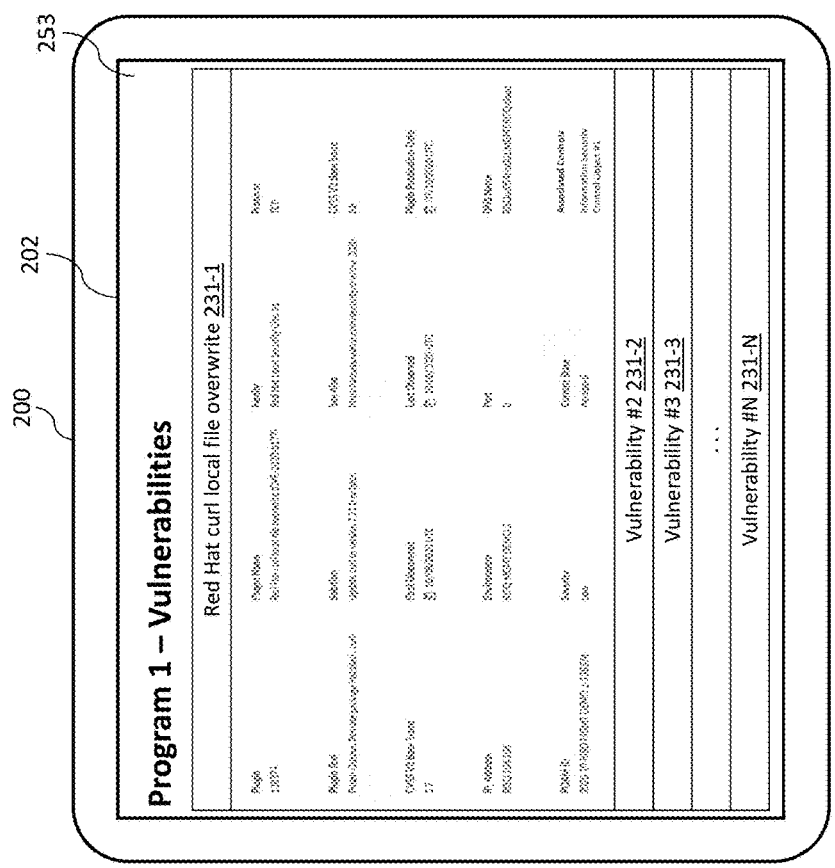
Figure 2V:
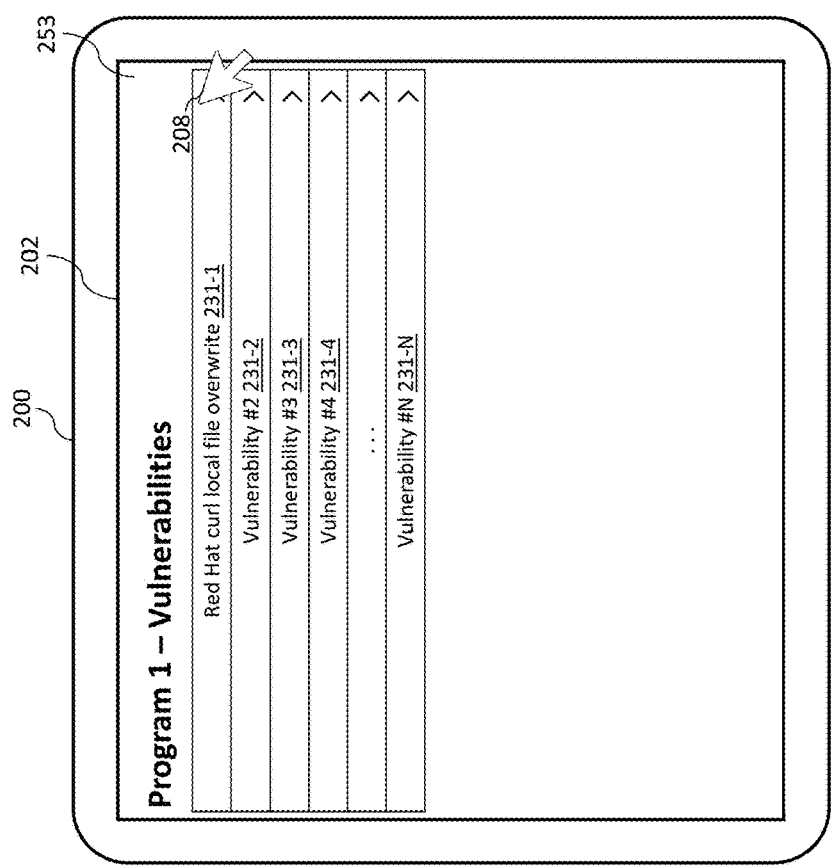

Additionally, as shown in FIG. 2I, the electronic device 200 (or the information security service) has received an input indicating that search result 232-1 corresponding to Information Security Standard #1 is the information security standard that corresponds to the first information security artifact (SSP #1.docx) (indicated by indication 236) and not the FedRAMP High information security standard as initially predicted/determined (e.g., by the one or more machine learning (e.g., classification) models) as described with respect to FIG. 2F.

In some embodiments, in response to the electronic device 200 (or the information security service) receiving the input indicating that the first information security artifact (SSP #1.docx) satisfies evaluation-criteria of the Information Security Standard #1, the electronic device 200 (or the information security service) causes the information security program corresponding to the first security artifact (SSP

1.docx) to include (or instantiate or source) a selectable/interactable hierarchical (e.g., tree-like) structure of the Information Security Standard #1 in analogous ways as described above.

If the electronic device 200 (or the information security service) did not detect the input for confirming that the first information security artifact (SSP #1.docx) satisfies the evaluation-criteria of the Information Security Standard #1 (e.g., did not receive the input selecting the search result 232-1), the electronic device 200 (or the information security service) optionally forgoes causing the information security program corresponding to the first information security artifact (SSP #1.docx) to include (or instantiate or source) the selectable/interactable hierarchical (e.g., tree-like) structure of the Information Security Standard #1. Similarly, if electronic device 200 (or the information security service) did not receive the input selecting search result 232-1 in FIG. 2I and instead detected an input selecting one or more of the search results 232-2 thru 232-4, the information security program corresponding to the first security artifact (SSP #1.docx) would optionally instead include (or source or instantiate) one or more selectable/interactable hierarchical (e.g., tree-like) structures for the different information security standards (e.g., Information Security Standard #2, 3, and/or 4) in analogous ways described above. In some embodiments, in response to the electronic device 200 detecting the input selecting the search result 232-1, the information security program corresponding to the first information security artifact (SSP #1.docx) is created in the information security service in similar ways as described with respect to FIG. 2G.

In embodiments where the electronic device 200 (or the information security service) utilizes the network of one or more machine learning models to determine the information security standard(s) corresponding to a transmitted information security artifact, the inputs described in FIGS. 2F-2I may be used to update the training data of the network of the one or more machine learning models and/or may be used in retraining the network of the one or more machine learning models. For example, in a non-limiting example, the electronic device 200 (or the information service) may update the training data of the network of the one or more machine learning models to include the first information security artifact (SSP #1.docx) (e.g., as a feature of the network) and the information security standard to which it corresponds (e.g., as a label of the network)—the FedRAMP High information security standard—in response to the electronic device 200 receiving the input in FIG. 2G. After the training data for the network of the one or more machine learning models is updated, the information security service or the electronic device 200 optionally triggers one or more processes/operations for retraining the network of the one or more machine learning models with the updated training data samples.

FIG. 2J illustrates a user interface 222-2 that is optionally displayed in response to the electronic device 200 (or the information security service) receiving the input in FIG. 2G for confirming that the first information security artifact (SSP #1.docx) is an information security artifact of the FedRAMP High information security standard. If the electronic device 200 would have instead received input indicating that the first information security artifact (SSP #1.docx) corresponds to a different information security standard, the information displayed in the user interface 222-2 would correspond to that information security standard, as will be understood from the description below. In one or more embodiments, the information security service may function to construct an intelligent contextual schematic that includes a plurality of metrics relating to a target security artifact that may be displayed to a target subscriber. The user interface 222-2 may be in a system-default format that may be configured to visually display the metrics in a standardized arrangement across the entire subscriber base of the information security service or the user interface 222-2 may be personalized (or customized) to display one or more relevant metrics (e.g., relevant metrics exceeding a complexity threshold, not displaying metrics that are irrelevant (e.g., if all controls are validated display only the control validated metric and not the other metrics as those will be non-salient to a user's understanding of the information security artifact).

In some embodiments, after determining that the first information security artifact (SSP #1.docx) satisfies evaluation-criteria of the FedRAMP High information security standard, the electronic device 200 (or the information security service) determines if one or more of the objectives defined by the FedRAMP High information security standard do not correspond to at least one information security control described (or included) in the first information security artifact (SSP #1.docx). For example, in FIG. 2J, the user interface 222-2 includes an indication 242 indicating that 11 of the objectives (e.g., objectives #1-#n) of the FedRAMP High information security standard do not correspond to least one information security control of the first information security artifact (SSP #1.docx). In some embodiments, the electronic device 200 (or the information security service) determined that the first information security artifact (SSP #1.docx) did not include information security control data directed to any of the 11 objectives (e.g., objectives #1-#n) in the FedRAMP High information security standard because (1) the portions (e.g., sections) of the first information security artifact corresponding to the 11 objectives did not include a control data description about a corresponding information security control, (2) the first information security artifact did not include any portions corresponding to any of the 11 objectives, etc. In some embodiments, if the electronic device 200 (or the information security service) determines that one or more of the objectives of an information security standard do not correspond to at least one described information security control (e.g., information security control data) in the first information security artifact (SSP #1.docx), the first information security artifact (SSP #1.docx) does not satisfy evaluation-criteria of that information security standard.

In some embodiments, the portions (e.g., sections) of the first information security artifact corresponding to the 11 objectives are quarriable (or searchable) by converting the contents of the first security artifact to a searchable structure (e.g., XML, JSON, and/or YAML equivalent). It should be understood that if the electronic device 200 (or the information security service) determined that the first information security artifact (SSP #1.docx) corresponds to a different information security standard other than FedRAMP High information security standard, the determination described above would be made relative to the different information security standard and not to the FedRAMP High information security standard. In some embodiments, the electronic device 200 (or the information security service) does not display the indication 242 if all of the objectives in the FedRAMP High information security standard correspond to at least one information security control (or information security control data) described in the first information security artifact (SSP #1.docx).

In some embodiments, after determining that the first information security artifact (SSP #1.docx) satisfies evaluation-criteria of the FedRAMP High information security standard, the electronic device 200 (or the information security service) determines if one or more information security controls described in the first information security artifact (SSP #1.docx) are associated with one or more anomalies. In some embodiments, if the electronic device 200 (or the information security service) determines that one or more of the information security controls described in the first information security artifact (SSP #1.docx) are associated with one or more anomalies, the first information security artifact does not satisfy evaluation-criteria of a respective information security standard (e.g., the FedRAMP High information security standard). For example, in FIG. 2J, the user interface 222-2 includes an indication 240 as a result of the electronic device 200 (or the information security service) determining that 29 of the information security controls described (e.g., documented) in the first information security artifact are associated with one or more anomalies (e.g., errors when compared against requirements of the information security standard).

In some embodiments, the electronic device 200 (or the information security service) determines that an information security control described (e.g., documented) in the first information security artifact is associated with one or more anomalies in response to determining that an entity (e.g., person, company, team, etc.) responsible for managing the information security control has not been indicated in the first information security artifact. For example, a first information security control of the 29 information security determined to be associated with one or more anomalies may be anomalous because the control description data of the first information security control in the first information security artifact (SSP #1.docx) does not indicate the entity responsible for managing the first information security control and/or because the entity described as being responsible for managing the first information security control has not yet been defined in the information security service (e.g., is not recognized by the information security service (e.g., an entity object corresponding to that entity has not yet been created in the information security service)). In some embodiments, entity objects are mapped to information security programs and/or information security controls created in the information security service, as will be described in greater detail below. In some embodiments, the description of an information security control in the first information security artifact, including the entity responsible for managing the information security control, is quarriable by converting the contents of the first security artifact to a searchable structure (e.g., XML, JSON, and/or YAML equivalent). In some examples, an information security control described in the first information security artifact is not necessarily anomalous if the description of that information security control does not include the entity responsible data for managing that described information security control (e.g., if the objective in the information security standard to which the information security control corresponds does not require the entity responsible to be named). In some embodiments, if the entity described as being responsible for managing the first information security control has not yet been defined in the information security service, an entity object corresponding to that entity is automatically created in the information security service.

In some embodiments, the electronic device 200 (or the information security service) determines that an information security control described (e.g., documented) in the first information security artifact is associated with one or more anomalies in response to determining that one or more parameters of a corresponding objective are incorrectly documented in the description of the information security control in the first information security artifact (SSP #1.docx) and/or because the one or more parameters of the corresponding objective are not documented in the description of the information security control in the first information security artifact (SSP #1.docx). For example, an objective of an information security standard may require that user accounts associated with the system, service, product, and/or device that is attempting to be certified to the information security standard are reviewed for compliance with account management requirements at least annually. Thus, if the information security control was documented/described in the first security artifact (SSP #1.docx) as not semantically satisfying the at least annual requirement (e.g., was described as being evaluated at least every two years, once every three years, etc.) then that information security control is optionally determined to be anomalous. The described information security control data in the first information security artifact (SSP #1.docx) corresponding to the above-described objective of the information security standard may also be determined to be anomalous if the corresponding description data of the information security control did not include any description about the duration in which user accounts are reviewed for compliance and account management requirements.

It should be understood that while the parameter of the above-described objective includes a time requirement in which the corresponding information security controls must be reviewed to satisfy that objective, other objectives may include parameters that are not time based (e.g., may instead have a parameter that has a predefined/limited number of value choices, a parameter that must be of a certain type (e.g., date, numerical, etc.), etc.), which may be determined to be anomalous in analogous ways as described above. In some embodiments, the description data of an information security control in the first information security artifact, including the parameters corresponding to the objective (to which the information security control corresponds), is quarriable by converting the contents of the first security artifact to an XML, JSON, and/or YAML equivalent. In some examples, an information security control described in the first information security artifact is not necessarily anomalous if the description of that information security control does not include a description of the parameters for the corresponding objective (e.g., if the objective in the information security standard to which the information security control corresponds may not require any parameters) (e.g., some objectives in the information security standard requires parameters to be defined in the description of the corresponding information security control(s) and others do not).

In some embodiments, the electronic device 200 (or the information security service) determines that an information security control described (e.g., documented) in the first information security artifact is associated with one or more anomalies in response to determining that an implementation status of that information security control has not been indicated. For example, a second information security control of the 29 information security controls that were determined to be associated with one or more anomalies may have been determined to be anomalous because the description of the second information security control in the first information security artifact (SSP #1.docx) does not indicate the implementation status (e.g., implemented, partially implemented, planned, alternative implementation, not applicable, etc.) of the second information security control relative to the system, service, product, and/or device that is attempting to be certified to the information security standard. In some embodiments, the description of an information security control in the first information security artifact, including the implementation status of the information security control, is quarriable by converting the contents of the first security artifact (SSP #1.docx) to an XML, JSON, and/or YAML equivalent. In some examples, an information security control described in the first information security artifact is not necessarily anomalous if the description of that information security control does not include the implementation status of the information security control (e.g., if the objective in the information security standard to which the information security control corresponds does not require the implementation status to be defined).

In some embodiments, the electronic device 200 (or the information security service) determines that an information security control described (e.g., documented, documented data) in the first information security artifact is associated with one or more anomalies in response to determining that the entity responsible for implementing that information security control has not been indicated. For example, a third information security control of the 29 information security controls that was determined to be associated with one or more anomalies may be determined to be anomalous because the description of the third information security control in the first information security artifact (SSP #1.docx) does not indicate which entity is responsible for implementing the third information security control (e.g., service provider, customer, customer and service provider, etc.) for the system, service, product, and/or device that is attempting to be certified to the information security standard. In some embodiments, the description of an information security control in the first information security artifact, including the entity that is responsible for implementing an information security control, is quarriable by converting the contents of the first security artifact (SSP #1.docx) to an XML, JSON, and/or YAML equivalent. In some examples, an information security control described in the first information security artifact is not necessarily anomalous if the description of that information security control does not include an entity responsible for implementing the information security control (e.g., if the objective in the information security standard to which the information security control corresponds does not require the entity responsible for implementing the information security control to be defined).

In some embodiments, the electronic device 200 (or the information security service) determines that an information security control described (e.g., documented) in the first information security artifact is associated with one or more anomalies in response to determining that implementation details regarding the information security control has not been indicated/provided. For example, a fourth information security control of the 29 information security controls that were determined to be associated with one or more anomalies may be determined to be anomalous because the description of the fourth information security control in the first information security artifact (SSP #1.docx) does not include any implementation details (or include at least a portion of the required implementation details for the corresponding objective). In some embodiments, the description of an information security control in the first information security artifact, including the implementation details of the information security control, is quarriable by converting the contents of the first security artifact (SSP #1.docx) to an XML, JSON, and/or YAML equivalent. In some examples, an information security control described in the first information security artifact is not necessarily anomalous if the description of that information security control does not include implementation details (e.g., the objective in the information security standard to which the information security control corresponds may not require the implementations details for the information security control to be defined).

In some embodiments, after determining that the first information security artifact (SSP #1.docx) satisfies evaluation-criteria of the FedRAMP High information security standard, the electronic device 200 (or the information security service) determines which information security controls described in the first information security artifact (SSP #1.docx) are not associated with one or more anomalies (e.g., such as the anomalies described above). For example, in FIG. 2J, the user interface 222-2 includes an indication 244 in response to the electronic device 200 (or the information security service) determining that 299 of the information security controls described (e.g., documented, documented data, control data) in the first information security artifact are not associated with one or more anomalies (e.g., indication 244 indicates that 299 of the information security controls described in the first information security artifact (SSP #1.docx) are validated with no anomalies). Additionally, in some embodiments, the user interface 222-2 includes an indication of the total number of information security controls that have been detected from the first information security artifact (SSP #1.docx). For example, as shown in FIG. 2J, the user interface 222-2 includes an indication 238 indicating that the electronic device 200 (or the information security service) has detected (e.g., determined) that the first information security artifact (SSP #1.docx) includes information describing 328 (e.g., distinct) information security controls.

As will be described in more detail later, in some embodiments, the process of creating, via one or more computers of the information security service, the information security program may include automatically mapping (e.g., determining) the information security controls detected in the first information security artifact (SSP #1.docx) to the sections and/or objectives of the corresponding information security standard, as will be described in more detail in FIGS. 2TT and 2UU. In some embodiments, the objective(s) of an industry standard to which a respective information security control described in the first information security artifact corresponds is quarriable by converting the contents of the first security artifact (SSP #1.docx) to an XML, JSON, and/or YAML equivalent.

As shown in FIG. 2K, while the electronic device 200 (or the information security service) is displaying the user interface 222-2, the electronic device 200 (or the information security service) optionally receives an input selecting the indication 244, previously described above (indicated by mouse 208 selecting indication 244). In response to the electronic device 200 (or the information security service) receiving the input selecting the indication 244 in FIG. 2K, the electronic device 200 (or the information security service) optionally displays, via the display generation component 202, the user interface 246 illustrated in FIG. 2L. In some embodiments, the electronic device 200 (or the information security service) creates, in the information security service, one or more information security control objects corresponding to the one or more information security controls described (e.g., documented, control data) in a respective information security artifact. For example, the electronic device 200 (or the information security service) optionally creates, in the information security service, one or more information security control objects corresponding to the one or more information security controls described/documented (e.g., control data) in the first information security artifact (SSP #1.docx) in response to the electronic device 200 (or the information security service) transmitting the first information security artifact (SSP #1.docx) to the information security service (as described in FIGS. 2A-2E). In some embodiments, the one or more information security control objects corresponding to the one or more information security controls may be in a pending state (e.g., not actively linked to an information security program) and displayed on a web interface of the information security service that may be viewable by a target subscriber to the information security service.

In response to the electronic device 200 (or the information security service) receiving the input selecting the indication 244 as described in FIG. 2K, the electronic device 200 (or the information security service) optionally displays, via the display generation component 202, (e.g., control object) representations 254-1 thru 254-299 in the table user interface element 260, which are representations of the information security controls objects that correspond to the 299 information security controls that were determined to have no errors (e.g., no anomalies) in the first information security artifact (SSP #1.docx). It should be understood that if the electronic device 200 (or the information security service) determined the first information security artifact (SSP #1.docx) included (e.g., described) fewer or more information security controls that were not associated with any errors/anomalies, table 260 would optionally include more or fewer representations of information security control objects accordingly.

In some embodiments, the representations 254-1 thru 254-299 are selectable to display information (or data) associated with the information security control object to which it corresponds (e.g., such as the entity responsible data for the information security control, values of the parameter(s) of the objective(s) that correspond to the information security control, implementation status data, control origination data, implementation details data, etc.). For example, in FIG. 2M, the electronic device 200 (or the information security service) is detecting a selection of the representation 254-1 corresponding to the information security control object #1 (which corresponds to the information security control #1 described in the first information security artifact (SSP #1.docx)). In response to the electronic device 200 detecting the selection of the representation 254-1 of the information security control object #1, the electronic device 200 (or the information security service) optionally displays the user interface 264 illustrated in FIG. 2N. In some embodiments, the user interface 264 includes a label 264-1 indicating that the information displayed in the user interface 264 corresponds to the information describing information security control #1 in the first information security artifact (SSP #1.docx).

User interface 264, in some embodiments, also optionally includes an indication of the objective(s) in the FedRAMP High information security standard that correspond to the information security control #1 in the first information security artifact (SSP #1.docx) (or an indication of the objective(s) in a different information security standard if the electronic device 200 (or the information security service) determined the first information security artifact (SSP #1.docx) corresponds to the different information security standard).

Additionally, as shown in FIG. 2N, the user interface 264 optionally includes fields 266-1 thru 266-5, which will now be described. Field 266-1 includes a label "Responsible Role" with a (e.g., data) value "Information Security Management Team," field 226-2 includes a label "Parameter 1" with a (e.g., data) value "Technology Leadership," field 266-3 includes a label "Implementation Status" with a (e.g., data) value "Implemented," field 266-4 includes a label "Control Origination Status" with a (e.g., data) value "Service Provider Corporate," and field 266-5 includes a label "Implementation Status Details" with a (e.g., data) value as illustrated in FIG. 2N. In some embodiments, the electronic device 200 (or the information security program) automatically created, via one or more computers, the information security control object #1 (e.g., the information security object being displayed in user interface 264 in FIG. 2N) with the fields 266-1 thru 266-5 because the objective(s) in the FedRAMP High information security to which the information security control object #1 corresponds may require such fields (e.g., the structure of the control object is derived from the FedRAMP High Information Security standard and the data or value (for each of the fields) are based on a target information security artifact (e.g., the first information security artifact). Similarly, the fields 226-1 thru 266-5 optionally include the (e.g., data) values described above (and illustrated in FIG. 2N) because the description of the corresponding information security control (information security control #1) in the first information security artifact (SSP #1.docx) corresponds to these values. Stated differently, in one or more embodiments, the data or value for each field (e.g., 266-1 thru 266-5) of a target control may be automatically and selectively extracted from the first information security artifact and installed at a target location in a target information security control object, via one or more computers of the information security service, as shown generally by way of example in FIG. 2N.

That is, in the example illustrated in FIG. 2N, the information security control #1 optionally includes the field that corresponds to the label "Responsible Role" because the objective in the FedRAMP High information security with which the information security control object #1 corresponds may require the "Responsible Role" to be defined. Similarly, the field 266-1 optionally includes the value "Information Security Management Team" because the description of the information security control #1 relating to the "Responsible Role" in the first information security artifact (SSP #1.docx) corresponds to the "Information Security Management Team." The labels and (e.g., data) values of the fields 266-2 thru 266-5 for the information security control #1 are optionally determined in analogous ways as described above.

It should be understood that if the representation 254-2 of the information security control object #2 was selected in FIG. 2M instead of the representation 254-1 of the information security control object #1, the electronic device 200 (or the information security service) would optionally displays different fields and/or (e.g., data) values than those illustrated in FIG. 2N (e.g., because the objective in the FedRAMP High information security standard to which information security control object #2 corresponds is different and/or because the description data in the first information security artifact (SSP #1.docx) corresponding to the information security control #2 is different than the description corresponding to the information security control #1).

In some embodiments, the values corresponding to the fields 266-1 thru 266-5 follow the typographical emphasis/attention (e.g., bolding, underlining, highlighting, font, size, capitalization, letter spacing, paragraph spacing, bullet points, order lists, etc.) included in the corresponding description/content data at the first information security artifact (SSP #1.docx). For example, as illustrated in FIG. 2N, the value of the field 266-5 in FIG. 2N includes typographical attention or emphasis, including one or more phrases that are bolded, underlined, highlighted, and/or bulleted. The value corresponding to the field 266-5 optionally includes one or more phrases that are bolded, underlined, highlighted, and/or bulleted because these one or more phrases in the first information security artifact (SSP #1.docx) are similarly bolded, underlined, highlighted, and/or bulleted in the description corresponding to the "Implementation Details #1" for the information security control #1.

Additionally, as shown in FIG. 2N, the user interface 264 optionally includes the selectable option 268 that, when selected, causes the electronic device 200 (or the information security service) to save the information security control object #1 to the information security program, in the information security service, that corresponds to the first security artifact (SSP #1.docx). In some embodiments, a user interface similar to user interface 264 is displayed when one of the items 241-1 thru 241-328 displayed in FIG. 2CC is selected. In some embodiments, one or more information security control objects can be saved, in bulk, to the information security program, in the information security service, that corresponds to the first security artifact (SSP #1.docx). For example, in FIG. 2O, the electronic device 200 (or the information security service) has detected an input selecting the selectable option 256-1. In response to the electronic device 200 (or the information security service) detecting the input selecting the selectable option 256-1, in FIG. 2P, the electronic device 200 (or the information security service) selects the representations 254-1 thru 254-299 of the information security control objects #1-#299 (indicated by the indications 256-1 thru 256-299). In other words, in one or more embodiments, in response to saving one or more of the information security control objects or a subset of information security control objects, the information security control objects may be redesignated from a pending, non-linked state to a saved, linked state.

Stated another way, in one or more embodiments, the cybersecurity data handling and governance service may function to identify, by one or more computers of the cybersecurity data handling and governance service, a cybersecurity artifact that includes a plurality of cybersecurity controls, wherein each cybersecurity control of the plurality of cybersecurity controls includes cybersecurity control data. In such embodiments, the cybersecurity data handling and governance service may additionally function to selectively instantiate, by the one or more computers of the cybersecurity data handling and governance service, a subscriber-agnostic cybersecurity data structure from a plurality of subscriber-agnostic cybersecurity data structures based on identifying an artifact type (e.g., System Security Plan (SSP), etc.) of the cybersecurity artifact, wherein the subscriber-agnostic cybersecurity data structure includes a plurality of distinct cybersecurity control data foundation objects (e.g., a plurality of distinct cybersecurity control data foundation objects without subscriber-specific data). Additionally, in such embodiments, the cybersecurity data handling and governance service may function to generate, a subscriber-specific cybersecurity data catalogue (e.g., information security program) based on at least the cybersecurity artifact that may include computing, by the one or computers of the cybersecurity data handling and governance service, a plurality of cybersecurity artifact metrics based on the cybersecurity control data associated with the cybersecurity artifact, including a first cybersecurity artifact metric of the plurality of cybersecurity artifact metrics may indicate a quantity of controls detected in the cybersecurity artifact; a second cybersecurity-informed artifact metric of the plurality of cybersecurity artifact metrics that may indicate a quantity of absent controls not included in the cybersecurity artifact; a third cybersecurity-informed artifact metric of the plurality of cybersecurity artifact metrics that may indicate a quantity of control anomalies associated with the cybersecurity artifact; and a fourth cybersecurity-informed artifact metric of the plurality of cybersecurity artifact metrics that may indicate a quantity of validated controls associated with the cybersecurity artifact. Additionally, in such embodiments, the cybersecurity data handling and governance service may function to display, by the one or more computers of the cybersecurity data handling and governance service, a cybersecurity artifact explainability user interface that visually displays at least one selectable user interface element that corresponds to at least one of the plurality of cybersecurity-informed artifact metrics and identify by the one or more computers of the cybersecurity data handling and governance service, a subscriber selection of the at least one selectable user interface element, and in response to identifying the subscriber selection of the at least one selectable user interface element, exposing cybersecurity metric data underpinning the at least one of the plurality of cybersecurity-informed artifact metrics. Additionally, in such embodiments, the cybersecurity data handling and governance service may function to selectively install, by the one or more computers of the cybersecurity data handling and governance service, the cybersecurity metric data underpinning the at least one of the plurality of cybersecurity-informed artifact metrics into one or more of the plurality of distinct control data foundation objects of the subscriber-agnostic cybersecurity data structure.

Additionally, as shown in FIG. 2P, while the representations 254-1 thru 254-299 of the information security controls objects #1-#299 are selected, the electronic device 200 (or the information security service) receives an input selecting the selectable option 252 (indicated by mouse 208 selecting the selectable option 252), and in response to receiving the input, the electronic device 200 (or the information security service) optionally saves and/or digitally maps and/or digitally links the information security control objects #1-#299 to the information security program, in the information security service, that correspond to the first security artifact (SSP #1.docx). In some embodiments, an indication/notification is optionally displayed, via the display generation component 202, when the information security control objects #1-#299 are successfully saved to the information security program, in the information security service, that correspond to the first security artifact (SSP #1.docx). While FIG. 2P illustrates an example of saving 299 information security control objects to the information security program, in the information security service, that correspond to the first security artifact (SSP #1.docx), it should be understood that fewer information security control objects could be saved to the information security program, in the information security service, that correspond to the first security artifact (SSP #1.docx) (e.g., if fewer information security control objects would have been selected in FIG. 2O).

In some embodiments, the electronic device 200 (or the information security service) detects a request to display one or more information security control (e.g., data) objects that have been created to correspond to the information security controls (e.g., information security control data) described in the first information security artifact (SSP #1.docx) determined to have one or more anomalies, as will now be described with respect to FIGS. 2Q-2U. In FIG. 2Q, the electronic device 200 (or the information security service) is displaying, in the user interface 246, a list of links, including a first link 248 that is selectable to navigate back to the user interface 222-2 described with respect to FIG. 2J and a second link 250 that is selectable to display user interface 246 (e.g., the user interface that the electronic device 200 is currently displaying in FIG. 2Q). Additionally, in FIG. 2Q, the electronic device 200 is detecting a selection of the first link 248, and in response, causes the electronic device 200 (or the information security service) to display the user interface 222-2 as illustrated in FIG. 2R (previously described with respect to FIG. 2J). It should be understood that in some embodiments, the user interface 246 does not include the above-described list of links (e.g., first link 248 and/or second link 250), and instead, provides the user with different means (or user interface elements) to navigate the user interfaces of the information security service.

In FIG. 2R, while the electronic device 200 (or the information security service) is displaying the user interface 222-2, the electronic device 200 detects an input corresponding to a request to display the information security control objects that correspond to the information security controls described in the first information security artifact (SSP #1.docx) determined to have one or more anomalies.

In response to the electronic device 200 (or the information security service) detecting the input in FIG. 2R, the electronic device 200 (or the information security service) optionally displays, via the display generation component 202, the user interface 266 illustrated in FIG. 2S. As illustrated, in FIG. 2S, the user interface 266 optionally includes a table user interface element 262, which includes (e.g., control data object) representations 272-1 thru 272-28 of information security control objects #300-#328. The representations 272-1 thru 272-28 are optionally being displayed in the table user interface element 262 because the information security control objects that correspond to the representations 272-1 thru 272-28 (information security control objects #300-#328) were created, in the information security service, to correspond to the 29 information security controls described in the first information security artifact (SSP #1.docx) that were determined to have one or more anomalies (e.g., such as the one or more of the anomalies described previously in FIG. 2J). In some embodiments, the information security control objects #300-#328 are saved to the information security program corresponding to the first information security artifact (SSP #1.docx) in one or more similar ways as described in FIGS. 2N and/or FIG. 2P (e.g., after individually selecting one or more of the representations 272-1 thru 272-28 and/or after selecting the representations 272-1 thru 272-28 via selectable option 268-1, selecting the selectable option 268 to save the information security control objects corresponding to the selected representations to the information security program that corresponds to the first information security artifact (SSP #1.docx)).

In some embodiments, the representations 272-1 thru 272-28 are selectable to display information for a corresponding information security control object. For example, in FIG. 2T, the electronic device 200 (or the information security service) detects an input selecting the representation 272-1 corresponding to the information security control object #300 (which corresponds to the information security control #300 data described in the first information security artifact (SSP #1.docx)). In response to the electronic device 200 (or the information security service) detecting the input selecting the representation 272-1 in FIG. 2T, the electronic device 200 (or the information security service) optionally displays the user interface 278 illustrated in FIG. 2U. In some embodiments, a user interface similar to user interface 278 is displayed by the electronic device 200 if an item corresponding to information security control object #300 is selected in FIG. 2CC. The user interface 278 optionally includes a label (or control data header) 273 that indicates the user interface 278 is displaying information corresponding to the information security control object #300 (e.g., the information security control object corresponding to the representation 272-1 selected in FIG. 2T). Additionally, the user interface 278 includes (e.g., control data) fields 280-290, which are optionally being displayed in user interface 278 for similar reasons described above and/or with respect to FIG. 2N.

In some embodiments, the electronic device 200 (or the information security service) displays one or more (visual) indications indicating that one or more fields of the information security control object #300 are associated with one or more anomalies. For example, the electronic device 200 (or the information security service) is emphasizing or driving an attention of a target subscriber to the fields 282-288 (indicated by the black border and the alert icons 213-1 thru 213-4 that are being displayed in association with the fields 282-288, respectively) and is not emphasizing field 280 because the electronic device 200 (or the information security service) determined that the description/information data corresponding to the field 280 in the first information security artifact (SSP #1.docx) was not associated with one or more anomalies and that the description/information data corresponding to the fields 282-286 in the first information security artifact (SSP #1.docx) was associated with one or more anomalies (e.g., the corresponding control data was anomalous in the first information security artifact and visually presented, by one or more computers, on the user interface shown in FIG. 2U). The electronic device 200 (or the information security) is optionally determining that fields 282-286 are associated with one or more anomalies for similar reasons described in FIG. 2J. In some embodiments, the alert icons 213-1 thru 213-4 are selectable to inform/guide the user of the electronic device 200 how to resolve the associated anomaly, thus optionally allowing the anomalies associated with an information security control object to be resolved (or remediated or mitigated) before that information security control object is added to an information security program in the information security service. In some embodiments, if the electronic device 200 detected an input corresponding to a request to save the information security object #300 to the information security program corresponding to the first information security artifact (SSP #1.docx) (e.g., by selecting the selectable option 274) while the information security control object #300 was still associated with at least one anomaly, the electronic device 200 would optionally display an indication that includes a first selectable option for continuing to save the information security control object #300 to the information security program corresponding to the first information security artifact (SSP #1.docx) and a second selectable option for forgoing saving the information security control object #300 to the information security program corresponding to the first information security artifact (SSP #1.docx). In some embodiments, if the information security control object #300 is saved to the information security program corresponding to the first information security artifact (SSP #1.docx) while the information security control object #300 is still associated with at least one anomaly, the information security control object #300 continues to not satisfy the requirements of the objective to which the information security control object #300 corresponds (e.g., even after information security control object #300 is added to the information security program corresponding to the first information security artifact (SSP #1.docx)) and thus, optionally not satisfying evaluation-criteria defined by the FedRAMP High information security standard.

In some embodiments, the electronic device 200 (or the information security service) receives an input corresponding to a request to display the one or more objectives of an information security standard (and/or one or more information security controls) that were determined to not be satisfied (or absent) by an information security artifact transmitted to the information security service, such as the first information security artifact (SSP #1.docx) described in FIGS. 2A-2E. For example, in FIG. 2V, while the electronic device 200 (or the information security service) is displaying the user interface 222-2, the electronic device (or the information security service) detects an input selecting the indication 242 (indicated by mouse 208 selecting the indication 242). In response to the electronic device 200 detecting the input selecting the indication 242 in FIG. 2W, the electronic device (or the information security service) optionally displays the user interface 294. As shown in FIG. 2W, the user interface 294 optionally includes a table user interface element 296 that includes items 295-1 thru 295-11 corresponding to Objectives #1-#11 in the FedRAMP High information security standard, respectively. As described in more detail previously, the items 295-1 thru 295-11 corresponding to Objectives #1-#11 are optionally being displayed in the table user interface element 296 in response to the electronic device 200 (or the information security service) determining that none (e.g., zero) of the information security controls described in the first information security artifact (SSP #1.docx) correspond to Objectives #1-11 in the FedRAMP High information security standard (or another information security standard if the electronic device 200 (or the information security service) detected that the first information security artifact (SSP #1.docx) corresponds to another information security standard) (e.g., if the electronic device 200 determined that the first information security artifact (SSP #1.docx) did not describe an information security control directed to Objective #1 in the FedRAMP High information security standard, the table user interface 296 would optionally not include the item 295-1 corresponding to Objective #1 in the FedRAMP High information security standard).

In some embodiments, the items 295-1 thru 295-11 are selectable to create or initiate a process to create, in the information security service, one or more corresponding information security control (e.g., data) objects. For example, in FIG. 2W, the electronic device 200 (or the information security service) is detecting an input selecting the item 295-1 corresponding to Objective #1 in the FedRAMP High information security standard (indicated by mouse 208 selecting the item 295-1). In response to the electronic device 200 (or the information security service) detecting the input in FIG. 2W, the electronic device 200 (or the information security service) optionally displays the user interface 293 in FIG. 2X. In some embodiments, a user interface similar to the user interface 293 is displayed in response to selecting the selectable option 225-1 in FIG. 2HH. In some embodiments, the user interface 293 includes a description (e.g., objective structure, an objective shell structure, a control shell structure or the like) of the Objective #1 in the FedRAMP High information security standard (e.g., in accordance with the description requirements of the AC-1 Objective described in FIG. 2UU).

In some embodiments, the user interface 293 includes a label 289 for indicating that the information security control (e.g., data) object being created at the user interface 293 is directed to Objective #1 in the FedRAMP High information security standard. Additionally, in some embodiments, the user interface 293 includes one or more (e.g., data) fields that are required in order for the information security control being created at the user interface 293 to satisfy Objective #1 in the FedRAMP High information security standard. For example, as illustrated in FIG. 2X, the user interface 293 includes fields 275-285. The field 285 is optionally included in the user interface 293 in response to the electronic device 200 (or the information security 200) service determining that the Objective #1 in the FedRAMP High information security standard requires that the one or more information security controls corresponding to the Objective #1 in the FedRAMP High information security standard are required to include an entity (e.g., person, team, company, etc.) responsible for managing the one or more information security controls corresponding to the Objective #1 in the FedRAMP High information security standard.

The Objective #1 in the FedRAMP High information security standard is optionally an objective that requires: "The organization provides basic security awareness training to information system users (including managers, senior executives, and contractors): a. As part of initial training for new users; b. When required by information system changes; and c. [Assignment: organization-defined frequency] thereafter. Accordingly, the field 283 (Parameter #1) is optionally included in the user interface 293 in response to the electronic device 200 (or the information security service) determining that the Objective #1 requires a parameter to be defined that indicates the frequency (e.g., every 3, 6, 9, 12 months, etc.) in which security awareness training is provided to information system users (e.g., the users administering the system, service, product, and/or device that is attempting to be certified to the FedRAMP High information security standard) ("The organization provides basic security awareness training to information system users (including managers, senior executives, and contractors . . . [Assignment: organization-defined frequency]"). In some embodiments, if input is directed to the field 283 that is not "time" based, the electronic device 200 (or the information security service) may display an alert/indication in association with the field 283 as described in FIG. 2U.

The fields 281 and 279 are optionally included in the user interface 293 in response to the electronic device 200 (or the information security 200) service determining that the Objective #1 in the FedRAMP High information security standard requires that information security control(s) corresponding to the Objective #1 in the FedRAMP High information security standard are required to include an implementation status and control origination status, respectively, as described previously. Similarly, the fields 277 and 275 are optionally in the user interface 293 in response to the electronic device 200 (or the information security service 200) determining that the Objective #1 in the FedRAMP High information security standard requires an explanation as to how the information security control(s) corresponding to the Objective #1 in the FedRAMP High information security standard satisfy part (a) and part (b)—described above—of the Objective #1, respectively. In some embodiments, the electronic device 200 (or the information security service) receives a sequence of one or more (e.g., text) inputs directed to the fields 275-279 for entering the required (e.g., data, subscriber-specific) information at the fields 275-285, and updates the fields 275-279 in accordance with the sequence of one or more inputs. After detecting the sequence of one or more inputs directed to the fields 275-279, the information security object corresponding to objective #1 is optionally added to the information security program corresponding to the first information security artifact (SSP #1.docx) when the electronic device 200 (or the information security service) detects a selection of selectable option 287.

Additionally, as shown in FIG. 2X, the electronic device 200 (or the information security service) is detecting an input selecting the first link 248, previously described, and in response, the electronic device 200 (or the information security service) optionally displays the user interface 222-2, as previously described and as illustrated in FIG. 2Y. In some embodiments, the electronic device 200 (or the information security service) displays, via the display generation component 202, one or more information security control objects that correspond to the detected information security controls described in the first information security artifact (SSP #1.docx). For example, in FIG. 2Y, the electronic device 200 (or the information security service) is detecting an input directed to the indication 238 (indicated by mouse 208 selecting the indication 238). In response to the electronic device 200 detecting the input selecting the indication 238 in FIG. 2Y, the electronic device 200 optionally displays the user interface 273. The user interface 273 optionally includes a table user interface element 269 that includes items 261-1 thru 261-328 corresponding to the information security control objects #1-#328 (e.g., includes information security control objects that corresponds to the information security controls described/identified in the first information security artifact (SSP #1.docx). In some embodiments, the items 261-1 thru 261-328 are selectable to save the corresponding information security control objects #1-#328 to the information security program corresponding to the first information security artifact (SSP #1.docx) in analogous way previously with respect to FIGS. 2J-2Z and/or as described above. Similarly, the items 261-1 thru 261-328 are optionally selectable to display information for a corresponding information security object in analogous ways described in FIGS. 2J-2Z (e.g., if the electronic device 200 (or the information security service) detects a selection item 261-1 corresponding to the information security control object #1, the electronic device 200 (or the information security service) optionally displays information associated with the information security control object #1 in one or more ways previously described in FIGS. 2J-2Z).

In some embodiments, after adding (e.g., saving) one or more information security control objects to the information security program corresponding to the first information security artifact (SSP #1.docx) (or after determining that the first information security artifact (SSP #1.docx) corresponds to a particular information security standard), the electronic device 200 (or the information security service) receives an input to display one or more user interfaces associated with creating an information security program corresponding to the second information security artifact (SSP #2.docx) transmitted in FIGS. 2A-2E. For example, in FIG. 2Z, the electronic device 200 receives an input that may be directed to the first link 248 (indicated by mouse 208 selecting the first link 248) after adding one or more of the information security control objects corresponding to items 261-1 thru 261-328 in one or more ways previously mentioned above. In FIG. 2AA, after the electronic device 200 received the input selecting the first link 248 in FIG. 2Z and while the information security program corresponding to the first information security artifact (SSP #1.docx) includes one or more information security objects associated with the one or more information security controls described in the first information security artifact (SSP #1.docx), the electronic device 200 (or the information security service) receives an input directed to selectable option 220-2.

In some embodiments, in response to the electronic device 200 (or the information security service) detecting the selection of the selectable option 220-2, the electronic device 200 displays user interfaces associated with creating an information security program corresponding to the next information security artifact that was transmitted to the information security service (e.g., if the electronic device 200 (or the information security service) received an input selecting the selectable option 220-2 while the electronic device 200 (or the information security service) was displaying a user interface associated with the first information security artifact (SSP #1.docx), the electronic device 200 (or the information security service) would optionally display a user interface associated with creating an information security program corresponding to a second information security artifact (SSP #2.docx) that was transmitted to the information security service). Similarly, if the electronic device 200 received an input selecting the selectable option 220-2 while the electronic device 200 was displaying a user interface associated with the second information security artifact (SSP #2.docx), the electronic device 200 (or the information security service) would optionally display a user interface associated with creating an information security program corresponding to a third information security artifact (SSP #3.docx) that was transmitted to the information security service). In some embodiments, the user interfaces displayed by the electronic device 200 for creating an information security program corresponding to the second information security artifact (SSP #2.docx) or the third security information artifact (SSP #3.docx) are analogous to the user interfaces displayed by the electronic device 200 in FIGS. 2F-2AA for creating the information security program corresponding to the first information security artifact (SSP #1.docx).

In some embodiments, the electronic device 200 (or the information security service) displays a user interface that includes one or more representations of one or more information security programs that are currently created (or may have been historically created) in the information security service. For example, in FIG. 2BB, the electronic device 200 (or the information security service) is displaying a user interface 259 that optionally includes a first 255-1, second 255-2, third 255-3, fourth 255-4, fifth 255-5, and sixth 255-6 representation of a first, second, third, fourth, fifth, and sixth information security program currently created in the information security service, respectively. As illustrated in FIG. 2BB, the first, second, third, fourth, fifth, and sixth information security programs optionally correspond to the first, second, third, fourth, fifth, and sixth information security artifacts (SSP #1.docx-SSP #6.docx) that were transmitted to the information security service in FIGS. 2A-2D. The information security programs corresponding to the representations 255-1 thru 255-6 were optionally created in the information security service in one or more ways previously described in FIGS. 2A-2AA.

The user interface 259 also optionally includes a seventh 255-7, eighth 255-8, and ninth 255-9 representation of a seventh, eighth, and ninth information security program that are not created based on a transmitted information security artifact (e.g., the electronic device 200 (or the information security service) did not initiate a process to create the seventh, eighth, and ninth information security programs as a result of one or more information security artifacts being transmitted to the information security service). In some embodiments, the electronic device 200 (or the information security service) automatically displays the user interface 259 after creating, in the information security service, one or more information security programs corresponding to the first information security artifact (SSP #1.docx) thru the sixth information security artifact (SSP #6.docx) as described in FIGS. 2A-2AA and/or in response to the electronic device 200 (or the information security service) receiving a sequence of one or more inputs for navigating to the user interface 259. It should be understood that if the information security service includes more or fewer information security programs than as described and illustrated in FIG. 2BB, the user interface 259 would optionally include more or fewer representations of information security programs.

In some embodiments, the electronic device 200 (or the information security service) displays, in the user interface 259, the representation(s) of information security programs that correspond to a transmitted information security artifact (e.g., representations 255-1 thru 255-6) differently (e.g., visually distinguished) from the representation(s) of information security programs that do not correspond to a transmitted information security artifact (e.g., representations 255-7 thru 255-9). For example, the electronic device 200 optionally displays the representations 255-1 thru 255-6 with a first color, shape, texture, text, etc. and the representations 255-7 thru 255-9 with a second color, shape, texture, text, etc. because, as described above, the representations 255-1 thru 255-6 correspond to information security programs that were created based on the first information security artifact (SSP #1.docx) thru the sixth information security information (SSP #6.docx), respectively, and the representations 255-7 thru 255-9 correspond to information security programs that were not created based on a transmitted information security artifact.

In some embodiments, as illustrated in FIG. 2BB, visually distinguishing the representations of information security programs that were created based on an information security artifact from the representations of information security programs that do not correspond to an information security artifact includes displaying, at the representations of information security programs that were created based on an information security artifact, a (e.g., data) label indicating the information security artifact to which it corresponds, and forgoing displaying, at the representations of information security programs that were not created based on an information security artifact, a (e.g., data) label indicating the information security artifact to which it corresponds.

Additionally, or alternatively, in some embodiments, visually distinguishing the representations of information security programs that were created based on an information security artifact from the representations of information security programs that were not created based on an information security artifact includes displaying, at the representations of information security programs that were created based on an information security artifact, a (e.g., digital) link (e.g., hyperlink) that is selectable to access the information security artifact to which it corresponds, and forgoing displaying, at the representations of information security programs that were not created based on an information security artifact, a (e.g., digital) link that is selectable to access the information security artifact to which it corresponds.

As described earlier, information security control (e.g., data) objects of a respective information security program optionally include a (e.g., data) field whose value corresponds (e.g., maps) to an entity (e.g., data) object that is currently created in the information security service (e.g., such as the Information Security Control Object #1 in FIG. 2N having the field 266-1 with a label "Responsible Role" and a (e.g., data) value corresponding to the Information Security Management Team, which is optionally an entity object currently created in the information security service). An entity object in the information security service optionally includes contact information (e.g., a phone number, email, etc.) for contacting the associated entity. For example, if an entity object corresponding to the Information Security Management Team is currently created in the information security service, the entity object optionally includes information for contacting the Information Security Management Team, such as a group email address, phone number, etc., and/or the individual names and email addresses for the person(s) comprising the Information Security Management Team.

In some embodiments, the electronic device 200 (or the information security service) detects an input for requesting "auditable evidence" for one or more of the information security control objects included in a respective information security program created in the information security service (e.g., evidence which can be used to demonstrate, during an audit (e.g., internal audit and/or external audit) of a system, product, service, and/or device to an information security standard, that the one or more information security control objects are operating as intended). For example, if the above-mentioned input includes a request for "auditable evidence" associated with Information Security Control Object #1 (described previously), then in response to the electronic device 200 (or the information security service) receiving the above-mentioned input, the electronic device 200 (or the information security service) optionally transmits a (e.g., email, SMS, etc.) message to the one or more contacts included in the Information Security Management Team entity object requesting that "auditable evidence" be uploaded to the Information Security Control Object #1 in the information security service. One of ordinary skill in the art would understand the type of "auditable evidence" that would need to be uploaded to demonstrate, to an auditor, that the Information Security Control Object #1 is operating in a way that satisfies the objective(s) in an information security standard (e.g., the FedRAMP High information security standard) to which Information Security Control Object #1 corresponds (as described previously).

Similarly, if the above-mentioned input includes a request for "auditable evidence" for two information security control objects, Information Security Control Object #1 and Information Security Control Object #2 (described previously), then in response to the electronic device 200 receiving the above-mentioned input, the electronic device 200 (or the information security service) optionally transmits a (e.g., email, SMS, etc.) first message to the one or more contacts associated with the entity object corresponding to the Information Security Control Object #1 (e.g., the Information Security Management Team entity object) requesting that "auditable evidence" be uploaded to the Information Security Control Object #1 in the information security service, and a second message, different from the first message, to the one or more contacts associated with the entity object corresponding to the Information Security Control Object #2 requesting that "auditable evidence" be uploaded to the Information Security Control Object #2 in the information security service.

In some embodiments, a (e.g., email, SMS, etc.) message is not transmitted to the entity objects corresponding to the Information Security Control Object #1 and the Information Security Control Object #2 to collect "auditable evidence," but rather the "auditable evidence" is automatically (e.g., continuously or periodically) collected from one or systems associated with the subscriber that are implementing the information security control object (e.g., the same or similar evidence that would have been uploaded to the information security control objects #1 and #2) if the one or more system(s) (e.g., AWS, Google Cloud, Office 365, Okta, Autho, MongoDB, ADP, Workday, GitHub, Jamf, etc.) that are implementing the information security control objects #1 and #2 are in communication (e.g., integrated) with the information security service. It shall be noted that the information security service may function to generate an auditable evidence findings report associated with a target information security program that may be used to graphically illustrate whether auditable evidence has been submitted to each of the controls in the target information security program or not.

In some embodiments, the representations 255-1 thru 255-9 are selectable to cause the electronic device 200 (or the information security service) to display an information security program overview user interface corresponding to the selected representation. For example, in FIG. 2BB, the electronic device 200 (or the information security service) receives an input selecting the representation 255-1 of the first information security program in the information security service. In some embodiments, in response to the electronic device 200 (or the information security service) detecting the input selecting the representation 255-1 of the first information security program in the information security service, the electronic device 200 (or the information security service) optionally displays the program overview user interface 253 illustrated in FIG. 2CC.

The user interface elements optionally included in the user interface 253 will now be described. The user interface 253 optionally includes a label 251 that indicates the content being displayed in the user interface 253 is associated with the first information security program (e.g., the information security program corresponding to the representation 255-1 in FIG. 2BB) and/or a description 249 of the information security standard(s) to which the first information security program corresponds (e.g., a summary of the information security standard(s)). The user interface 253 also optionally includes a text input (e.g., data) field 247 and a selectable option 237, which will be described in detail later.

Additionally, the user interface 253 also optionally includes selectable options 245, 223, and 227-1. Selectable option 245, when selected, optionally causes the electronic device 200 (or the information security service) to display, in the user interface 253, a table 229-1 that includes one or more items corresponding to the one or more information security (e.g., data) objects that are included in the first information security program that may have been constructed via the information security service. As illustrated in FIG. 2CC, the table 229-1 includes a plurality of items (or objects) 241-1 thru 241-328 corresponding to the information security control objects #1-#328 (e.g., the one or more information security control objects added to the information security program corresponding to the first information security artifact (SSP #1.docx) in FIGS. 2A-2AA). Items 241-1 thru 241-328 are optionally selectable, and when selected, cause the electronic device 200 (or the information security service) to display one or more fields of the information security control object corresponding to the selected item (e.g., in one or more analogous ways as described in FIGS. 2N, 2U, and 2X). Furthermore, as shown in FIG. 2CC, the user interface 253 optionally includes selectable options 223 and 277-1, which will be described in detail later.

In some embodiments, the electronic device 200 (or the information security service) is configured to generate different types of information security artifacts for a respective information security standard, including an information security artifact of a first type. In some embodiments, the information security artifact of the first type is an information security artifact that is submitted to the regulatory body of a respective information security standard (e.g., the authoritative source of the respective information security standard) (or to an entity (e.g., auditor, assessment organization, etc.) acting on behalf of the regulatory body) and reviewed by the regulatory body (or the entity associated with the regulatory body) to initially (and periodically thereafter) determine a system's, device's, service's, and/or product's compliance with the respective information security standard. Thus, in some embodiments, the information security artifact of the first type demonstrates, to the regulatory body or to the entity acting on behalf of the regulatory body, that the system's, device's, service's, and/or product's information security control(s) are compliant with the (applicable) objectives of the respective information security standard, as will be described in more detail below. In some embodiments, the information security artifact of the first type is an information system security plan for a respective system, device, service, or product. In some embodiments, the first, second, third, fourth, fifth, and/or sixth information security artifacts (SSP #1.docx-SSP #6.docx) described in at least FIGS. 2A-2E are information security artifacts of the first type.

Exemplary ways in which the electronic device 200 (or the information security service) generates information security artifacts of the first type will now be described. In FIG. 2CC, the electronic device 200 is displaying, at the text data field 247, a token (or) tag 235 indicating that an information security artifact of the first type for the FedRAMP High information security standard will be generated in response to the electronic device 200 detecting a selection of selectable option 237. In some embodiments, the text field 247 includes the token/tag 235 because the electronic device 200 received the text input "FedRAMP High SSP" directed to the text field 247. In some embodiments, in response to the electronic device 200 (or the information security service) detecting a selection of the selectable option 237, the electronic device 200 (or the information security service) generates, via one or more computers, the information security artifact of the first type for the FedRAMP High information security standard in accordance with evaluation-criteria defined by the FedRAMP High information security standard (e.g., because the text field 247 included the token/tag 235 corresponding to the FedRAMP High information security standard when the electronic device 200 (or the information security service) detected a selection of the selectable option 237). It shall be noted that, in one or more embodiments, the information security artifact may be generated in accordance with the evaluation-criteria defined by the FedRAMP High information security standard and includes cybersecurity control data specific to the currently displayed information security program at target locations (or regions) throughout the information security artifact (e.g., the cybersecurity control data associated with the currently displayed information security program is installed at select regions in the generated information security artifact).

In some embodiments, the electronic device 200 (or the information security service) generates the information security artifact of the first type for the FedRAMP High information security standard with content corresponding to one or more of the information security control objects included in the first information security program (e.g., the information security program that corresponds to the user interface 253). For instance, in a non-limiting example, the information security service may function to source a foundational security artifact (e.g., a security artifact template or the like) that corresponds to a target information security standard from a plurality of distinct foundational security artifacts digitally stored via an electronic cybersecurity repository of the information security service, one or more internal APIs and/or one or more external APIs, or the like using a template ID based on the token/tag 235 and install subsets of data stored within the one or more information security control data objects of a target information security program into the foundational security artifact, which, in some embodiments, may now be referred to herein as a subscriber-specific information security artifact.

For example, if the electronic device 200 determines that the information security control (data) object #1 (e.g., the information security control object corresponding to item 241-1 in FIG. 2CC) corresponds to (e.g., maps to) objective #1 in FedRAMP High information security standard (or another objective in the FedRAMP High information security standard) (e.g., an objective similar to the example objectives previously described), the electronic device 200 (or the information security service) optionally utilizes (e.g., installs, populates) one or more (data) values of the one or more fields corresponding to the information security object #1 (e.g., fields similar to the ones described in FIGS. 2N, 2U, and 2X) into the information security artifact of the first type to document the required information of the objective #1 (or the required information for another objective in the FedRAMP High information security standard).

That is, if the evaluation-criteria of the FedRAMP High information security standard requires that: (1) the entity responsible for managing the information security control corresponding to the objective #1 in the FedRAMP High information security standard be documented in the information security artifact of the first type, (2) one or more parameter(s) of the objective #1 in the FedRAMP High information security standard are required to be documented in the information security artifact of the first type, (3) an implementation status of the information security control corresponding to the objective #1 in the FedRAMP High information security standard be documented in the information security artifact of the first type, (4) the entity responsible for implementing the information security control corresponding to the objective #1 in the FedRAMP High information security standard be documented in the information security artifact of the first type, and/or (5) implementation details of the information security controls corresponding to the objective #1 in the FedRAMP High information security standard are required be documented in the information security artifact of the first type, the electronic device 200 (or the information security service) optionally utilizes (or installs or populates via one or more computers) the (data) value of the responsible role field, the (data) values of the one or more parameter fields, the (data) value of the implementation status field, the (data) value of the control origination status field, and/or the (data) values of the one or more implementation detail fields included in the information security control object #1 (previously described in FIGS. 2N, 2U, and 2X) of the target information security program, respectively, to generate/document (e.g., populate, install, or the like) the information security artifact of the first type with information required by the objective #1 in the FedRAMP High information security standard (while optionally maintaining the typographical emphasis (e.g., bolding, underlining, highlighting, font, size, capitalization, letter spacing, paragraph spacing, bullet points, order lists, etc.) for the (data) values of the one or more fields of the information security control object #1 in the information security artifact of the first type). The electronic device 200 (or the information security service) optionally generates/documents (e.g., populates) the information security artifact of the first type with information/content that may be required by other objectives in the FedRAMP High information security standard in one or more similar ways as described above.

It shall be noted that to generate an information security artifact of the first type in accordance with a respective information security standard, no additional input other than selecting the selectable option 237 is required (e.g., no input directed to a text editor/word processing application is required, etc.) and is optionally generated in less than 0.1, 0.2, 0.3, 0.5, 1, or 2 seconds. Further, in some embodiments, after generating the information security artifact of the first type, the electronic device 200 optionally displays the information security artifact of the first type in a word pressing application and/or a document viewing application installed on the electronic device 200. In other words, the information security artifact of the first type may be automatically or system-generated, by one or more computers of the information security service.

In some embodiments, generating the information security artifact of the first type in accordance with evaluation-criteria of the FedRAMP High information security standard not only requires including, in the information security artifact of the first type, the data or information required by each objective in the FedRAMP High information security standard, but may also requires that the information required by each objective to be arranged in a particular manner or structure. For example, the evaluation-criteria of the FedRAMP High information security standard optionally requires for each respective objective in the FedRAMP High information security standard that: (1) the value of the entity responsible for managing the information security control corresponding to a respective objective be provided in a first row of a first table, (2) the one or more parameters of the respective objective be provided in one or more second rows of the first table, (3) the implementation status of the respective objective be selected from one or more selectable checkboxes corresponding to one or more predefined values in a third row (e.g., implemented, partially implemented, planned, alternative implementation, not applicable, etc.), (4) the control origination of the information security control corresponding to the respective be selected from one or more checkboxes corresponding to one or more predefined values in a fourth row (e.g., service provider, customer, customer and service provider, etc.), and/or (5) the implementation details for the information security control(s) corresponding to the respective objective be defined in a second table, separate and/or below the first table.

Accordingly, for the remaining parts of the disclosure, when an information security artifact of the first type is generated in accordance with evaluation-criteria for a respective information security standard, it should be understood that the first information security artifact is optionally generated in accordance with the data (or information) required by each objective in that respective information security standard and/or in accordance with the required arrangement (e.g., format and/or structure), such that the regulatory body of the respective information security standard (or the entity acting on behalf of the regulatory body) will accept and review the information security artifact of the first type. It should also be understood that the evaluation-criteria for other information security standards are optionally different than the evaluation-criteria of the FedRAMP High information security standard, and thus, information security artifacts generated by the electronic device 200 (or the information security service) of the first type optionally include different content and/or are (e.g., structurally) arranged in different manners.

In some embodiments, before the electronic device 200 (or the information security service) generates the information security artifact of the first type for the FedRAMP High information security standard, the electronic device 200 optionally receives a sequence of one or more inputs for modifying/updating one or more (e.g., data) fields (e.g., as described in FIGS. 2N, 2U, and 2X) of one or more information security control objects included in an information security program from having one or more first data values to having one or more second data values. For example, after creating the first information security program in the information security service as described in FIGS. 2A-2AA and before generating the information security artifact of the first type for the FedRAMP High information security standard, the electronic device 200 (or the information security service) optionally receives an input for modifying one or more (e.g., data) fields of one or more information security control objects in the first information security program, including modifying a first field (e.g., field 266-1 in FIG. 2N) of the information security control object #1 (corresponding to item 241-1) from having a first value (e.g., Information Security Management Team) to having a second value (e.g., Executive Leadership Team) and modifying a second field of the information security control object #2 (corresponding to item 241-2) from having a third value (e.g., an "implemented" implementation status) to having a fourth value (e.g., a "not implemented" implementation status). While the above embodiment describes an example where the values of the first field of the first information security control object #1 and the second field of the second formation security control object #2 were modified, it should be understood that any fields of a respective information security object and/or that any combination of information security control objects could optionally be modified before the electronic device 200 (or the information security service) generates an information security artifact of the first type. In some embodiments, the electronic device 200 optionally displays an alert in analogous ways as described in FIG. 2U if the one or more inputs cause the one or more fields of the first information security control object #1 to be associated with one or more anomalies, as described with respect to FIG. 2J.

In some embodiments, after updating the first (e.g., data) field of the information security control object #1 and the second (e.g., data) field of the information security control object #2 included in the first information security program in accordance with the above-described input, the electronic device 200 (or the information security service) optionally determines that a previously generated information security artifact (SSP #1.docx) with which the first information security program was created based on no longer contains accurate/current information (e.g., because the first information security program includes changes (or data) not included in the previously generated information security artifact (SSP #1.docx)). In response to the electronic device 200 (or the information security service) determining that the first information security artifact (SSP #1.docx) no longer contains accurate/current information, the electronic device 200 (or the information security service) optionally automatically generates (e.g., without user input) a new information security artifact of the first type for the FedRAMP High information security standard (e.g., the information security standard corresponding to the SSP #1.docx as determined in FIG. 2H) in accordance with the evaluation-criteria defined by the FedRAMP High information security standard. In some embodiments, after generating the new information security artifact of the first type, the electronic device 200 optionally displays the new information security artifact of the first type in a word pressing application and/or a document viewing application installed on the electronic device 200.

In some embodiments, the electronic device 200 (or the information security service) optionally generates one or more information security artifacts for one or more information security standards (e.g., one or more information security standards different from the information security standard corresponding to the information security artifact that the information security program was created based on). For example, in FIG. 2DD, the text field 247 includes the token/tags 229, 231, 233, and 235 indicating that the electronic device 200 (or the information security service) will generate the information security artifacts of the first type for the SOC 2 information security standard, ISO 27001 information security standard, FedRAMP Low information security standard, and the FedRAMP High information security standard in response to the electronic device 200 detecting an input selecting the selectable option 237. In some embodiments, the text field 247 optionally includes the token/tags 229, 231, 233, and 235 in response to the electronic device 200 (or the information security service) optionally detecting a first text input directed to the text field 247 that included "FedRAMP High SSP," a second text input directed to the text field 247 that included "FedRAMP Low SSP," a third text input directed to the text field 247 that included "ISO 270001 SSP," and a fourth text input directed to the text field 247 that included "SOC 2 SSP."

In FIG. 2EE, while the text field 247 includes the token/tags 229-235, the electronic device 200 (or the information security service) detects an input selecting the selectable option 237. In response to the electronic device 200 receiving the input selecting the selectable option 237, the electronic device 200 (or the information security service) optionally generates a first, second, third, and fourth information security artifact (e.g., distinct information security artifacts) of the first type for the FedRAMP High information security standard, the FedRAMP Low information security standard, the ISO 27001 information security standard, and the SOC 2 information security standard, respectively. It should be understood that if the text field 247 would have included fewer, more, or different token/tags, the electronic device 200 (or the information security service) would optionally have generated fewer, more, or different information security artifacts of the first type in accordance with the token/tags included in the text field 247 when the electronic device 200 detected a selection of the selectable option 237. It shall be noted that in some embodiments, the text field 247 may include a plurality of tokens/tags and in response to the electronic device (or the information security service) receiving an input selecting the selectable option 237, a single (or composite) information security artifact may be generated that includes a corresponding security artifact for each of the plurality of token/tags.

Thus, as shown in FIGS. 2DD and 2EE, even though the first information security program (e.g., the information security program illustrated in the user interface 253) was created based on the first information security artifact (SSP #1.docx), which corresponded to the FedRAMP High information security standard, the electronic device 200 (or the information security service) is able to utilize the information security control objects and the corresponding control data included in the first information security program (e.g., the values of the fields of the information security control objects, derive information security objects germane to other standards, or the like) to generate information security artifacts of the first type in accordance with evaluation-criteria of other information security standards (in addition to the FedRAMP High information security standard). That is, in one or more embodiments, in response to detecting a selection of the artifact generation object 237, the information security service may function to automatically (and optionally simultaneously) generate a plurality of distinct information security artifacts of a plurality of distinct information security standards by selectively installing appropriate subsets of control data included in the information security program into each of a plurality of plurality of foundational information security artifacts (e.g., templates) corresponding to each of the plurality of token/tags (as described in more detail in method 300). It shall be noted that the information security service may function to source, via one or more computers, each of the plurality of foundational information security artifacts (e.g., templates) based on searching/querying a foundational information security artifact repository based on one or more target token/tags.

As mentioned previously, in some embodiments, the plurality of information security control objects #1-#328 included in the first information security program (corresponding to items 241-1 thru 241-328) optionally correspond to one or more objectives in the FedRAMP High information security standard (e.g., information security control object #1 corresponds to objective #1, information security control object #2 corresponds to objective #2 in the FedRAMP High information security standard, etc.). In some embodiments, when generating an information security artifact of the first type for an information security standard that is different (or distinct) from the information security standard corresponding to the information security artifact that an information security program was created based on, the electronic device 200 (or the information security service) derives or determines which objectives in the FedRAMP High information security standard correspond (e.g., map) to the objectives in the different information security standard and thus, which information security control objects and corresponding control data to utilize (and not to utilize) when generating the information security artifact of the first type for the different information security standard. For example, if the information security control objects #1-#100 (associated with items 241-1 thru 241-100) correspond to objectives #1-#100 in the FedRAMP High information security standard, the electronic device 200 (or the information security service) optionally automatically determines/derives that objectives #1-#100 in the FedRAMP High information security standard correspond to objectives #50-#150 in the ISO 27001 information security standard, and thus utilizes one or more (e.g., data) values of the one or more fields corresponding to the information security objects #1-#100 (e.g., fields similar to the ones described in FIGS. 2N, 2U, and 2X) to document (e.g., populate, generate or the like) the information security artifact of the first type with the required information for objectives #50-#150 in the ISO 27001 information security standard. The required information for the remaining objectives in the ISO 27001 information security standard may optionally be added to the information security artifact of the first type in analogous ways described above.

Accordingly, the electronic device 200 (or the information security service) optionally utilizes different subsets of the plurality of information security control objects included in the first information security program when generating information security artifacts of the first type for different information security standards (e.g., because different information security standards optionally include different objectives). It should be understood that if the electronic device 200 was instead displaying a user interface for a second information security program, different from the first information security program, when the electronic device 200 detected the selection of the selectable option 237, the electronic device 200 (or the information security service) would have instead generated the information security artifact of the first type using (e.g., based on) one or more of the plurality of information security control objects included in the second information security program and not the first information security program.

In some embodiments, rather than the electronic device 200 (or the information security service) generating an information security artifact of the first type in accordance with evaluation-criteria of a respective information security standard, the electronic device 200 (or the information security service) is optionally able to generate the information security artifact of the first type in accordance with user-defined criteria or subscriber-defined criteria (e.g., an information security artifact of the first type is generated in accordance with an arrangement defined by a user of the electronic device 200 (or a subscriber of the information security service)). For example, the electronic device 200 (or the information security) may receive one or more instructions from the user of the electronic device 200 (or the information security service) to generate an information security artifact of the first type in accordance with evaluation-criteria of the FedRAMP High information security (e.g., arranging the information security artifact of the first type in a similar way to the FedRAMP High information security standard) while documenting (e.g., populating, generating or the like) the information security artifact of the first type with the information required for the objectives in the ISO 270001 information security standard (e.g., documenting/populating the information security artifact of the first type with content corresponding to the information security control objects in the first information security program that are determined to correspond to the objectives of the ISO 270001 information security standard). It should be understood that electronic device 200 (or the information security) could also generate information security artifacts of the first type in other user-defined or subscriber-defined ways without departing from the scope of disclosure. In some embodiments, as will be described later, the electronic device 200 (or the information security service) optionally generates an information security artifact of a second type for an information security standard for reporting vulnerability data to a regulatory body of an information security standard.

In one or more embodiments, the subscribers to the information security service may be required or otherwise advantageous for the subscribing organizations to prove to themselves or other that they employ practices that comply with one or more public standards or programs, such as, American Institutes of Certified Public Account's (AICPA's) Service Organization Control 2 (SOC 2), the European Union's General Data Protection Regulation (GDPR), FedRAMP, or the like. Proving compliance with such programs may be an expensive or onerous process that consumes time and resources that could better be used elsewhere. In many cases, programs define a set of requirements that each may be associated with one or more controls. Thus, at least one technical advantage of the system 100 implementing the method 200 may be to prove compliance (e.g., generate compliance artifacts, information security artifacts, or the like) by automatically collecting and/or fast-generating documentation that indicates that the organization may be complying with the controls or requirements of a given program.

In some embodiments, the electronic device 200 (or the information security service) optionally displays one or more notifications/alerts in response to receiving an input for generating one or more information security artifacts of the first type for one or more respective information security standards, as will now be described with respect to FIGS. 2FF-2II. In FIG. 2FF, the electronic device 200 optionally receives an input selecting the selectable option 237 while the text field 247 includes the token/tag 235-1 corresponding to the NIST 800-53 information security standard. In response to the electronic device 200 (or the information security service) receiving the input selecting the selectable option 237, the electronic device 200 (or the information security service) optionally generates an information security artifact of the first type for the NIST 800-53 information security standard based on the information security control objects included in the first information security program that correspond to the objectives of the NIST 800-53 information security standard and in accordance with evaluation-criteria defined by the NIST 800-53 information security standard (e.g., in analogous ways as described above with respect to generating an information security artifact of the first type for the FedRAMP High information security standard).

In some embodiments, before the electronic device 200 (or the information security service) generates the information security artifact of the first type for the NIST 800-53 (or analogously to any other information security standard previously described), the electronic device 200 (or the information security service) optionally determines if the NIST 800-53 information security standard includes one or more objectives that do not correspond to at least one information security control object included in the first information security program. If the electronic device 200 (or the information security service) determines the NIST 800-53 information security standard includes one or more objectives that do not correspond to at least one information security control object in the first information security program, the electronic device 200 (or the information security standard) optionally displays an indication indicating that one or more of the objectives included in the NIST 800-53 information security standard do not include a corresponding information security control object in the first information security program. For example, in FIG. 2GG, the electronic device 200 is displaying the indication 227 indicating that 11 objectives (e.g., objectives #1-#n) in the NIST 800-53 information security standard do not correspond to an information security control object in the first information security program. In some embodiments, if one or more of the anomalies identified for one or more information security control objects (previously described in FIGS. 2J-2AA) were not corrected (e.g., via a sequence of one or more inputs) before the one or more information security objects were added to the first information security program, the indication 227 optionally, additionally, or alternatively, indicates the one or more anomalies that are still associated with the one or more information security control objects (e.g., if the one or more information security control objects correspond (e.g., map) to one or more objectives in the NIST 800-53 information security standard—the information security standard for which the information security artifact of the first type is being generated).

In some embodiments, if the electronic device 200 (or the information security service) determines that each objective in the NIST 800-53 information security standard corresponds to at least one information security control object included in the first information security program, the electronic device 200 (or the information security service) generates the information security artifact of the first type for the NIST 800-53 information security standard without displaying the indication 227 illustrated in FIG. 2GG.

In some embodiments, if the electronic device 200 (or the information security service) determines that each objective (e.g., one or more objectives, all objectives, etc.) in the NIST 800-53 information security standard does not correspond to at least one information security control object included in the first information security program, the electronic device 200 (or the information security service) optionally displays the indication 227 with a selectable option that is selectable to initiate a process to create an information security control object for each objective in the NIST 800-53 information security standard that does not currently correspond to an information security control object in the first information security program and to save those created information security control objects to the first information security program. Additionally, or alternatively, in response to the electronic device 200 (or the information security service) determining that the NIST 800-53 information security standard does not correspond to at least one information security control object included in the first information security program, the electronic device 200 (or the information security service) optionally performs a second determination to determine if another information security program (e.g., a second information security program of the target subscriber) in the information security service includes information security control objects that correspond to the objectives in the NIST 800-53 information security for which the first information security program did not include a corresponding information security control object.

For example, in FIG. 2GG, after the electronic device 200 (or the information security service) determined that 11 objectives (e.g., objectives #1-#11) in the NIST 800-53 information security standard did not correspond to any information security control objects in the first information security program, the electronic device 200 (or the information security service) determined that the second information security program includes information security control objects corresponding to the 11 objectives (e.g., objectives #1-#11) in the NIST 800-53 information security standard for which the first information security program did not include information security control objects. As a result of this determination, in some embodiments as illustrated in FIG. 2GG, the electronic device 200 (or the information security service) optionally displays, at the indication 227, information indicating that the second information security program includes information security control objects corresponding to the 11 objectives (e.g., objectives #1-#11) in the NIST 800-53 information security standard for which the first information security program did not include corresponding information security control objects. If multiple information security programs include information security control objects that correspond to the 11 objectives (e.g., objectives #1-#11) in the NIST 800-53 information security standard, the indication 227 would optionally include information indicating that multiple information security programs include information security control objects corresponding to the 11 objectives (e.g., objectives #1-#11) in the NIST 800-53 information security standard for which the first information security program did not include information security control objects (rather than only indicating information about a single information security program as illustrated in FIG. 2GG).

Additionally, as shown in FIG. 2GG, while the indication 227 includes information indicating that the second information security program includes information security control objects corresponding to the 11 objectives (e.g., objectives #1-#11) in the NIST 800-53 information security for which the first information security program did not include corresponding information security control objects, the indication also optionally includes selectable options 225-1 and 225-2. Selectable option 225-1, when selected, optionally causes the electronic device 200 (or the information security service) to generate the information security artifact of the first type for the NIST 800-53 information security standard with content from the information security control objects included in the first information security program that corresponds to the objectives in the NIST 800-53 information security (except information security objectives #1-#11) and with content from the information security objects included in the second information security program that correspond to objectives #1-#11. In some embodiments, the indication 227 includes information indicating which information security control objects in the second information security program correspond to the 11 objectives (e.g., objectives #1-#11) in the NIST 800-53 information security for which the first information security program did not include corresponding information security control objects. Optionally, in one or more embodiments, based on generating the information security artifact that includes the eleven (11) information security control objects, the information security service may function to (e.g., simultaneously, subsequent) install, duplicate or the like the eleven (11) information security control objects into the first information security program.

Alternatively, selectable option 225-2, when selected, optionally causes the electronic device 200 (or the information security service) to generate the information security artifact of the first type for the NIST 800-53 information security standard with content from the information security control objects included in the first information security program that corresponds to the objectives in the NIST 800-53 information security standard (except for objectives #1-#11 in the NIST 800-53 information security standard) and without content from the information security objects included in the second information security program that correspond to the objectives #1-#n-which optionally causes the evaluation-criteria of the NIST 800-53 information security to not be satisfied.

In some embodiments, if the electronic device 200 (or the information security service) determines that the second information security program includes information security control objects that correspond to a portion (e.g., subset), but not all, of the 11 objectives (e.g., objectives #1-#n) in the NIST 800-53 information security standard for which the first information security program did not include corresponding information security control objects, the electronic device 200 (or the information security service) optionally performs another determination to determine if another information security program in the information security service includes information security control objects that corresponds to the remaining portion of the objectives in the NIST 800-53 information security standard for which the first and the second information security programs did not include corresponding information security control objects.

For example, as an alternative to FIG. 2GG, if the electronic device 200 (or the information security service) would have instead determined that the second information security program includes information security control objects corresponding to 5 of the 11 objectives in the NIST 800-53 information security standard for which the first information security program did not include corresponding information security control objects, the electronic device 200 (or the information security service) optionally would have optionally performed another determination to determine if any other information security program in the information security service included information security control objects that correspond to the remaining 6 of the 11 objectives in the NIST 800-53 information security standard for which the first and the second information security programs did not include corresponding information security control objects.

In some embodiments, if the electronic device 200 (or the information security service) determined that a third information security program in the information security service includes the remaining 6 of the 11 objectives in the NIST 800-53 information security standard for which the first and the second information security program did not include corresponding information security control objects, the indication 227 would optionally include information indicating that while the first information security program does not include any information security control objects that correspond to 11 of the objectives required in the NIST 800-53 information security standard (e.g., objectives #1-#11), the second and the third information security program do include information security control objects corresponding to objectives #1-#5 and objectives #6-#11, respectively.

In such embodiments, selectable option 225-1, when selected, optionally causes the electronic device 200 (or the information security service) to generate the information security artifact of the first type for the NIST 800-53 information security standard with content from the information security control objects included in the first information security program for the objectives in the NIST 800-53 information security (except for the objectives #1-#11) and with content from the information security objects included in the second and the third information security program that correspond to the objectives #1-#11. Alternatively, selectable option 225-2, when selected, optionally causes the electronic device 200 to generate the information security artifact of the first type for the NIST 800-53 information security standard with content the information security control objects included in the first information security program that correspond to the objectives in the NIST 800-53 information security (except objectives #1-#11) and without content from the information security objects included in the second and the third information security programs that correspond to objectives #1-#11- which optionally causes the evaluation-criteria of the NIST 800-53 information security to not be satisfied.

In some embodiments, as generally illustrated in FIG. 2HH, if the electronic device 200 (or the information security service) determines that none of the information security programs includes information security control objects corresponding to one or more of the objectives in the NIST 800-53 information security standard, the electronic device 200 (or the information security service) optionally displays the indication 227 with a selectable option (e.g., selectable option 225-1) for creating, in the first information security program, information security control objects for the one or more objectives in the NIST 800-53 that do not currently correspond to any information security control objects included in any information security programs at the information security service. In some embodiments, the information security control objects are created in analogous ways as described in FIG. 2X.

In some embodiments, rather than updating one or more fields of one or more information security control objects included in the first information security program as described previously (e.g., in response to receiving text input directed to one or more of the fields illustrated in FIGS. 2N, 2U, and 2X), the electronic device 200 (or the information security service) may update (e.g., initiate a process to update) the one or more (e.g., data) fields of the one or more information security control objects in response to receiving an updated version of the first information security artifact, as will now be described in FIGS. 2II-2OO. In FIG. 2II, the electronic device 200 (or the information security service) is detecting a selection of the selectable option 223 (indicated by the mouse 208 selecting the selectable option 223). In some embodiments, in response to the electronic device 202 receiving the input selecting the selectable option 223, the electronic device 200 optionally displays, at the user interface 253, a user interface element 215-1 and a selectable option 217-1, which will now be described.

In some embodiments, the electronic device 200 optionally displays a similar file browsing user interface 235-1 previously described in FIG. 2C in response to the electronic device 200 (or the information security service) detecting an input selecting the selectable option 217-1. For example, in FIG. 2KK, the electronic device 200 (or the information security service) detects an input selecting the selectable option 217-1 (indicated by mouse 208 selecting the selectable option 217-1). In response to the electronic device 200 (or the information security service) detecting the input in FIG. 2KK, in FIG. 2LL, the electronic device 200 optionally displays the file browsing user interface 235-1 previously described in FIG. 2C. Additionally, as shown in FIG. 2LL, the electronic device 200 (or the information security service) is receiving an input selecting the selectable option 210-7 (indicated by mouse 208 selecting the selectable option 210-7) while an updated version of the first information security artifact 212-1 (SSP #1.docx*) has been selected in the file browsing user interface 235-1 (indicated by checkmark 214-1). In response to the electronic device 200 receiving the input selecting the selectable option 210-7 in FIG. 2LL, the electronic device 200 optionally transmits, to the information security service, the updated version of the information security artifact (SSP #1.docx*) to the information security service. For example, in FIG. 2MM, the information security service has received the updated version of the information security artifact (SSP #1.docx*) from the electronic device 200 (indicated by the electronic device 200 displaying the document name of the updated version of the first information security artifact—SSP #1.docx*—at the user interface element 215-1).

In some embodiments, the electronic device 200 (or the information security service) determines if the updated version of the first information security artifact (SSP #1.docx*) includes one or more changes to the one or more information security control objects (e.g., the (e.g., data) fields of the one or more information security control objects) included in the first information security program. The electronic device 200 (or the information security service) optionally determines that the updated version of the first information security artifact (SSP #1.docx*) includes one or more changes to a respective information security control object in the first information security program if the current values of one or more fields of the respective information security control object in the information security service and the description corresponding to the one or more fields for the respective information security object in the updated version of the first information security artifact (SPP #1.docx*) are different, as will be described in more detail in FIG. 2NN. In some embodiments, the description in the updated version of the first information security artifact (SPP #1.docx*) corresponding to a respective field(s) of respective information security object is quarriable in similar ways as previously described with respect to the first information security artifact.

In some embodiments, if the electronic device 200 (or the information security service) determines that the updated version of the first information security artifact (SSP #1.docx*) includes one or more changes directed to the one or more information security control objects, the electronic device 200 optionally displays one or more items corresponding to the one or more changes in the user interface 253. For example, in FIG. 2MM, after (e.g., in response to) the electronic device 200 transmitting, to the information security service, the updated version of the first information security artifact (SSP #1.docx*), the electronic device 200 determined that the updated version of the first information security artifact (SSP #1.docx*) includes changes directed to five (5) of the information security control objects in the first information security program. As a result of the electronic device 200 (or the information security service) determining that the updated version of the first information security artifact (SSP #1.docx*) includes changes/modifications directed to 5 of the information security control objects in the first information security program, as shown in FIG. 2MM, the electronic device 200 optionally displays items 291-1 thru 219-5 corresponding to the 5 changes (changes #1-#5, respectively). It should be understood that if the electronic device 200 (or the information security service) determined that the updated version of the first information security artifact (SSP #1.docx*) included more or fewer changes directed to the information security control objects in the first information security program, the table 227-1 would include fewer or more items corresponding to the more or fewer changes.

In some embodiments, the electronic device 200 (or the information security service) displays information directed to the changes detected in the updated version of the first information security artifact (SSP #1.docx*). For example, as additionally illustrated in FIG. 2MM, the electronic device 200 is detecting a selection of item 219-5 corresponding to change #5 (indicated by mouse 208 selecting item 219-5). In response to the electronic device 200 detecting the selection of item 219-5 in the table 227-1, the electronic device 200 optionally displays the user interface 231-1 for change #5. The user interface 231-1 optionally includes a field 235-1 with a label "Control Name" and a value "Control #198" to indicate that change #5 is directed to the information security control object #198 in the first information security program.

The user interface 231-1 also includes the fields 237-1 thru 241-1. The user interface optionally includes the fields 237-1 thru 241-1 because the electronic device 200 (or the information security service) determined that the current values of the responsible role, implementation status, and implementation details #2 of the information security control object #198 (corresponding to fields 235-1 thru 241-1) are different than the description data corresponding to these fields in the updated version of the first information security artifact (SSP #1.docx*). The information security object #198 optionally includes more fields than the ones illustrated in FIG. 2NN, but the user interface 231-1 optionally does not include these fields because the values of these fields and the description corresponding to these fields in the updated version of the first information security artifact (SSP #1.docx*) are the same.

In some embodiments, if the electronic device 200 (or the information security service) determines that one or more current values of one or more fields of the information security control object #198 are different than the description corresponding to these fields in the updated version of the first information security artifact (SSP #1.docx*), the user interface 231-1 indicates, in the user interface 231-1, the new values of the one or more fields if the changes (to the information security control object #198 (Change #5 illustrated in the user interface 231-1) are accepted. For example, in FIG. 2NN, the field 237-1 of the information security control object #198 (corresponding to the label "Responsible Role") is currently indicating that that if Change #5 is accepted (e.g., by selecting the selectable option 233-1) the value of the field 237-1 will change from having a current value of "Information Security Director" (indicated with strikethrough) to a new value "Information Security Manager" (not indicated in strikethrough) because the description corresponding to field 237-1 because the updated version of the first information security artifact (SSP #1.docx*) corresponds to (e.g., has the text value) "Information Security Manager". Other ways of indicating the current value of a field and a new value of the field if a respective change is accepted include visually de-emphasizing the current value of the field and visually emphasizing the new value of the field if a respective change is accepted, such as with an animation and/or with other forms of typographical emphasis. The fields 239-1 and 241-1 of the information security control object #198 illustrated in FIG. 2NN optionally have the current values of those fields strikenthrough and the new values of those fields (e.g., if change #5 is accepted) not strikenthrough) for analogous reasons described with respect to field 235-1. It should be understood that if the electronic device 200 would have instead detected a selection of item 219-1 corresponding to change #1 instead of the item 219-5 corresponding to change #5 in FIG. 2MM, the electronic device 200 optionally would have displayed a user interface for change #1 in one or more similar ways described above.

In some embodiments, the changes included in the updated version of the first information security artifact (SSP #1.docx*) are accepted in bulk (as opposed to individually accepting changes as described in FIG. 2NN). For example, in FIG. 2MM, if the electronic device 200 detects a selection of checkbox 225-1 (or an input individually selecting any combination of checkboxes 225-2 thru 225-5) followed by a selection of selectable option 223-1, the electronic device 200 (or the information security service) optionally updates, in bulk, the fields of the information security control objects in accordance with changes #1-5 (e.g., updates the values of the fields for the information security control objects to which changes #1-5 correspond).

In some embodiments, in response to receiving a request to update/modify one or more values of one or more fields of a respective information security control object in the first information security program, the electronic device 200 (or the information security service) optionally determines if the respective information security control object corresponds (e.g., is similar) to one or more other information security control objects in one or more other distinct information security programs. In some embodiments, a first respective information security control object in a first information security program is optionally similar to a second respective information security control object in a second program if the first and the second respective information security control objects correspond to a same objective in a respective information security standard, if the labels and values of the fields at the first and the second respective information security controls objects are the same, etc. For example, after the electronic device 200 received the input selecting the selectable option 233-1 for updating/modifying the values of the fields 237-1 thru 241-1 in accordance with change #5, the electronic device 200 (or the information security service) optionally determines that the information security control object #198 (e.g., the information security object corresponding to change #5 as indicated by field 235-1 in FIG. 2NN) is similar to information security control object #50 in a second information program in the information security service and information security control object #101 in a third information security program in the information security service for the one or more reasons described above.

In some embodiments, if the electronic device 200 (or the information security service) determines that the information security control #198 (e.g., the information security object corresponding to change #5 as indicated by field 235-1 in FIG. 2NN) is similar to one or more information security control objects in one or more other information security programs, the electronic device 200 (or the information security service) optionally displays an indication to indicate that information security control #198 is similar to one or more information security objects in one or more other information security programs. For example, in FIG. 2OO, after (e.g., in response to) the electronic device 200 (or the information security service) determined that information security control object #198 is similar to information security control object #50 in the second information program and information security control object #101 in the third information security program, the electronic device 200 optionally displays indication 241-1. The electronic device 200 optionally updates the values of fields 237-1 thru 239-1 illustrated in FIG. 2NN in accordance with change #5 without displaying the indication 241-1 if the electronic device 200 (or the information security service) determines that information security control object #198 is not similar to one or more information security control objects in one or more other information security programs.

As illustrated in FIG. 2OO, the indication 241-1 optionally includes text indicating the information security control objects to which information security control object #198 is similar (e.g., "Control #198 in Program 1 is similar to Control #50 in Program 2 and Control #101 in Program 3"). Additionally, or alternatively, as illustrated in FIG. 2OO, the electronic device 200 optionally includes text prompting the user of the electronic device 200 (or the information security service) if the information security control object #50 in the second information security program and the information security control object #101 in the third information security program should be updated in accordance with change #5 described in FIG. 2NN and/or selectable options 225-1 and 225-2. Selectable option 225-1 is optionally selectable, and when selected, optionally causes the electronic device 200 (or the information security service) to update information security control objects #198, #50, and #101 in the first, second, and third information security programs, respectively, in accordance with change #5 described in FIG. 2NN (e.g., updates the values of the fields in accordance with change #5). Conversely, selectable option 225-2 is optionally selectable, and when selected, optionally causes the electronic device 200 (or the information security service) to update information security control object #198 of the first information security program in accordance with change #5 described in FIG. 2NN (e.g., updated the values of the field in accordance with change #5) without updating information security control objects #50 and #101 in accordance with change #5 (e.g., the information security control objects that were determined to be similar to control object #198).

In some embodiments, the electronic device 200 (or the information security service) does not require all of the information security control objects that are similar to the information security object #198 to be updated in accordance with change #5 in response to detecting a selection of selectable option 225-1. For example, if the electronic device 200 (or the information security service) determines that information security control object #198 is similar to one or more information security control objects in one or more other information security programs, the electronic device 200 is optionally able to receive input before receiving the selection of selectable option 225-1 to indicate which information security objects of the one or more information security control objects to update in accordance with change #5 (and similarly which of the information security control objects of the multiple information security control objects that are not be updated in accordance with change #5).

In some embodiments, before generating the information security artifact for a respective information security standard, the electronic device 200 (or the information security service) determines if the respective information security standard has been updated (e.g., via offline changes or the like) since the first information security program was created in the first information security service, since the last time the electronic device 200 (or the information security service) generated an information security artifact for the respective information security standard, etc. For example, in FIG. 2PP, the electronic device 200 has received an input for generating an information security artifact of the first type for the NIST 800-53 information security standard (indicated by the mouse 208 selecting the selectable option 237 while the text field 247 includes the token/tag 201 corresponding to the NIST 800-53 information security standard). In response to the electronic device 200 receiving the input in FIG. 2PP and before generating the information security artifact of the first type for the NIST 800-53 information security standard, the electronic device 200 (or the information security service) optionally determines if the NIST 800-53 information security standard includes one or more updates since the last time the electronic device 200 generated an information security artifact of the first type for the NIST 800-53. It should be understood that if the input in FIG. 2PP included a request to generate an information security artifact of the first type for a different information security standard in addition, or as an alternative, to the NIST 800-53, the electronic device 200 (or the information security service) optionally determines if the different information security includes one or more updates in addition, or as an alternative, to the NIST 800-53.

For example, in FIG. 2QQ, after receiving the input in FIG. 2PP (and before generating the information security artifact of the first type for the NIST 800-53), the electronic device 200 (or the information security service) has determined that the NIST 800-53 information security standard includes a new objective #175 and that objectives #45, #50, and #55 in the NIST 800-53 information security standard have been updated since the last time the electronic device 200 (or the information security service) generated an information security artifact of the first type for the NIST 800-53 information security standard. In some embodiments, the new objective #175 in the NIST 800-53 information security standard has one or characteristics similar to the other objectives previously described above in one or more ways. In some embodiments, the updates to objective #45, #50, and/or #55 includes changes to one or more parts of the objectives #45, #50, and/or #55 (e.g., the part(s) of objectives #45, #50, #55 optionally have similar characteristics to the parts of other objectives previously described), changes to information required by objectives #45, #50, and/or #55, one or more new parameters required by objectives #45, #50, and/or #55, etc. In other words, the NIST 800-53 information security standard may have published or implemented global changes to the evaluation-criteria defined by the information security standard.

In some embodiments, in response to the electronic device 200 (or the information security service) determining that the NIST 800 includes one or more (global) changes (including a new objective #175 and updates to objectives #45, 50, and 55), the electronic device (or the information security service) optionally displays the indication 249 illustrated in FIG. 2QQ. As shown in FIG. 2QQ, the indication 249 optionally includes information about the determined changes to the NIST 800-53 information security standard. In some embodiments, information about the determined changes to the NIST 800-53 includes information describing which objectives in the NIST 800-53 information security standard and/or information describing (e.g., detailing) the changes to the objectives with which the changes are associated. It should be understood that if the electronic device 200 (or the information security service) determined that the NIST 800-53 information security standard included more, different, or fewer updates, the information displayed in the indication 249 would optionally indicate the more, different, or fewer updates.

Additionally, as shown in FIG. 2GG, the indication 249 optionally includes selectable options 225-1 and 225-2. Selectable option 225-1, when selected, optionally causes the electronic device 200 (or the information security service) to displays one or more user interfaces for updating the information security control objects that correspond to the objectives with which the (global) changes are associated before generating the information security artifact of the first type for the NIST 800-53 information security standard (e.g., user interfaces having one or more characteristics similar to FIGS. 2N, 2U, and 2X). Conversely, selectable option 225-2, when selected, optionally causes the electronic device 200 (or the information security service) to generate the information security artifact of the first type for the NIST 800-53 information security standard without displaying the one or more user interfaces for updating the information security control objects that correspond to the objectives with which the (global) changes are associated-which optionally causes the electronic device 200 (or the information security service) to generate the information security artifact of the first type in a manner that does not satisfy evaluation-criteria of the NIST 800-53 information security standard.

In some embodiments, the user interface 253 for the first information security program includes a selectable option to display the one or more information security standards to which the first information security program corresponds. For example, in FIG. 2RR, while the user interface is displaying the items 241-1 thru 241-328 corresponding to the information security control objects #1-#328 included in the first information security program, the electronic device 200 receives an input selecting the selectable option 227-1 (indicated by mouse 208 selecting the selectable option 227-1). In some embodiments, in response to the electronic device receiving the input in FIG. 2RR, the electronic device 200 displays, in the user interface 253, items 229-1 thru 229-N corresponding to information security standards to which the first information security program corresponds (e.g., FedRAMP High and information security standards #2-N). In some embodiments, as described previously, the first information security program optionally corresponds to the information security standards associated with items 229-1 thru 229-N for one or more of the reasons described in FIG. 2G or FIG. 2I.

In some embodiments, items 229-1 thru 229-N are selectable and, when selected, cause the electronic device (or the information security service) to display information corresponding to the one or more sections and/or the one or more objectives of the information security standard that corresponds to the selected item. For example, in FIG. 2SS, the electronic device 200 (or the information security service) is receiving an input selecting the item 229-1 corresponding to the FedRAMP High information security standard. In response to the electronic device (or the information security service) receiving the input selecting the item 229-1 corresponding to the FedRAMP High Information Security Standard, the electronic device 200 (or the information security service) optionally displays the user interface 251-3 illustrated in FIG. 2TT. As shown in FIG. 2TT, the user interface 251-3 optionally includes the selectable options 251-1 and 251-2. In some embodiments, selectable option 251-1 is selectable and, when selected, causes the electronic device (or the information security service) to display the one or more sections included in the FedRAMP High information security standard. For example, in FIG. 2TT, the selectable option 251-1 is currently selected (indicated by the electronic device 200 visually emphasizing the selectable option 251-1 and visually deemphasizing the selectable option 251-2). As a result of the selecting option 251-1 being selected, the electronic device 200 is displaying, in the user interface 251-3, one or more representations of the one or more sections included in the FedRAMP High information security standard, including sections directed to Access Control (AC), Audit and Accountability (AA), Security Assessment and Authorization (SA), Confirmation Management (CM), Contingency Planning (CP), Identification and Authentication (IA), Incident Response (IR), Maintenance (MA), Media Protection (MP), and Physical and Environmental Protection (PE). In some embodiments, the one or more representations of the one or more sections included in the FedRAMP High information security standard are selectable, and when selected, cause the electronic device 200 to display, in the user interface 251-3, one or more representations of the one or more objectives of the FedRAMP High information security standard included in the section that corresponds to the selected representation, which in turn, are optionally selectable to display a user interface for the objective that corresponds to the selected representation (e.g., similar to user interface 251-4 in FIG. 2UU). The selectable option 251-2 is optionally selectable, and when selected, causes the electronic device 200 (or the information security service) to display, in the user interface 251-3, one or more representations of the one or more objectives included in the FedRAMP High information security standard, which are optionally selectable to display a user interface for the objective that corresponds to the selected representation (e.g., similar to user interface 251-4 in FIG. 2UU). It should be understood that if the electronic device 200 (or the information security service) detected an input selecting the item 229-2 corresponding to the information security standard #2 in FIG. 2SS instead of the item 222-9, the electronic device 200 (or the information security service) optionally would have displayed a user interface that includes the one or more representations of the sections and/or the one or more representations of the objectives of the information security standard #2 instead of the FedRAMP High information security standard.

In FIG. 2UU, the electronic device 200 is displaying a user interface 251-4 that includes information for Objective #1 in the Awareness and Training section of the FedRAMP High information security standard (indicated by label 251-5). In some embodiments, the representation of the section in the FedRAMP High information security standard indicated at label 251 is optionally selectable, and when selected, causes the electronic device 200 to display all of the objectives (similar to objective #1) included in the section corresponding to the selected representation. For example, if the electronic device 200 (or the information security service) detected a selection directed to the "Awareness and Training" text (which is optionally a link) at the label 251-5, the electronic device 200 optionally displays one or more representations of the one or more sections included in the Awareness and Training section of the FedRAMP High information security standard.

In some embodiments, user interface 251-5 also includes a selectable label indicating which information security control object(s) in the first information security program correspond to Objective #1 in the FedRAMP High information security standard. For example, in FIG. 2UU, the user interface 251-4 includes a selectable label 251-6 with the text "Information Security Control Object #1, which indicates that the information security control object #1 in the first information security program corresponds to the objective #1 in the FedRAMP High information security standard. In some embodiments, the electronic device 200 detects a selection of the selectable label 251-6, and in response, displays a user interface that includes one or more fields of the information security control object #1 (e.g., a user interface similar to FIGS. 2N, 2U, and/or 2X).

Additionally, in some embodiments, the user interface 251-4 includes a description of the Objective #1 in the FedRAMP High information security standard. For example, as shown in FIG. 2UU, the user interface 251-4 includes the text "The organization provides basic security awareness training to information system users (including managers, senior executives, and contractors): a. As part of initial training for new users; b. When required by information system changes; and c. [Assignment: organization-defined frequency] thereafter" (which was described previously with respect to FIG. 2J).

In some embodiments, the electronic device 200 (or the information security service) receives, from a vulnerability scanning service, a vulnerability report that includes information (or vulnerability data) about one or more information security vulnerabilities identified on a system, service, device, and/or product that is associated with the first information security program in the information security service (e.g., the information security controls implemented at the system, service, device, and/or product correspond to the information security control objects included in the first information security program). In response to the electronic device 200 (or the information security service, receiving the vulnerability report from the vulnerability scanning service, the information security service optionally (e.g., selectively) creates and (e.g., selectively) adds to the first information security program one or more information security vulnerability objects corresponding to the one or more information security vulnerabilities included in the vulnerability report. For example, the electronic device 200 (or the information security service) optionally creates a "RedHat curl local file overwrite" information security vulnerability object and information security vulnerability objects #2-N in response to the electronic device 200 (or the information security service receiving a vulnerability report that includes a "Red-Hat curl local file overwrite" information security vulnerability and information security vulnerabilities #2-N.

In some embodiments, the electronic device 200 (or the information security service) displays one or more representations of the one or more information security vulnerability objects included in the first information security program. For example, in FIG. 2VV, after (e.g., in response to) creating the above-mentioned information security vulnerability objects, the electronic device 200 (or the information security service) may display, in the user interface 253, items 231-1 thru 231-N corresponding to the "RedHat curl local file overwrite" information security vulnerability and information security vulnerabilities #2-N, respectively. The "RedHat curl local file overwrite" information security vulnerability and information security vulnerabilities #2-N may be arranged according to one or more prioritization criterion (e.g., a severity level, vulnerability risk score, date of the vulnerability etc.).

In some embodiments, items 231-1 thru 231-N are selectable to display on a user interface for the information security vulnerability object that corresponds to the selected item. For example, as also shown in FIG. 2VV, the electronic device 200 is detecting a selection of item 231-1 corresponding to the Red Hat curl local file overwrite information security vulnerability object. In response to the electronic device 200 receiving the selection of item 231-1, the electronic device 200 optionally expands item 231-1 to display information (as illustrated in FIG. 2WW) about the vulnerability object with which item 231-1 is associated ("Red Hat curl local file overwrite"), including unique identifier of the vulnerability object, name of the vulnerability, how the vulnerability was discovered, description of the vulnerability, proposed solution to remediate the vulnerability, vulnerability risk score, severity of the vulnerability, date the vulnerability was first discovered, date the vulnerability was last observed, IP address of the system that includes the vulnerability, port of the system that includes the vulnerability, and/or domain name of the system that includes the vulnerability. In some embodiments, the information about a respective vulnerability object includes information (e.g., vulnerability data) included in the above-described vulnerability report and information that was determined by the electronic device 200 (or the information security service). It should be understood that if, in FIG. 2VV, the electronic device 200 detected a selection of item 231-2 instead of 231-1, the electronic device 200 would have optionally expanded item 231-2 instead of 231-1.

In some embodiments, after adding a vulnerability object to a respective information security program, the electronic device 200 (or the information security service) determines if the vulnerability object corresponds to one or more information security control objects in the first information security program. For example, after adding the "Red Hat curl local overwrite" vulnerability object (corresponding to item 231-1 in FIG. 2WW) to the first information security program, the electronic device 200 (or the information security service) optionally determines that the "Red Hat curl local overwrite" vulnerability object is associated with the information security control object #1 in the first information security program (e.g., the information security control that was implemented at a system, service, product, and/or device to prevent such a vulnerability from occurring).

In some embodiments, before determining that the "Red Hat curl local overwrite" vulnerability object is associated with the information security control object #1 in the first information security program, the electronic device 200 (or the information security service) optionally performed a determination to determine if other subscriber account(s) (e.g., other than Subscriber A) in the information security service include a vulnerability object corresponding to the "Red Hat curl local file overwrite" vulnerability, and if so, with which information security control object in that subscriber's account the vulnerability object is associated. For example, the electronic device 200 (or the information security service) optionally determines that a second, third, and/or fourth subscriber account in the information security service include a first, second, and third vulnerability object directed to the "Red Hat curl local overwrite" vulnerability, respectively, and that the first, second, and third vulnerability objects are associated with a first, second, and third information security control object, respectively, that correspond to objective #1 in the FedRAMP High information security standard. Thus, in response to determining that the vulnerability objects corresponding to the "Red Hat curl local file overwrite" vulnerability in other subscriber accounts are associated with information security control objects that correspond to objective #1 in the FedRAMP High information security standard, the electronic device 200 (or the information security service) optionally determined that the "Red Hat curl local overwrite" vulnerability object in the first information security program is associated with the information security object #1 in the first information security program because information security control object #1 corresponds to the same objective—objective #1 in the FedRAMP High information security standard.

Alternatively, or optionally, in some embodiments, if the electronic device 200 (or the information security service) determined that no other subscriber accounts include a vulnerability object directed to the "Red Hat curl local overwrite," the electronic device 200 (or the information security service) optionally classifies, using one or more machine learning models and/or one or more rules, the vulnerability (e.g., classify the vulnerability as a denial-of-service, exfiltration, malware, virus, or spyware vulnerability, etc.). For example, the electronic device 200 (or the information security service, optionally uses one or more machine learning models and/or one or more (vulnerability classification) rules, classifies that the "Red Hat curl local overwrite" vulnerability is an exfiltration vulnerability, and thus determines that "Red Hat curl local overwrite" vulnerability object is associated with the information security control object #1 because the information security control object #1 is responsible for preventing exfiltration vulnerabilities. In some embodiments, the electronic device 200 (or the information security service) identifies that the information security control object #1 is directed to preventing exfiltration vulnerabilities because objective #1 in the FedRAMP High information security is directed to preventing exfiltration vulnerabilities. It should be understood that vulnerabilities #2-N (corresponding to items 231-2 thru 231-N) are optionally associated with other information security control objects in the first information security program and were determined to be associated with those information security control objects in analogous ways previously described above.

In some embodiments, the vulnerability objects (and the information or vulnerability data) included in the first information security program are used to generate an information security artifact of the second type (e.g., a vulnerability (data) report required by a respective information security standard) (e.g., different form the information security of the first type) in accordance with evaluation criteria of a respective information security standard. In some embodiments, the vulnerability objects (or vulnerability data) that may be included in the information security artifact of the second time may be based on a predetermined period of time (e.g., vulnerabilities occurring in the past month, vulnerabilities occurring the past year, etc.) For example, the electronic device 200 (or the information security service) may optionally generate the information security artifact of the second type in response to the electronic device 200 (or the information security service) detecting a selection of the selectable option 237 in FIG. 2MM while the text field 247 includes a token/tag, such as "Vulnerability report for ISO 27001," "Vulnerability report for FedRAMP," "Vulnerability report for SOC 2," etc. In some embodiments, the electronic device 200 (or the information security service) concurrently generates the information security artifact of the first type and the second type (e.g., for the same or different information security standards) in response to a single input if the text field 247 includes such token/tags when the electronic device 200 (or the information security service) detects the selection of the selectable option 237 in FIG. 2MM. In some embodiments, a generated vulnerability report for an information security standard may include one or more pieces of vulnerability data of the one or more vulnerability objects in the first information security program, including, but not limited to, a unique identification value of the vulnerability, a severity level of the vulnerability, a current remediation status of the vulnerability, and/or the associated information security control objects mitigating the vulnerability (which may be obtained from the information stored, in the information security service, about the vulnerability object, as described previously). It shall be noted that in one or more embodiments of a vulnerability (data) report, the vulnerability (data) report may include all information associated with a vulnerability object, or a subset of the information associated with a vulnerability object in analogous ways as described above. Additionally, based on (or in response to) generating the information security artifact of the first type and/or the second type, the information security service (or the electronic device 200) may (e.g., automatically) transmit (e.g., via one or more APIs or other means accepted by the one or more regulatory bodies) the information security artifact of the first type and/or the second type to one or more regulatory bodies associated with the generated information security artifacts (e.g., in response to a user selecting a 'submit' user interface object (not shown)). Accordingly, based on the assessment entity receiving the first cybersecurity artifact, the assessment entity may initiate an evaluation (e.g., technical cybersecurity control data evaluation and/or non-technical evaluation) of one or more target cybersecurity artifacts. Similarly, if the information security service generated multiple information security artifacts associated with multiple different information security standards, the information security service may automatically generate the multiple different information security artifacts to multiple different assessment entities associated with the multiple different information security standards (e.g., via a 'submit' user interface object (not shown)).

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

An exemplary method 300 will now be described below. It shall be noted that the processes described below enhance the operability of an information security service and make the information security service user interfaces more efficient (e.g., by helping the user/subscriber to provide proper inputs and reducing user mistakes when operating/interacting with the information security service) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, and/or additional techniques. These techniques also reduce power usage and computational resources of the information security service by enabling the user to use the information security service more quickly and efficiently.

In some embodiment, the method 300 performs one or more of the processes described below at a cybersecurity data handling and governance service. In some embodiments, the cybersecurity data handling and governance service displays, via a first user interface of the cybersecurity data handling and governance service, a cybersecurity artifact generation object. In some embodiments, while displaying the cybersecurity artifact generation object, the cybersecurity data handling and governance service receives a first input selecting the cybersecurity artifact generation object.

In some embodiments, in response to receiving the first input, in accordance with a determination that the first input is directed to generating a first cybersecurity artifact corresponding to a first authoritative information security standard, in accordance with a determination that the first user interface is dedicated to displaying information directed to a first cybersecurity data catalogue, wherein the first cyber security data catalogue includes a first set of cybersecurity control data objects digitally mapped to the first authoritative information security standard, the cybersecurity data handling and governance service generates the first cybersecurity artifact based on the first set of cybersecurity control data objects in accordance with submittal-criteria defined by the first authoritative information security standard. In some embodiments, in accordance with a determination that the first user interface is dedicated to displaying information directed to a second cybersecurity data catalogue, different from the first cybersecurity data catalogue, wherein the second cybersecurity data catalogue includes a second set of cybersecurity control data objects digitally mapped to the first authoritative information security standard, the cybersecurity data handling and governance service generates the first cyber security artifact based on the second set of cyber security control data objects in accordance with the submittal-criteria defined by the first authoritative information security standard.

The above-described manner of generating two different cybersecurity artifacts enables the information security service (or the electronic device) to quickly and automatically generate different information security artifacts based on different cyber security data catalogues of the information security service. Thus, reducing the number of inputs required by a user to generate an information security artifact that satisfies respective submittal-criteria.

In some embodiments, the first user interface is dedicated to the first cybersecurity data catalogue, and the first cybersecurity data catalogue includes the first set of cybersecurity control data objects and a third set of cybersecurity control data objects. In some embodiments, in response to receiving the first input: in accordance with a determination that the third set of cybersecurity control data objects are digitally mapped to the first authoritative information security standard, the cybersecurity data handling and governance service generates the first cybersecurity artifact based on the first set and the third set of cybersecurity control data objects in accordance with the submittal-criteria defined by the first authoritative information security standard; and in accordance with a determination that the third set of cybersecurity control data objects are not digitally mapped to the first authoritative information security standard, the cybersecurity data handling and governance service the first cybersecurity artifact based on the first set of cybersecurity control data objects in accordance with the submittal-criteria defined by the first authoritative information security standard without generating the first cybersecurity artifact based on the third set of cybersecurity control data objects.

The above described manner of only utilizing the cybersecurity control data objects of a cybersecurity control data catalogue which are digitally mapped to a target information security standard causes the information security service (or the electronic device) to generate an information security artifact that includes only required control data (e.g., and not erroneous control data).

In some embodiments, the first authoritative information security standard includes a first set of cybersecurity objectives and a second set of cybersecurity objectives, and the first set of cybersecurity control data objects are digitally mapped to distinct cybersecurity objectives of the first set of cybersecurity objectives.

In some embodiments, in response to receiving the first input, the cybersecurity data handling and governance service determines that the first cybersecurity data catalogue does not include a cybersecurity control data object digitally mapped to a respective cybersecurity objective of the second set of cybersecurity objectives. In some embodiments, in response to determining that the first cybersecurity data catalogue does not include a cybersecurity control data object digitally mapped to the respective cybersecurity objective of the second set of cybersecurity objectives: in accordance with a determination that a third cybersecurity data catalogue, different from the first cybersecurity data catalogue, includes a first cybersecurity control data object that is digitally mapped to the respective cybersecurity objective of the second set of cybersecurity objectives, the cybersecurity data handling and governance service generates the first cybersecurity artifact based on the first set of cybersecurity control data objects of the first cybersecurity data catalogue and the first cybersecurity control data object of the third cybersecurity data catalogue in accordance with the submittal-criteria defined by the first authoritative information security standard.

The above described manner of generating the information security artifact with control data included in another cybersecurity data catalogue causes the information security service (or the electronic device) to source necessary control data from other cybersecurity data catalogues if the first cybersecurity data catalogue does not include all the required data to generate an information security artifact.

In some embodiments, in response to determining that the first cybersecurity data catalogue does not include the cybersecurity control data object digitally mapped to the respective cybersecurity objective of the second set of cybersecurity objectives and before generating the first cybersecurity artifact, the cybersecurity data handling and governance service displays, overlaid on the first user interface, an indication indicating that the first cybersecurity data catalogue does not include a cybersecurity control data object digitally mapped to the respective cybersecurity objective of the second set of cybersecurity objectives, wherein displaying the indication includes displaying a first selectable option and a second selectable option. In some embodiments, while displaying the indication, the cybersecurity data handling and governance service receives a second input. In some embodiments, in response to receiving the second input: in accordance with a determination that the second input is directed to the first selectable option, the cybersecurity data handling and governance service generates the first cybersecurity artifact based on the first set of cybersecurity control data objects of the first cybersecurity data catalogue and the first cybersecurity control data object of the third cybersecurity data catalogue in accordance with the submittal-criteria defined by the first authoritative information security standard. In some embodiments, in accordance with a determination that the second input is directed to the second selectable option, the cybersecurity data handling and governance service generates the first cybersecurity artifact based on the first set of cybersecurity control data objects of the first cybersecurity data catalogue and not based on the first cybersecurity control data object of the third cybersecurity data catalogue, wherein generating the first cybersecurity artifact based on the first set of cybersecurity control data objects of the first cybersecurity data catalogue and not based on the first cybersecurity control data object of the third cybersecurity data catalogue that only partially satisfies the submittal-criteria defined by the first authoritative information security standard.

The above described manner of displaying the second user interface overlaid on the first user interface provides an efficient way of indicating when a cybersecurity data catalogue does not include all of the required control data to generate a target information security artifact and an efficient way to identify user preferences in generating the target information security artifact in such situations.

In some embodiments, in response to determining that the first cybersecurity data catalogue does not include the cybersecurity control data object digitally mapped to the respective cybersecurity objective of the second set of cybersecurity objectives: in accordance with a determination that the cybersecurity data handling and governance service does not include one of a plurality of distinct cybersecurity data catalogues that includes a cybersecurity control data object digitally mapped to the respective cybersecurity objective of the second set of cybersecurity objectives, the cybersecurity data handling and governance service displays, overlaid on the first user interface, an indication that includes a selectable option that, when selected, initiates a process to create, in the first cybersecurity data catalogue, the cybersecurity control data object corresponding to the respective cybersecurity objective.

The above described manner of displaying a selectable option to create a missing (required) cybersecurity control data object required for creating a target information security artifact reduces the number of inputs needed to add missing control data to a target cybersecurity data catalogue.

In some embodiments, each cybersecurity control data object of the first set of cybersecurity control data objects is digitally mapped to a corresponding cybersecurity objective defined by the first authoritative information security standard. In some embodiments, the each cybersecurity control data object of the first set of cybersecurity control data objects include one or more first respective cybersecurity attributes that map to cybersecurity control information requirements of the corresponding cybersecurity objective. In some embodiments, the each cybersecurity control data object of the first set of cybersecurity control data objects comprise one or more second respective cybersecurity attributes that do not map to the cybersecurity control information requirements of the corresponding cybersecurity objective. The above described properties of a cybersecurity control data object provides an efficient way for extracting information that is relevant to generating a target information security artifact without extracting erroneous/unnecessary information.

In some embodiments, generating the first cybersecurity artifact based on the first set of cybersecurity control data objects includes: instantiating, by one or more computers of the cybersecurity data handling and governance service, a foundational cybersecurity artifact that is structurally compliant with the submittal-criteria of the first cybersecurity artifact to the first authoritative information security standard, extracting one or more attribute values of the one or more first respective cybersecurity attributes defined in each cybersecurity control data object of the first set of cybersecurity control data objects, and installing, by the one or more computers of the cybersecurity data handling and governance service, the one or more attribute values extracted from the one or more first respective cybersecurity attributes defined in each cybersecurity control data object of the first set of cybersecurity control data objects into one or more corresponding portions of the foundational cybersecurity artifact.

The above described manner of obtaining a structurally compliant, foundational security artifact in response to receiving the above-described first input and installing relevant information into the foundational security artifact provides an efficient way for generating an information security artifact that satisfies associated submittal criteria with minimal user input.

In some embodiments, the first set of cybersecurity control data objects includes a first cybersecurity control data object, (2) the one or more first respective cybersecurity attributes defined in the first cybersecurity control data object includes a cybersecurity attribute that has a first value, and (3) generating the first cybersecurity artifact includes installing, by one or more computers of the cybersecurity data handling and governance service, the first value of the first cybersecurity attribute at a corresponding portion in the first cybersecurity artifact.

In some embodiments, after generating the first cybersecurity artifact based on the first set of cybersecurity control data objects, the cybersecurity data handling and governance service receives a second input corresponding to a request to modify the first cybersecurity attribute from having the first value to having a second value, different form the first value; and after modifying the first cybersecurity attribute in accordance with the second input, the cybersecurity data handling and governance service generates, by the one or more computers of the cybersecurity data handling and governance service, an updated cybersecurity artifact based on the first set of cybersecurity control data objects in accordance with the submittal-criteria defined by the first authoritative information security standard, wherein generating the updated cybersecurity artifact includes installing, by the one or more computers of the cybersecurity data handling and governance service, the second value of the first cybersecurity attribute at the corresponding portion in the updated cybersecurity artifact.

The above described manner of installing data related to a most recently updated cybersecurity control data provides an efficient way of generating a target cybersecurity artifact based on updates most recently made by the subscriber, especially when the cybersecurity service includes multiple control data objects mapped to a same (or equivalent) cybersecurity object.

In some embodiments, the cybersecurity data handling and governance service receives the second input while a second user interface of the cybersecurity data handling governance service is being overlaid on the first user interface. The above describer manner of receiving the second input while the second user interface is being overlaid on the first user interface provides feedback about a state of the information security service.

In some embodiments, the first user interface of the cybersecurity data handling governance service is dedicated to displaying information directed to the first cybersecurity data catalogue, and (2) displaying the first user interface includes displaying the cybersecurity artifact generation object concurrently with one or more selectable representations corresponding to one or more cybersecurity control data objects defined in the first set of cybersecurity control data objects, including a first representation of a first cybersecurity control data object defined in the first set of cybersecurity control data objects.

In some embodiments, the cybersecurity data handling and governance service receives a second input selecting the first representation. In some embodiments, in response to receiving the second input, the cybersecurity data handling and governance service displays, via a second user interface of the cybersecurity data handling governance service, the one or more first respective cybersecurity attributes and the one or more second respective cybersecurity attributes that correspond to the first cybersecurity control data object.

The above described manner of displaying representations of cybersecurity control data objects concurrently with the cybersecurity artifact generation object provides an efficient way of displaying and/or arranging relevant information related to the cybersecurity data catalogue on a same user interface.

In some embodiments, (1) the first set of cybersecurity control data objects includes a first cybersecurity control data object, (2) the one or more first respective cybersecurity attributes defined in the first cybersecurity control data object includes a first cybersecurity attribute that has a first value, and (3) generating the first cybersecurity artifact includes installing, by one or more computers of the cybersecurity data handling and governance service, the first value of the first cybersecurity attribute at a corresponding portion in the first cybersecurity artifact. In some embodiments, after generating the first cybersecurity artifact and while a third cybersecurity data catalogue, different from the first cybersecurity data catalogue, in the cybersecurity data handling and governance service includes a respective cybersecurity control data object that has a plurality of cybersecurity attributes, including a respective cybersecurity attribute that has a first value, receiving a second input corresponding to a request to modify the respective cybersecurity attribute from having the first value to having a second value, different from the first value; and after modifying the respective cybersecurity attribute in accordance with the second input, the cybersecurity data handling and governance service generates an updated cybersecurity artifact based on the first set of cybersecurity controls in accordance with the submittal-criteria defined by the first authoritative information security standard, wherein generating the updated cybersecurity artifact includes: in accordance with a determination that the first cybersecurity control data object of the first cybersecurity data catalogue and the respective cybersecurity control data object of the third cybersecurity data catalogue correspond to a same cybersecurity objective defined in the first authoritative information security standard, installing the second value at the corresponding portion in the updated cybersecurity artifact; and in accordance with a determination that the first cybersecurity control data object of the first cybersecurity data catalogue and the respective cybersecurity control data object of the third cybersecurity data catalogue do not correspond to a same cybersecurity objective defined in the first authoritative information security standard, installing the first value at the corresponding portion in the updated cybersecurity artifact.

The above described manner of generating a new/updated cybersecurity artifact based on updates performed by a subscriber provides an efficient way to generate information security artifacts based on recent changes to the cybersecurity control data with minimal user input.

In some embodiments, in response to receiving the first input, in accordance with a determination that the first input is directed to generating the first cybersecurity artifact corresponding to the first authoritative information security standard, in accordance with a determination that the first user interface is dedicated to displaying information directed to a third cybersecurity data catalogue, different from the first and the second cybersecurity data catalogue, wherein the third cybersecurity data catalogue includes a third set of cybersecurity control data objects that are digitally mapped to a second authoritative information security standard, different from the first authoritative information security standard: the cybersecurity data handling and governance service digitally maps the third set of cybersecurity control data objects from the second authoritative information security standard to the first authoritative information security standard; and the cybersecurity data handling and governance service generates the first cybersecurity artifact based on the third set of cyber security control data objects in accordance with the submittal-criteria defined by the first authoritative information security standard.

In some embodiments, the first user interface is dedicated to displaying information directed to the first cybersecurity data catalogue. In some embodiments, before displaying the first user interface, the cybersecurity data handling and governance service displays a second user interface of the cybersecurity data handling and governance service that includes a first representation that is selectable to display the first user interface and a second representation that is selectable to display a third user interface dedicated to the second cybersecurity data catalogue, wherein displaying the second user interface includes: in accordance with a determination that a majority of the first cybersecurity data catalogue was created based on an uploaded cybersecurity artifact that satisfies submittal-criteria defined by a respective information security standard, displaying the first representation with a first visual characteristic; and in accordance with a determination that a majority of the first cybersecurity data catalogue was not created based on an uploaded cybersecurity artifact, displaying the first representation with a second visual characteristic, different from the first visual characteristic.

The above described manner of displaying different cybersecurity data catalogues based on whether it was created based on an uploaded cybersecurity artifact (e.g., creation origination) provides an efficient way to differentiate different types cybersecurity data catalogues to the subscriber.

In some embodiments, first user interface is dedicated to the first cybersecurity data catalogue, and the first input is directed to generating the first cybersecurity artifact corresponding to the first authoritative information security standard and a second cybersecurity artifact corresponding to a second authoritative information security standard, different from the first authoritative information security standard. In some embodiments, in response to receiving the first input, the cybersecurity data handling and governance service generates the first cybersecurity artifact based on the first set of cybersecurity control data objects in accordance with the submittal-criteria defined by the first authoritative information security standard; and generates the second cybersecurity artifact based on a third set of cybersecurity control data objects included in the first cybersecurity data catalogue in accordance with submittal-criteria defined by the second authoritative information security standard.

The above described manner of generating multiple information security artifacts provides an efficient way of simultaneously generating multiple distinct security artifacts in response to or based on a single (e.g., user) input.

In some embodiments, in response to receiving the first input and before generating the first cybersecurity artifact: in accordance with a determination that the first authoritative information security standard includes one or more updates or one or more modifications to submittal-criteria of the first authoritative information security standard, the cybersecurity data handling and governance service displays, on the first user interface, an indication indicating that changes, to the first cybersecurity data catalogue, are required in order to generate the first cybersecurity artifact in accordance with the submittal-criteria defined by the first authoritative information security standard. The above described manner of displaying the first user interface provides an efficient way to indicate, to a subscriber, changes to a target information security standard.

In some embodiments, before displaying the first user interface and while the cybersecurity data handling and governance service does not include the first cybersecurity data catalogue, the cybersecurity data handling and governance service receives a second input corresponding to a request to upload, to the cybersecurity data handling and governance service, a third cybersecurity artifact that satisfies transmittal criteria of a respective authoritative information security standard. In some embodiments, in response to receiving the second input: the cybersecurity data handling and governance service creates the first cybersecurity data catalogue; and creates, in the first cybersecurity data catalogue, one or more cybersecurity control data objects that correspond to one or more cybersecurity controls described in the third cybersecurity artifact. The above described manner of creating the first cybersecurity data catalogue and associated control data objects based on an uploaded artifact reduces the number of inputs required to create cybersecurity catalogues.

In some embodiments, the second input includes a second request to upload, to the cybersecurity data handling and governance service, a fourth cybersecurity artifact that satisfies transmittal criteria of a second respective authoritative information security standard. In some embodiments, in response to receiving the second input: the cybersecurity data handling and governance service concurrently creates the first cybersecurity data catalogue and the second cybersecurity data catalogue. The above described manner of creating the first and the second cybersecurity data catalogue concurrently and associated control data objects reduces the number of inputs required to create a plurality of cybersecurity catalogues.

In some embodiments, creating the first cybersecurity data catalogue includes: in accordance with a determination that the respective authoritative information security standard is the first authoritative information security standard: creating one or more cybersecurity objective data objects corresponding to one or more cybersecurity objectives defined in the first authoritative information security standard; and digitally mapping the one or more cybersecurity control data objects to the one or more cybersecurity objective data objects; and in accordance with a determination that the respective authoritative information security standard is a third authoritative information security standard: creating one or more cybersecurity objective data objects corresponding to one or more cybersecurity objectives defined in the third authoritative information security standard; and digitally mapping the one or more cybersecurity control data objects to the one or more cybersecurity objective data objects.

In some embodiments, the one or more cybersecurity objective data objects includes a first cybersecurity objective data object that corresponds to a first cybersecurity objective of the first authoritative information security standard, and wherein the first cybersecurity objective data object is digitally mapped to a first cybersecurity control data object of the one or more cybersecurity control data objects. In some embodiments, after creating the first cybersecurity data catalogue, the cybersecurity data handling and governance service receives a third input selecting the first cybersecurity objective data object; and in response to receiving the third input: the cybersecurity data handling and governance service displays information corresponding to the first cybersecurity objective of the first authoritative information security standard; and displays an indication indicating that the first cybersecurity objective is digitally mapped to the first cybersecurity control data object.

In some embodiments, after generating the first cybersecurity artifact, the cybersecurity data handling and governance service electronically (e.g., and automatically) transmits the first cybersecurity artifact to an assessment entity verified by the first authoritative information security standard. The above described manner of electronically transmitting the generated information security artifact provides an efficient way for a subscriber or user to submit the artifacts generated by the information security service for review, reduces user error related to the manual transmission of such artifacts, and reduces the time that the artifacts generated by the information security service are not in respective review queue of the assessment entity. Thereby, reducing the time to initiate a review by the assessment entity. For instance, in a non-limiting example, the one or more information security artifacts that are generated based on a first information security program may be electronically and/or automatically transmitted to one or more target assessment entities using one or more portions (e.g., user interfaces or user interface objects) of the information security services (e.g., the information security service may transmit an information security artifact in response to at least one user input selecting an artifact transmittal interface object (not shown) from entirely within the information security service). Although omitted for conciseness, the preferred embodiments include every combination and permutation of the implementations of the systems and methods described herein. The system and methods and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any hardware or hardware/firmware combination device can alternatively or additionally execute the instructions.

We claim:
1. A computer-implemented method comprising:
at a cybersecurity data handling and governance service:
displaying, via a first user interface of the cybersecurity data handling and governance service, a cybersecurity artifact generation object;
while displaying the cybersecurity artifact generation object, receiving a first input selecting the cybersecurity artifact generation object;
in response to receiving the first input:
in accordance with a determination that the first input is directed to generating a first cybersecurity artifact corresponding to a first authoritative information security standard:
in accordance with a determination that the first user interface is dedicated to displaying information directed to a first cybersecurity data catalogue, wherein the first cybersecurity data catalogue includes a first set of cybersecurity control data objects digitally mapped to the first authoritative information security standard, generating the first cybersecurity artifact based on the first set of cybersecurity control data objects in accordance with submittal-criteria defined by the first authoritative information security standard; and
in accordance with a determination that the first user interface is dedicated to displaying information directed to a second cybersecurity data catalogue, different from the first cybersecurity data catalogue, wherein the second cybersecurity data catalogue includes a second set of cybersecurity control data objects digitally mapped to the first authoritative information security standard, generating the first cybersecurity artifact based on the second set of cybersecurity control data objects in accordance with the submittal-criteria defined by the first authoritative information security standard wherein:
the first set of cybersecurity control data objects includes a first cybersecurity control data object;
each cybersecurity control data object of the first set of cybersecurity control data objects is digitally mapped to a corresponding cybersecurity objective of the first authoritative information security standard;
the each cybersecurity control data object of the first set of cybersecurity control data objects comprises one or more first respective cybersecurity attributes that map to cybersecurity control information requirements of the corresponding cybersecurity objective;
the one or more first respective cybersecurity attributes defined in the first cybersecurity control data object includes a first cybersecurity attribute that has a first value;
the each cybersecurity control data object of the first set of cybersecurity control data objects comprises one or more second respective cybersecurity attributes that do not map to the cybersecurity control information requirements of the corresponding cybersecurity objective; and
generating the first cybersecurity artifact includes installing, by one or more computers of the cybersecurity data handling and governance service, the first value of the first cybersecurity attribute at a corresponding portion in the first cybersecurity artifact;
after generating the first cybersecurity artifact based on the first set of cybersecurity control data objects, receiving a second input corresponding to a request to modify the first cybersecurity attribute from having the first value to having a second value, different from the first value; and
after modifying the first cybersecurity attribute in accordance with the second input, generating, by the one or more computers of the cybersecurity data handling and governance service, an updated cybersecurity artifact based on the first set of cybersecurity control data objects in accordance with the submittal-criteria defined by the first authoritative information security standard, wherein generating the updated cybersecurity artifact includes installing, by the one or more computers of the cybersecurity data handling and governance service, the second value of the first cybersecurity attribute at a corresponding portion in the updated cybersecurity artifact.

2. The computer-implemented method of claim 1, wherein the first user interface is dedicated to the first cybersecurity data catalogue, and the first cybersecurity data catalogue includes the first set of cybersecurity control data objects and a third set of cybersecurity control data objects, the method further comprising:
in response to receiving the first input:
in accordance with a determination that the third set of cybersecurity control data objects are digitally mapped to the first authoritative information security standard, generating the first cybersecurity artifact based on the first set and the third set of cybersecurity control data objects in accordance with the submittal-criteria defined by the first authoritative information security standard; and
in accordance with a determination that the third set of cybersecurity control data objects are not digitally mapped to the first authoritative information security standard, generating the first cybersecurity artifact based on the first set of cybersecurity control data objects in accordance with the submittal-criteria defined by the first authoritative information security standard without generating the first cybersecurity artifact based on the third set of cybersecurity control data objects.

3. The computer-implemented method of claim 2, wherein the first authoritative information security standard includes a first set of cybersecurity objectives and a second set of cybersecurity objectives, and the first set of cybersecurity control data objects are digitally mapped to distinct cybersecurity objectives of the first set of cybersecurity objectives, the method further comprising:
in response to receiving the first input, determining that the first cybersecurity data catalogue does not include a cybersecurity control data object digitally mapped to a respective cybersecurity objective of the second set of cybersecurity objectives; and
in response to determining that the first cybersecurity data catalogue does not include a cybersecurity control data object digitally mapped to the respective cybersecurity objective of the second set of cybersecurity objectives:
in accordance with a determination that a third cybersecurity data catalogue, different from the first cybersecurity data catalogue, includes a first cybersecurity control data object that is digitally mapped to the respective cybersecurity objective of the second set of cybersecurity objectives, generating the first cybersecurity artifact based on the first set of cybersecurity control data objects of the first cybersecurity data catalogue and the first cybersecurity control data object of the third cybersecurity data catalogue in accordance with the submittal-criteria defined by the first authoritative information security standard.

4. The computer-implemented method of claim 3, further comprising:
in response to determining that the first cybersecurity data catalogue does not include the cybersecurity control data object digitally mapped to the respective cybersecurity objective of the second set of cybersecurity objectives and before generating the first cybersecurity artifact, displaying, overlaid on the first user interface, an indication indicating that the first cybersecurity data catalogue does not include a cybersecurity control data object digitally mapped to the respective cybersecurity objective of the second set of cybersecurity objectives, wherein displaying the indication includes displaying a first selectable option and a second selectable option;
while displaying the indication, receiving a second input; and
in response to receiving the second input:
in accordance with a determination that the second input is directed to the first selectable option, generating the first cybersecurity artifact based on the first set of cybersecurity control data objects of the first cybersecurity data catalogue and the first cybersecurity control data object of the third cybersecurity data catalogue in accordance with the submittal-criteria defined by the first authoritative information security standard; and
in accordance with a determination that the second input is directed to the second selectable option, generating the first cybersecurity artifact based on the first set of cybersecurity control data objects of the first cybersecurity data catalogue and not based on the first cybersecurity control data object of the third cybersecurity data catalogue, wherein generating the first cybersecurity artifact based on the first set of cybersecurity control data objects of the first cybersecurity data catalogue and not based on the first cybersecurity control data object of the third cybersecurity data catalogue that only partially satisfies the submittal-criteria defined by the first authoritative information security standard.

5. The computer-implemented method of claim 3, further comprising:
in response to determining that the first cybersecurity data catalogue does not include the cybersecurity control data object digitally mapped to the respective cybersecurity objective of the second set of cybersecurity objectives:
in accordance with a determination that the cybersecurity data handling and governance service does not include one of a plurality of distinct cybersecurity data catalogues that includes a cybersecurity control data object digitally mapped to the respective cybersecurity objective of the second set of cybersecurity objectives, displaying, overlaid on the first user interface, an indication that includes a selectable option that, when selected, initiates a process to create, in the first cybersecurity data catalogue, the cybersecurity control data object corresponding to the respective cybersecurity objective.

6. The computer-implemented method of claim 1, wherein generating the first cybersecurity artifact based on the first set of cybersecurity control data objects includes:
instantiating, by the one or more computers of the cybersecurity data handling and governance service, a foundational cybersecurity artifact that is structurally compliant with the submittal-criteria of the first cybersecurity artifact to the first authoritative information security standard,
extracting one or more attribute values of the one or more first respective cybersecurity attributes defined in each cybersecurity control data object of the first set of cybersecurity control data objects, and
installing, by the one or more computers of the cybersecurity data handling and governance service, the one or more attribute values extracted from the one or more first respective cybersecurity attributes defined in each cybersecurity control data object of the first set of cybersecurity control data objects into one or more corresponding portions of the foundational cybersecurity artifact.

7. The computer-implemented method of claim 1, wherein the cybersecurity data handling and governance service receives the second input while a second user interface of the cybersecurity data handling governance service is being overlaid on the first user interface.

8. The computer-implemented method of claim 1, wherein (1) the first user interface of the cybersecurity data handling governance service is dedicated to displaying information directed to the first cybersecurity data catalogue, and (2) displaying the first user interface includes displaying the cybersecurity artifact generation object concurrently with one or more selectable representations corresponding to one or more cybersecurity control data objects defined in the first set of cybersecurity control data objects, including a first representation of a first cybersecurity control data object defined in the first set of cybersecurity control data objects, the method further comprising:
receiving a second input selecting the first representation; and
in response to receiving the second input, displaying, via a second user interface of the cybersecurity data handling governance service, the one or more first respective cybersecurity attributes and the one or more second respective cybersecurity attributes that correspond to the first cybersecurity control data object.

9. The computer-implemented method of claim 1, further comprising:
in response to receiving the first input:
in accordance with a determination that the first input is directed to generating the first cybersecurity artifact corresponding to the first authoritative information security standard:
in accordance with a determination that the first user interface is dedicated to displaying information directed to a third cybersecurity data catalogue, different from the first and the second cybersecurity data catalogue, wherein the third cybersecurity data catalogue includes a third set of cybersecurity control data objects that are digitally mapped to a second authoritative information security standard, different from the first authoritative information security standard:
digitally mapping the third set of cybersecurity control data objects from the second authoritative information security standard to the first authoritative information security standard; and generating the first cybersecurity artifact based on the third set of cyber security control data objects in accordance with the submittal-criteria defined by the first authoritative information security standard.

10. The computer-implemented method of claim 1, wherein the first user interface is dedicated to displaying information directed to the first cybersecurity data catalogue, the method further comprising:
before displaying the first user interface, displaying a second user interface of the cybersecurity data handling and governance service that includes a first representation that is selectable to display the first user interface and a second representation that is selectable to display a third user interface dedicated to the second cybersecurity data catalogue, wherein displaying the second user interface includes:
in accordance with a determination that a majority of the first cybersecurity data catalogue was created based on an uploaded cybersecurity artifact that satisfies submittal-criteria defined by a respective information security standard, displaying the first representation with a first visual characteristic; and
in accordance with a determination that a majority of the first cybersecurity data catalogue was not created based on an uploaded cybersecurity artifact, displaying the first representation with a second visual characteristic, different from the first visual characteristic.

11. The computer-implemented method of claim 1, wherein the first user interface is dedicated to the first cybersecurity data catalogue, and the first input is directed to generating the first cybersecurity artifact corresponding to the first authoritative information security standard and a second cybersecurity artifact corresponding to a second authoritative information security standard, different from the first authoritative information security standard, the method further comprising:
in response to receiving the first input:
generating the first cybersecurity artifact based on the first set of cybersecurity control data objects in accordance with the submittal-criteria defined by the first authoritative information security standard; and
generating the second cybersecurity artifact based on a third set of cybersecurity control data objects included in the first cybersecurity data catalogue in accordance with submittal-criteria defined by the second authoritative information security standard.

12. The computer-implemented method of claim 1, further comprising:
in response to receiving the first input and before generating the first cybersecurity artifact:
in accordance with a determination that the first authoritative information security standard includes one or more updates or one or more modifications to submittal-criteria of the first authoritative information security standard, displaying, on the first user interface, an indication indicating that changes, to the first cybersecurity data catalogue, are required in order to generate the first cybersecurity artifact in accordance with the submittal-criteria defined by the first authoritative information security standard.

13. The computer-implemented method of claim 1, further comprising:
before displaying the first user interface and while the cybersecurity data handling and governance service does not include the first cybersecurity data catalogue, receiving a third input corresponding to a request to upload, to the cybersecurity data handling and governance service, a second cybersecurity artifact that satisfies transmittal criteria of a respective authoritative information security standard; and
in response to receiving the third input:
creating the first cybersecurity data catalogue; and
creating, in the first cybersecurity data catalogue, one or more cybersecurity control data objects that correspond to one or more cybersecurity controls described in the second cybersecurity artifact.

14. The computer-implemented method of claim 13, wherein the third input includes a second request to upload, to the cybersecurity data handling and governance service, a third cybersecurity artifact that satisfies transmittal criteria of a second respective authoritative information security standard; and
in response to receiving the third input:
concurrently creating the first cybersecurity data catalogue and the second cybersecurity data catalogue.

15. The computer-implemented method of claim 13, wherein creating the first cybersecurity data catalogue includes:
in accordance with a determination that the respective authoritative information security standard is the first authoritative information security standard:
creating one or more cybersecurity objective data objects corresponding to one or more cybersecurity objectives defined in the first authoritative information security standard; and
digitally mapping the one or more cybersecurity control data objects to the one or more cybersecurity objective data objects defined in the first authoritative information security standard; and
in accordance with a determination that the respective authoritative information security standard is a second authoritative information security standard:
creating one or more cybersecurity objective data objects corresponding to one or more cybersecurity objectives defined in the second authoritative information security standard; and
digitally mapping the one or more cybersecurity control data objects to the one or more cybersecurity objective data objects defined in the second authoritative information security standard.

16. The computer-implemented method of claim 15, wherein the one or more cybersecurity objective data objects includes a first cybersecurity objective data object that corresponds to a first cybersecurity objective of the first authoritative information security standard, and wherein the first cybersecurity objective data object is digitally mapped to the first cybersecurity control data object of the one or more cybersecurity control data objects, the method further comprising:
after creating the first cybersecurity data catalogue, receiving a fourth input selecting the first cybersecurity objective data object; and
in response to receiving the fourth input:
displaying information corresponding to the first cybersecurity objective of the first authoritative information security standard; and
displaying an indication indicating that the first cybersecurity objective is digitally mapped to the first cybersecurity control data object.

17. The computer-implemented method of claim 1, further comprising after generating the first cybersecurity artifact, electronically transmitting the first cybersecurity artifact to an assessment entity verified by the first authoritative information security standard.

18. A computer-implemented method comprising:
at a cybersecurity data handling and governance service:
displaying, via a first user interface of the cybersecurity data handling and governance service, a cybersecurity artifact generation object;
while displaying the cybersecurity artifact generation object, receiving a first input selecting the cybersecurity artifact generation object;
in response to receiving the first input:
in accordance with a determination that the first input is directed to generating a first cybersecurity artifact corresponding to a first authoritative information security standard:
in accordance with a determination that the first user interface is dedicated to displaying information directed to a first cybersecurity data catalogue, wherein the first cybersecurity data catalogue includes a first set of cybersecurity control data objects digitally mapped to the first authoritative information security standard, generating the first cybersecurity artifact based on the first set of cybersecurity control data objects in accordance with submittal-criteria defined by the first authoritative information security standard; and
in accordance with a determination that the first user interface is dedicated to displaying information directed to a second cybersecurity data catalogue, different from the first cybersecurity data catalogue, wherein the second cybersecurity data catalogue includes a second set of cybersecurity control data objects digitally mapped to the first authoritative information security standard, generating the first cybersecurity artifact based on the second set of cybersecurity control data objects in accordance with the submittal-criteria defined by the first authoritative information security standard;
before displaying the first user interface and while the cybersecurity data handling and governance service does not include the first cybersecurity data catalogue, receiving a second input corresponding to a request to upload, to the cybersecurity data handling and governance service, a second cybersecurity artifact that satisfies submittal-criteria of a respective authoritative information security standard; and
in response to receiving the second input:
creating the first cybersecurity data catalogue; and
creating, in the first cybersecurity data catalogue, one or more cybersecurity control data objects that correspond to one or more cybersecurity controls described in the second cybersecurity artifact,
wherein creating the first cybersecurity data catalogue includes:
in accordance with a determination that the respective authoritative information security standard is the first authoritative information security standard:
creating one or more cybersecurity objective data objects corresponding to one or more cybersecurity objectives of the first authoritative information security standard; and
digitally mapping the one or more cybersecurity control data objects to the one or more cybersecurity objective data objects of the first authoritative information security standard; and
in accordance with a determination that the respective authoritative information security standard is a second authoritative information security standard:
creating one or more cybersecurity objective data objects corresponding to one or more cybersecurity objectives of the second authoritative information security standard; and
digitally mapping the one or more cybersecurity control data objects to the one or more cybersecurity objective data objects of the second authoritative information security standard.

\* \* \* \* \*